(12) United States Patent
Shah

(10) Patent No.: US 12,144,696 B1
(45) Date of Patent: Nov. 19, 2024

(54) DEVICES AND METHODS FOR INTRA-ORAL AEROSOL REMOVAL

(71) Applicant: Mamta Ketan Shah, Fremont, CA (US)

(72) Inventor: Mamta Ketan Shah, Fremont, CA (US)

(*) Notice: Subject to any disclaimer, the term of this patent is extended or adjusted under 35 U.S.C. 154(b) by 165 days.

(21) Appl. No.: 17/302,756

(22) Filed: May 11, 2021

Related U.S. Application Data

(60) Provisional application No. 63/094,154, filed on Oct. 20, 2020, provisional application No. 63/022,980, filed on May 11, 2020.

(51) Int. Cl.
*A61C 17/06* (2006.01)
*A61C 17/12* (2006.01)

(52) U.S. Cl.
CPC ............ *A61C 17/096* (2019.05); *A61C 17/12* (2019.05)

(58) Field of Classification Search
CPC . A61C 17/06–10; A61C 17/096; A61C 17/12; A61C 5/82
USPC ............................................................ 433/96
See application file for complete search history.

(56) References Cited

U.S. PATENT DOCUMENTS

| | | | | |
|---|---|---|---|---|
| 4,261,697 A | * | 4/1981 | Newitter | A61C 5/82 433/137 |
| 5,931,673 A | * | 8/1999 | Bolbolan | A61C 5/82 433/136 |
| 2007/0231773 A1 | * | 10/2007 | Pontynen | A61C 17/096 433/136 |
| 2009/0081611 A1 | * | 3/2009 | Hines | A61C 17/14 433/140 |
| 2013/0095450 A1 | * | 4/2013 | Ames | A61C 17/08 433/96 |
| 2016/0270878 A1 | * | 9/2016 | Fulton III | A61M 1/84 |
| 2019/0142558 A1 | * | 5/2019 | Walker | A61C 1/0007 433/92 |
| 2020/0275991 A1 | * | 9/2020 | Abedi | A61C 5/82 |
| 2021/0338377 A1 | * | 11/2021 | Ferone | A61C 17/08 |

FOREIGN PATENT DOCUMENTS

| | | | | |
|---|---|---|---|---|
| EP | 2363093 A2 | * | 9/2011 | ......... A61C 17/043 |
| WO | WO-9629952 A1 | * | 10/1996 | ......... A61C 17/043 |

* cited by examiner

*Primary Examiner* — Matthew M Nelson
(74) *Attorney, Agent, or Firm* — Knobbe, Martens, Olson & Bear, LLP

(57) ABSTRACT

Apparatus and methods for aerosol removal from the vicinity of a patient's mouth. An apparatus can include a coupling having a proximal end and a distal end, the distal end of the coupling having a first port configured to couple to a suction tube, the coupling further comprising an interior cavity from the proximal end to the first port, a conduit having an interior cavity coupled to the proximal end of the coupling connecting the interior cavity of the coupling to the interior cavity of the conduit, the conduit extending to form a circumferential boundary around an area that is sized to fit inside a patient's mouth, and openings arranged on a surface of the conduit, the openings allowing substances in the vicinity of the openings to enter the conduit, and the openings, the conduit, and the coupling forming a passageway through which substances are evacuated from the patient's mouth.

16 Claims, 43 Drawing Sheets

1, 2, 3, 4 AEROSOL REMOVAL DEVICE

50 COLLECTION TUBE/SUCTION HOSE

24 COUPLING

48 SUCTION SYSTEM

FIG. 9

```
┌─────────────────────────────────────┐
│ POSITIONING AN AEROSOL REMOVAL      │
│ DEVICE HAVING AT LEAST ONE APERTURE │
│ FOR RECEIVING INTRA-ORAL AEROSOL IN │
│ OR NEAR A PATIENT'S MOUTH, A PORT FOR│─ 102
│ COUPLING TO A SUCTION TUBE, AND A   │
│ CAVITY INSIDE THE DEVICE IN FLUID   │
│ COMMUNCIATION WITH THE APERTURE     │
│ AND THE PORT                        │
└─────────────────────────────────────┘
                  │
                  ▼
┌─────────────────────────────────────┐
│                                     │─ 104
│ COUPLING A SUCTION HOSE TO THE PORT │
│                                     │
└─────────────────────────────────────┘
                  │
                  ▼
┌─────────────────────────────────────┐
│ APPLYING SUCTION ON THE PORT TO     │
│ CAUSE AEROSOL TO MOVE THROUGH THE   │
│ AT LEAST ONE APERTURE, THROUGH THE  │─ 106
│ CAVITY, AND OUT OF THE DEVICE       │
│ THROUGH THE PORT SUCH THAT THE      │
│ AEROSOL IS REMOVED FROM THE INTRA-  │
│ ORAL AREA                           │
└─────────────────────────────────────┘
```

FIG. 10

AEROSOL REMOVING
DEVICE 200

FIG. 16

DEVICES AND METHODS FOR INTRA-ORAL AEROSOL REMOVAL

PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates to aerosol removal in a dental work environment. In particular, an intra-oral aerosol removal apparatus and methods of removing aerosol are disclosed.

Description

A dental dam or rubber dam, is a thin, sheet, usually latex or nitrile, used in dentistry to isolate the operative site from the rest of the mouth. It is used mainly in endodontic, fixed prosthodontic and general restorative treatments. Its purpose is both to prevent saliva and other fluids from interfering with the dental work, and to prevent instruments and materials from being inhaled, swallowed or damaging the mouth. In dentistry, use of a rubber dam is sometimes referred to as isolation or moisture control. Some dental dams are referred to as rubber dam cheek retractors and are used to isolate the operative oral site from the rest of the mouth, and to shield a portion of the mouth or face that is near the operative oral site.

Unfortunately, the current dental dams are deficient in isolating a dentist or the patient from aerosol that is created in the oral cavity through breathing and/or splatter. Such aerosol can carry viruses and other pathogens, and thus expose dental practitioners and assistants to harmful conditions. Accordingly, what is needed is to minimize the spread of aerosol from a patient's mouth and remove it from the operative oral site such that the risk of spreading a harmful disease or condition is reduced, and to be able to remove aerosol, fluids, and/or matter ("substances") in a hands-free manner.

SUMMARY

The systems, apparatuses, and methods disclosed herein remove aerosol, fluid, and/or material from a patient's mouth to minimize the risk of spreading harmful diseases and provide a cleaner worksite for a dental or medical practitioner to work near or in a patient's mouth. While a number of different embodiments are described herein, and each of the embodiments include a number of features, it is contemplated that many of the features apply to, and can be incorporated on, several or all of the embodiments.

One innovation includes an apparatus for removing aerosol and fluid substances from inside of a patient's mouth. In one embodiment, the apparatus includes a coupling comprising a proximal end and a distal end, the distal end of the coupling having a first port configured to couple to a suction tube, the coupling further comprising an interior cavity from the proximal end to the first port, a conduit having an interior cavity, the conduit coupled to the proximal end of the coupling connecting the interior cavity of the coupling to the interior cavity of the conduit, the conduit extending to form a circumferential boundary around an area that is configured in size and shaped to fit inside a patient's mouth, or adjacent to a patient's mouth, and openings arranged on a surface of the conduit, the openings forming a pathway for substances in the vicinity of the openings to enter the conduit, and the openings, the conduit, and the coupling forming a passageway through which substances can flow from the openings through the conduit and to the first port of the coupling for evacuating the substances from the patient's mouth.

Various embodiments may include one or more additional features, or the features may be structured differently. For example, in some embodiments the proximal end of the coupling comprises a second port extending in a first direction and a third port extending in a second direction, the coupling having a passageway from the second port and the third port to the first port, wherein the conduit extends in a curved shape from the second port to the third port to form the boundary. The conduit can be a flexible structure (e.g., a flexible tube) that can conform to a patient's mouth for comfort. In some embodiments, the coupling can be formed as an integral part of the rings and barrier. In some embodiments, the alignment of the first direction and the second direction are in opposite directions. That is, the first and second port are aligned in opposite direction, such that the conduit enters, or is coupled to each port from opposite directions. In some embodiments, the alignment of the first direction and second direction are generally aligned in opposite directions, but not exactly in opposite directions. For example, in some embodiments, the alignment of the first direction and second direction are generally aligned in opposite directions plus or minus 0-5 degrees, 5-10 degrees, 10-15 degrees, 15-20 degrees, 20-25 degrees, 25-30 degrees, 30-35 degrees, or 35-40 degrees, with respect to each other. In other words, the connection between the coupling and the conduit can be at an angle (e.g., for example, where the shape formed by the conduit is oval).

In some embodiments, at least some of the openings are positioned on the surface of the conduit facing inwards towards the area surrounded by the circumferential boundary. In some embodiments, some of the openings are arranged in a pattern on the conduit. In some embodiments, openings are positioned on multiple sides of the conduit. The openings can have a variety of shape to facilitate the passage of aerosol, fluid, and/or material. In some embodiments, the openings are circular. In some embodiments, the openings are oval-shaped. In some embodiments, the openings are elongated. In some embodiments, the openings are shaped like flowers, crescent, stars, squares, etc. In some embodiments, the openings can be configured as a channel running along a portion, or the entire length of the conduit. In some embodiments, the openings may have different sizes and/or different shapes. The openings may have various dimensions to allow aerosol, fluid, and materials to flow through the openings as a result of a vacuum created inside the conduit. Although a dimension of the openings can be less than 1 mm, for example, to evacuate aerosol, in some embodiments a dimension (e.g., a width and/or a length) of the openings is equal to or greater than 1 mm and less than 9 mm. For example, a dimension of an opening may be 1 mm, 2 mm, 3 mm, 4 mm, 5 mm, 6 mm, 7 mm, 8 mm, or 9 mm, plus or minus 0.5 mm. In some embodiments, an opening may have a dimension greater than 9 mm to better allow evacuation of physical material or fluid (e.g., blood, saliva, water, etc.).

In some embodiments, the apparatus further includes at least one opening on the coupling to form a pathway from any exterior surface of the coupling to the interior cavity of the coupling. In some embodiments, the apparatus further includes a vacuum system having a vacuum tube coupled to the first port of the coupling, the vacuum system operable to produce a vacuum at the first port of the coupling, the vacuum system configured such that when it is actuated it produces a suction that causes the substances to enter the openings and flow through the conduit and the coupling and into the vacuum tube.

In some embodiments, the circumferential boundary formed by the conduit is aligned within a plane, and the proximal end of the coupling is coupled to the conduit at a 90° angle. In some embodiments, it may be beneficial for the coupling to be coupled to the conduit at an angle other than 90° to provide a better fit or comfort for some patients. Accordingly, in some embodiments, the circumferential boundary formed by the conduit is aligned within a plane, and the proximal end of the coupling is coupled to the conduit at a 90° angle, plus or minus 30 degrees, relative to the plane. In some embodiments, the coupling is curved as it extends from its proximal end to its distal end. In some embodiments, the coupling is configured in a U-Shaped curve such that the proximal end and the distal end of the coupling are aligned in the same direction, plus or minus 20° relative to each other. In some embodiments, the coupling can be T-J connector or L shaped or U shaped. In some embodiments, the coupling can be made out of a rigid or flexible material or can be made out of a material soft bendable plastic for patient comfort. In some embodiments, the apparatus further includes a second coupling comprising a proximal end and a distal end, the distal end of the second coupling having a first port configured to couple to a suction tube, the second coupling having an interior cavity that forms a passageway from the openings on the conduit through the conduit and to the first port of the second coupling. In some embodiments, the apparatus further includes at least opening on the second coupling to form a pathway from an exterior surface of the second coupling to the interior cavity of the second coupling. In opening on a coupling can be configured, for example, to have any shape for dimension as described above. In some embodiments, the apparatus further comprises an annular support ring coupled to the coupling, and a sleeve extending between the support ring and the conduit. In some embodiments, the sleeve comprises a flexible material. For example, the sleeve may comprise rubber, a flexible nonlatex material, vinyl, plastic, paper, or any type of polymer. An advantage of the apparatuses described herein is that it is a very sanitary linear flow from the mouth to the vacuum. Since the patient is not closing and suctioning on to the apparatus, for example as in a saliva ejector when a patient is asked to suck on it to empty the mouth, there is no back flow of pathogens.

Another innovation includes a method for removing aerosol and fluid substances from inside of a patient's mouth. The method comprises providing an apparatus having a coupling comprising a proximal end and a distal end, the distal end of the coupling having a first port, the coupling further comprising an interior cavity from the proximal end to the first port, a conduit having an interior cavity, the conduit coupled to the proximal end of the coupling connecting the interior cavity of the coupling to the interior cavity of the conduit, the conduit extending to form a circumferential boundary around an area that is shaped and sized to fit inside a patient's mouth (e.g., manufactured in various sizes to fit in different size mouths), and openings arranged on the conduit forming a pathway for substances in the vicinity of the openings to enter the conduit, wherein the openings, the conduit, and the coupling forming a passageway through which substances can flow from the openings through the conduit and to the first port of the coupling. A method can further include placing at least a portion of the apparatus in a patient's mouth such that the conduit is inside the patient's mouth and a portion of the coupling is outside of the patient's mouth. A method can further include providing a vacuum on the first port causing substances in the vicinity of the openings to flow into the conduit through the openings, through the conduit and the first coupling and be evacuated out of the first port. In some embodiments, the method further comprises coupling the first port to a vacuum source, and activating the vacuum source. In some embodiments of such a method, the apparatus further comprises at least opening on the coupling to form a pathway from an exterior surface of the coupling to the interior cavity of the coupling, wherein providing the vacuum on the first port causes substances, in the vicinity of the at least one opening on the coupling, to flow through the one opening and into the interior cavity of the coupling and be evacuated through the first port. In some embodiments of such a method the apparatus further comprises an annular support ring coupled to the coupling, and a sleeve extending between the support ring and the conduit. In some embodiments, the aerosol removing apparatus can be an extra oral suction device similar to the rubber dam devices described herein of the device illustrate in FIGS. 17-27.

Another innovation includes a system for removing aerosol and fluids from a patient's mouth, the system comprising an apparatus comprising a coupling comprising a proximal end and a distal end, the distal end of the coupling having a first port, the coupling further comprising an interior cavity from the proximal end to the first port, a conduit having an interior cavity, the conduit coupled to the proximal end of the coupling connecting the interior cavity of the coupling to the interior cavity of the conduit, the conduit extending to form a circumferential boundary around an area, the circumferential boundary being between 3 inches long and 15 inches long (i.e., around the circumferential boundary), and openings arranged on a surface of the apparatus, the openings forming a pathway for substances in the vicinity of the openings to enter the conduit, and wherein the openings, the conduit, and the coupling form a passageway through which aerosol and fluids can flow from the openings to the first port of the coupling for evacuation of the aerosol, fluids, and dental debris. In some embodiments, the conduit forms a closed shape that has a length dimension of between 1" and 3.5" (for example, a diameter). In some embodiments, the system further comprises a vacuum system having a vacuum tube connected to the first port of the coupling, the vacuum system operable to provide a vacuum at the first port to cause a suction at the openings to evacuate aerosol and fluids in a patient's mouth and in the vicinity of the of the openings, out through the conduit and the first port of the coupling.

Another innovation includes an aerosol removing apparatus having a plurality of holes (or slots, or any shape, or a channel), placed in a pattern or somewhat random distribution, around the perimeter of the device, that provides for suction around the entire mouth of the patient, and not just on the side where the dental procedure is being performed. The holes may be located and sized in order to optimize suction for the removal of aerosol created during the dental procedure. A cavity behind the holes creates an airflow path for the dental office suction system from the patient's mouth, through the holes, into the "toroidal" cavity, and out through the tubes to the dental office suction system. The suction system can be a free-standing system, or a micro-section system. The tubing for the dental office suction system or free-standing system, or a micro-section system, can be connected to the device at one or more locations, preferably equally distributed around the perimeter of the device.

Another innovation includes a dental dam configured to remove aerosol from an area near, or inside of, a patient's mouth. A dental dam may also be referred to herein as an aerosol removal device. In some embodiment, a dental dam comprises an aperture for receiving intra-oral aerosol, a cavity inside the dental dam, and a port for connecting to a suction tube. The cavity is in fluid communication with the aperture and the port such that a gas or a liquid that enters the aperture can move through the cavity to the port, through the port, and out of the device. A vacuum may be created in the cavity to facilitate aerosol removal when a suction tube of a dental vacuum is coupled to the port and dental vacuum is turned on. The dental dam and other embodiments described herein preferably include a plurality of apertures (or perforations). The terms "aperture" and "plurality of apertures" and "perforations" may be used interchangeably herein for ease of reference. Any reference herein to an "aperture" in an embodiment does not exclude such embodiments from having a plurality of apertures unless specifically indicated. Similarly, any reference herein to an embodiment including a plurality of apertures does not exclude such embodiments from having a single aperture, unless specifically indicated. The dental dam may further include a surface comprising the aperture. The apertures may be located on one or more surfaces of any portion of the dental dam. The dental dam may further include an inner ring and an outer ring. The inner ring and/or outer ring can include hollow tubes. The inner ring and/or the outer ring can be made from one or more components to form the "ring." In use, the inner ring is typically positioned inside a patient's mouth such that the inner ring is farther away (or distal) to a dental practitioner. In use, the outer ring is typically positioned outside of a patient's mouth such that the outer ring is closer (or proximal) to a dental practitioner. Thus, the inner ring may be referred to as being on the distal side of the dental dam (or aerosol removal device) positioned farther from the dental practitioner and closer to a patient's throat, and the term "distal" generally refers to a location closer to or towards a patient's throat. Similarly, the outer ring may be referred to as being on the proximal side of the dental dam (or aerosol removal device) and positioned closer to the dental practitioner and farther from a patient's throat, and the term "proximal" generally refers to a location farther away from a patient's throat and closer to the dental practitioner. The dental dam may further include a barrier, wherein the aperture is positioned on the barrier. The barrier may be single-layered or multi-layered to form a hollow chamber and have apertures positioned on the barrier. The barrier may include an interior surface, and the aperture is positioned on the interior surface. The dental dam may further include an outer ring, and wherein the barrier is coupled to the inner and outer ring, and the barrier extends between the inner and outer ring. The barrier can further include an outer surface, and wherein the dental dam includes one or more spacers between the inner surface and the outer surface of the barrier. In some embodiments, the dental dam can include an inner ring, an outer ring and a barrier, and the plurality of apertures are positioned on at least one of the inner ring, the outer ring, or the barrier. In some embodiments, the dental dam can include an inner ring, an outer ring and a barrier, and the plurality of apertures are positioned on all of these structures. For example, in some embodiments, the dental dam can include an inner ring, an outer ring and a barrier, and wherein the plurality of apertures are positioned on one of: the inner ring; the outer ring; the barrier; the inner ring and the outer ring; the inner ring and the barrier; or outer ring and/or the barrier. The dental dam includes a cavity (sometimes referred to as a hollow cavity) that is in fluid communication with the port and the apertures such that the cavity is connected to the port to allow aerosol to flow into the cavity through the apertures, and from the cavity to the port. The inner ring may include at least a portion of the cavity. The barrier may include at least a portion of the cavity. The outer ring may include at least a portion of the cavity. In some embodiments, the dental dam also includes a second port. The apertures can be of any size and shape (e.g., circles, slots, ovals, rectangles, flowers, stars, a channel, etc.). The apertures can positioned in various arrangements or patterns on one of the surfaces of the device. In some embodiments, the apertures are formed in a mesh (or screen) material. In some embodiments, the barrier, the inner ring, and/or the outer ring comprises such mesh material.

Another innovation of a device for removing aerosol from a patient's mouth includes an inner ring, an outer ring, a barrier extending between the inner ring and the outer ring, a cavity inside the device, at least one aperture in fluid-flow communication with the cavity, and a port in fluid-flow communication with the cavity.

Another innovation includes a method for removing aerosol from inside of, or near, a patient's mouth. The method may include positioning a device having at least one aperture for receiving intra-oral aerosol, and a port for connecting to a suction tube in or near a patient's mouth; attaching a proximal end of a suction hose to the port; and applying a suction on a distal end of the suction hose to cause aerosol to move in an airflow through the aperture, to the port, and through the suction hose such that the aerosol is removed from the intra-oral area. In some embodiments the device is a dental dam. In some embodiments, the at least one aperture comprises a plurality of apertures. In some embodiments, the apparatus is manufactured as a bi-layered dam with the same concept of conduit, couple and port which can then be attached to a rubber dam frame. The rubber dam frame can itself be made hollow with apertures or a channel and conduit and coupler and port to work individually or in conjunction with the bi-layered rubber dam. A separate suction can be applied to each one in the event that both are used together. Plugs can be supplied to close off ports not used. A ring and coupler device can be placed after a rubber dam is placed in the mouth as well. This may be separate from the rubber dam itself.

BRIEF DESCRIPTION OF THE DRAWINGS

The features and advantages of the devices and methods for intra-oral aerosol removal described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

FIG. 2A is an image depicting a new dental dam configured for removing aerosol from a patient's mouth, according to some embodiments described herein.

FIG. 2B is a cross-sectional schematic of a portion of the aerosol removal apparatus of FIG. 2A illustrating aerosol flow through perforations in the inner layer 40 and the inner ring 16 an into a cavity between the outer layer 36 and the inner layer 40 towards the port 24.

FIG. 8 is a perspective view of a fifth embodiment of an aerosol removal apparatus having a body that fits around a portion of a patient's teeth, and having one, or more than one, perforated surfaces for removing aerosol from a patient's mouth (oral cavity).

The bi-layered hollow wings with perforations towards the tongue side can act as cheek retractors with suction ports. The surface 20a with perforations can also act as tongue lifter in emergencies or during surgery to keep the tongue out of the airway. The hollowness and the perforations allow the device to be used as a sublingual drug delivery system as well. The posterior suction cups can be really useful in suctioning during dental procedures if a patient throws up while sedated. A curtain can be incorporated in the front edge of the suction cups to act as a throat pack. It can be colored or clear for better visibility to check if the patient is throwing up.

FIG. 9 is a schematic of a system for removing aerosol, the system including an aerosol removal apparatus for removing aerosol from a patient's mouth.

FIG. 10 is a method of removing aerosol from a patient's mouth.

Figure 11A:
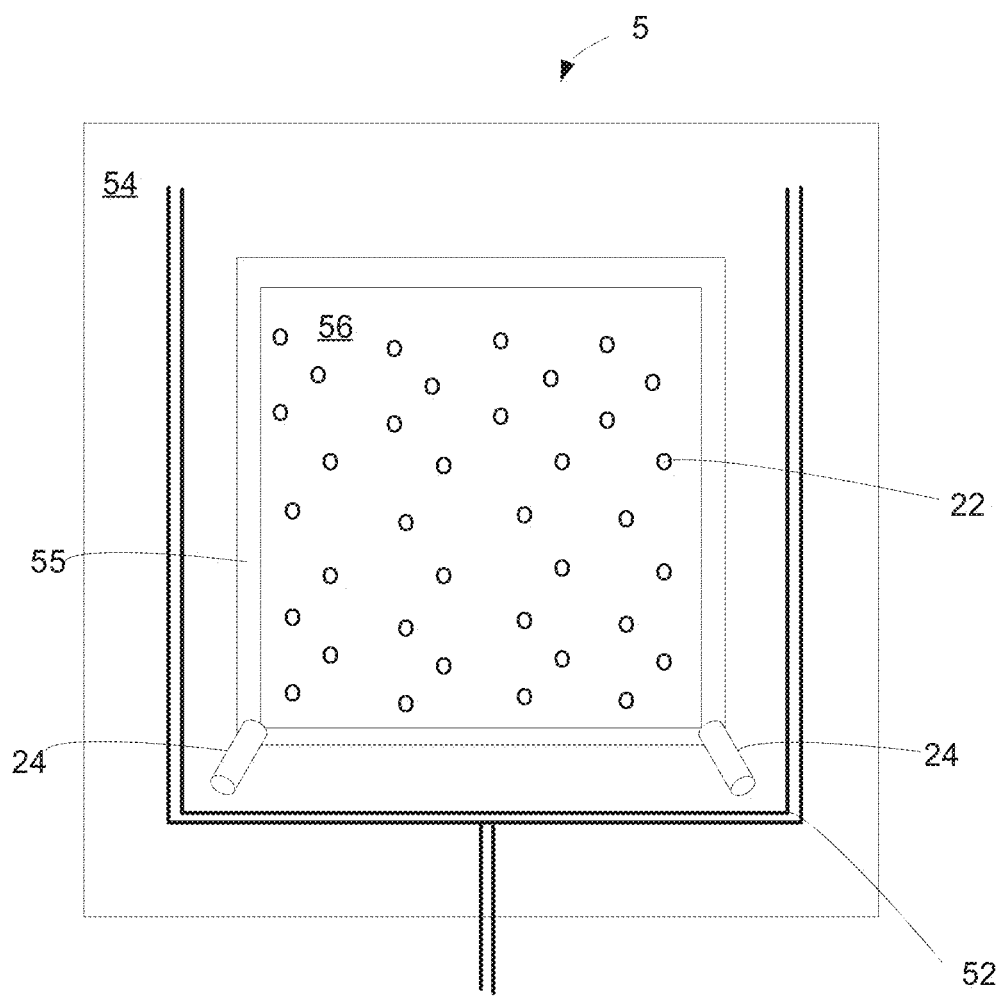

FIG. 11A is a schematic of an embodiment of another example of an aerosol removal apparatus that includes a sheet of material connected to a frame.

Figure 11B:
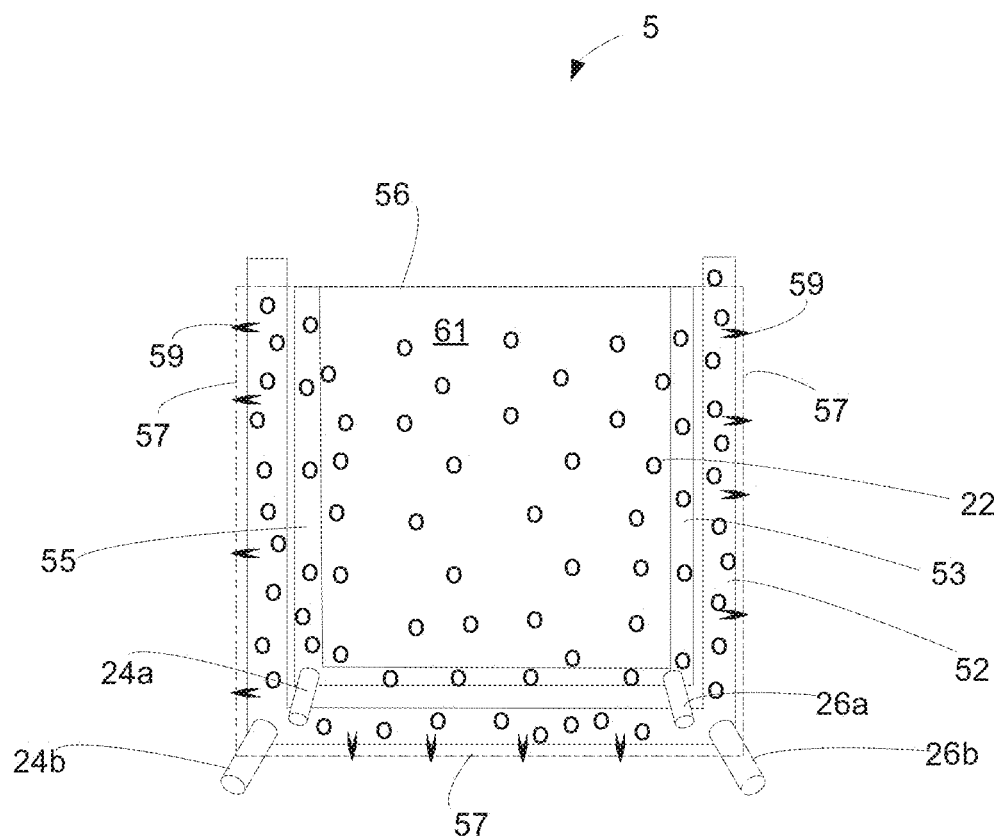

FIG. 11B is a schematic of an embodiment of another example of an aerosol removal apparatus that includes a sheet of material connected to a frame, where the frame includes a cavity, openings on the surface of the frame connected to the cavity, one or more couplings having an interior cavity connected to the cavity of the frame, and fasteners positioned along portions of the frame that are configured to hold a sheet of material (e.g., rubber, non-latex material, plastic, etc.) to the frame.

Figure 11C:
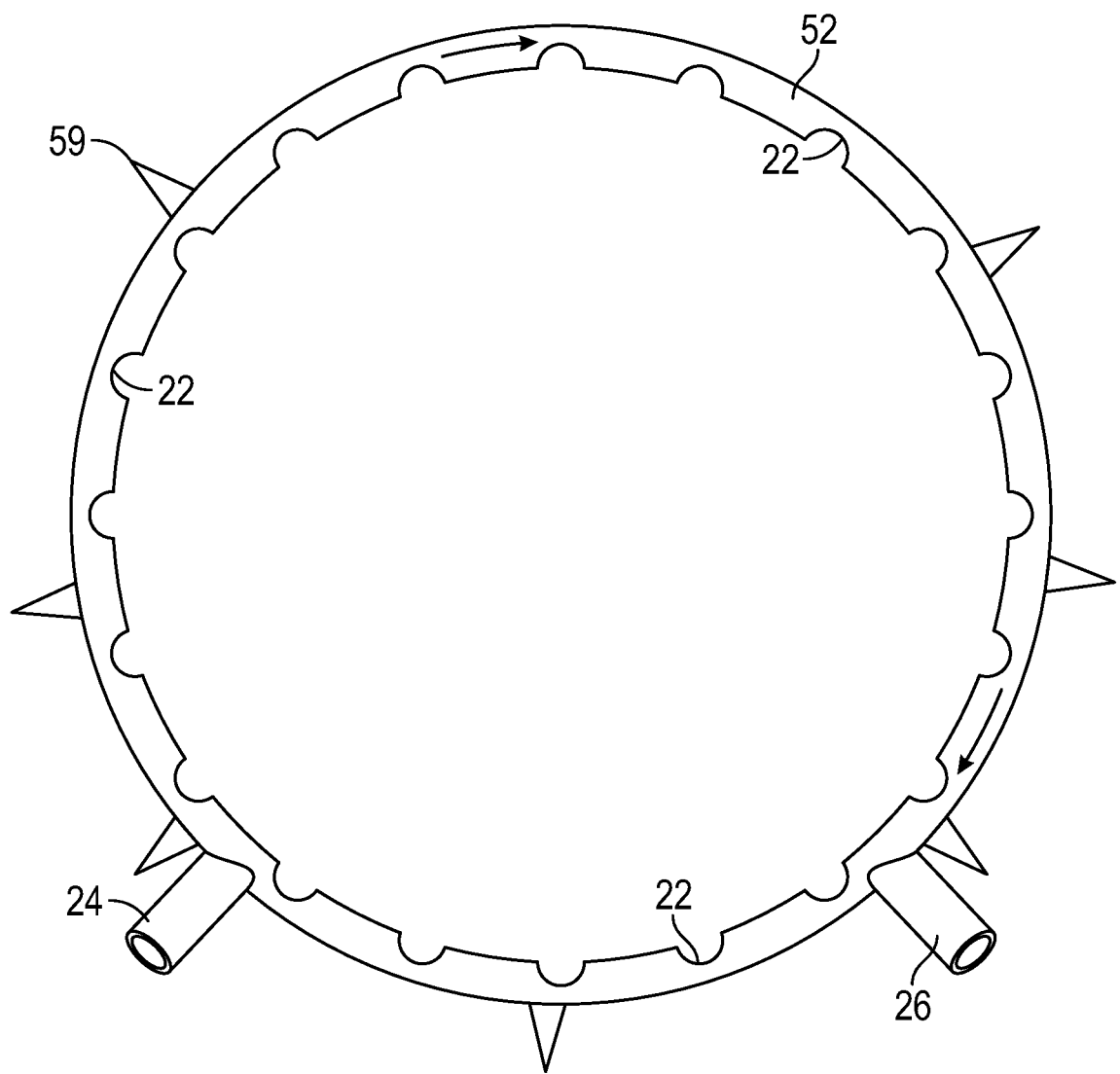

FIG. 11C is a drawing of an embodiment of another example of a frame of an aerosol removal device.

Figure 12:
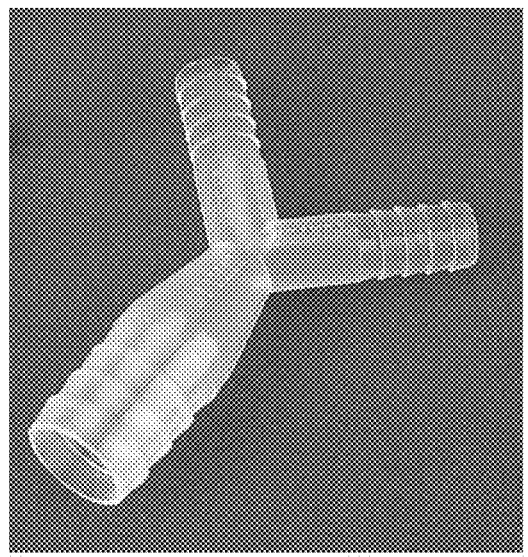

FIG. 12 illustrates an example of a "Y" coupling that can be used to connect a single suction hose to two outlets (or two ports or two couplings) of an aerosol removal apparatus to form an airflow path through a plurality of holes into a toroidal cavity through the two outlets and into a dental office suction system.

Figure 13:
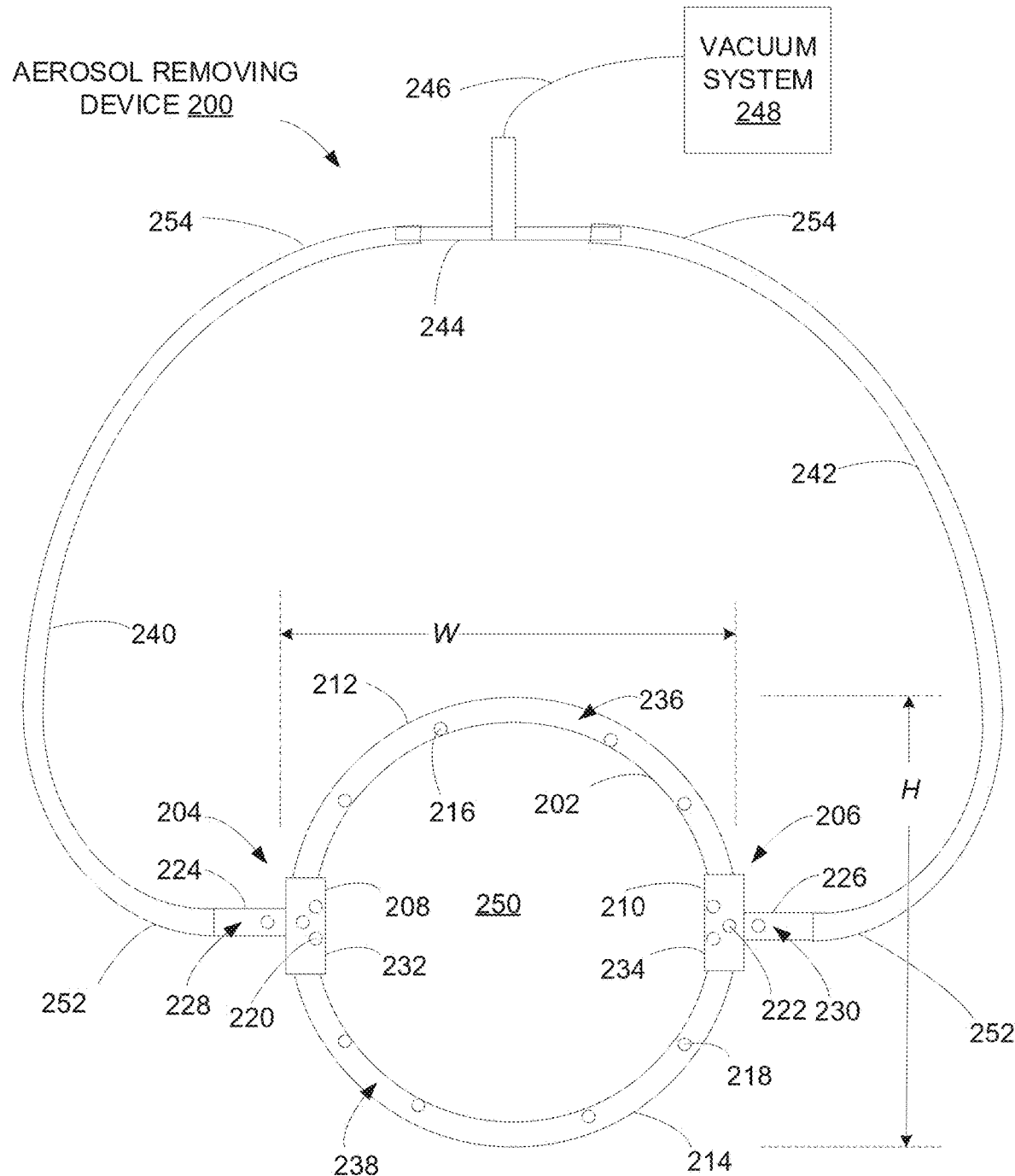

FIG. 13 illustrates a schematic of another embodiment of an aerosol removing apparatus.

Figure 14:
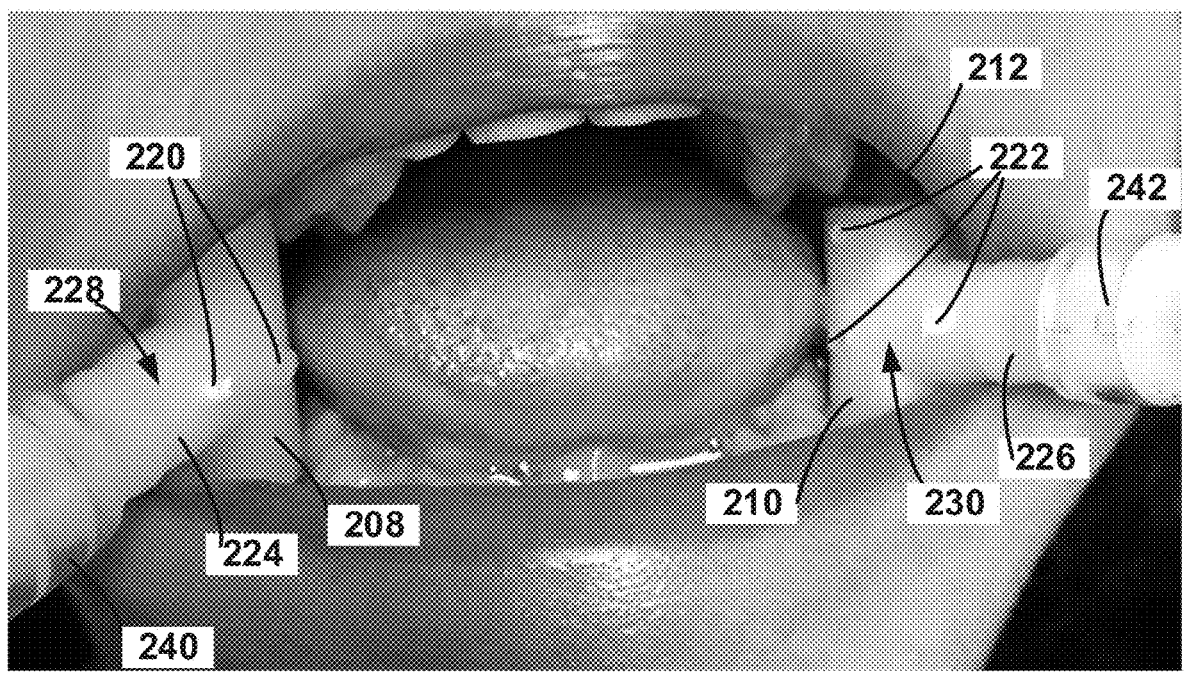

FIG. 14 illustrates an image of the aerosol removing apparatus of FIG. 13 in a patient's mouth.

Figure 15:
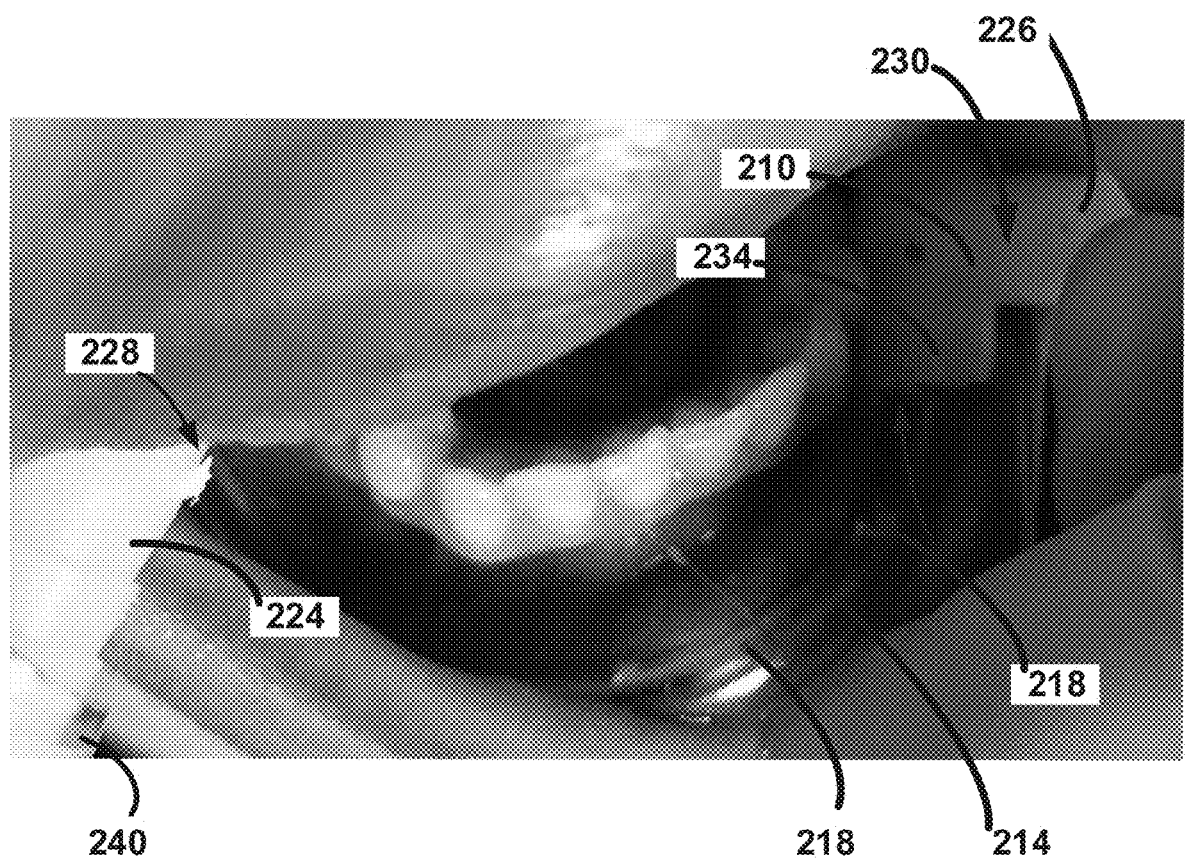

FIG. 15 illustrates an image of another view of the aerosol removing apparatus of FIG. 13 in a patient's mouth, showing the lower structure of the body positioned between a patient's lips and gums/teeth, and the left-side and right-side body T-coupler positioned on the left and right side, respectively, of the patient's mouth. The coupler can be any shape or size.

Figure 16:
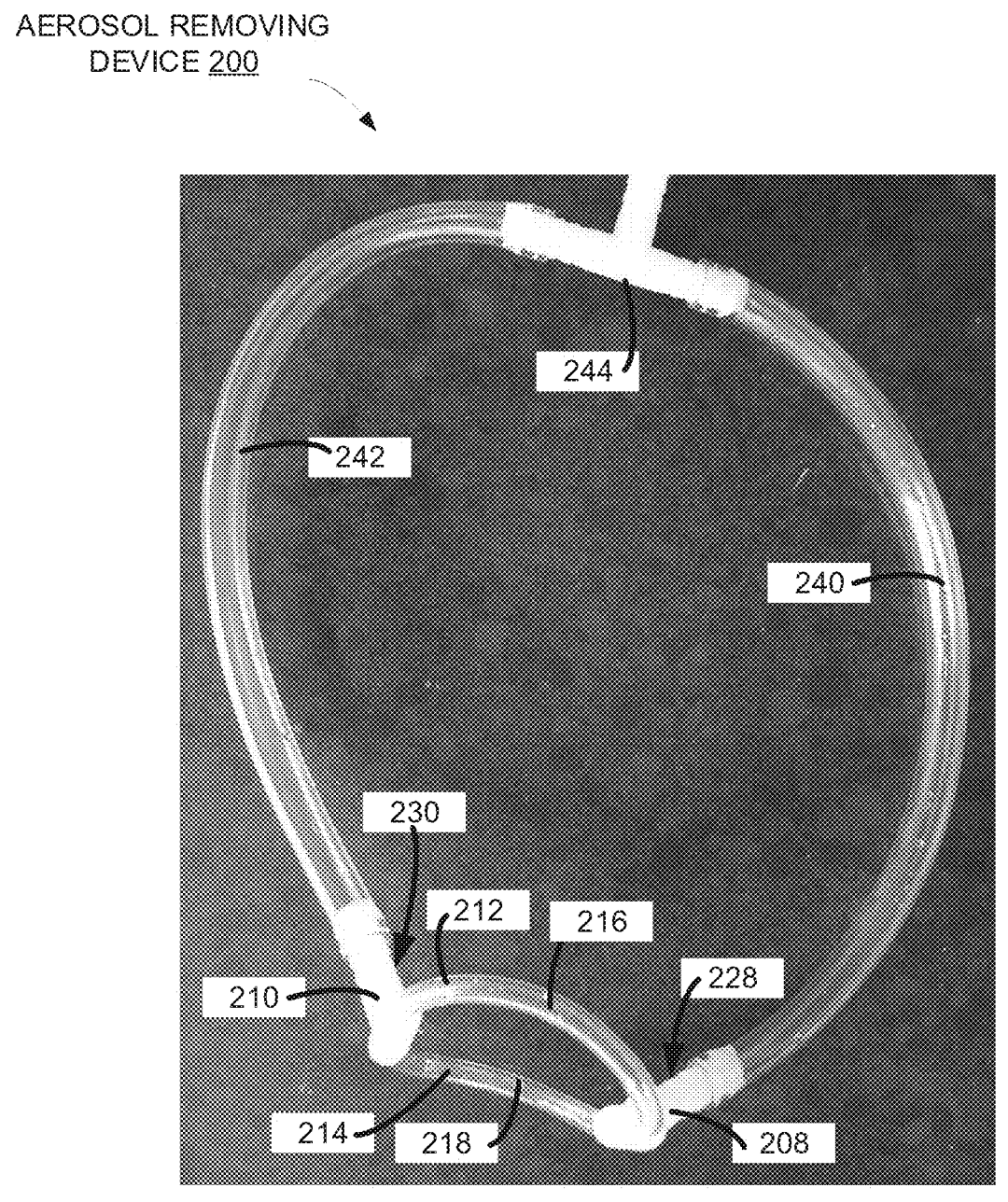

FIG. 16 illustrates an image of an example of an embodiment of the aerosol removing apparatus illustrated in FIG. 13.

Figure 17:
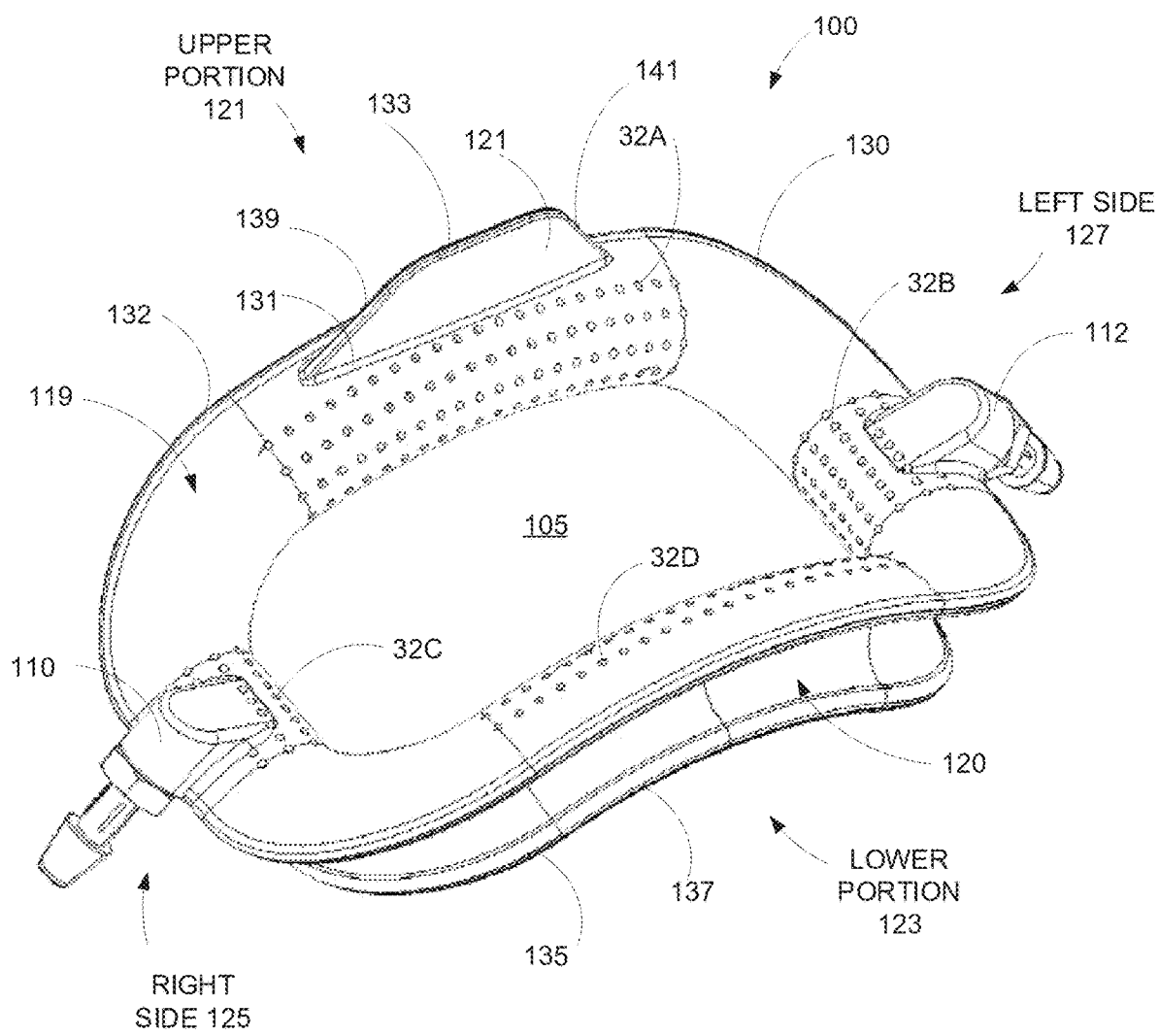

FIG. 17 is a front perspective view of an example of another embodiment of an aerosol removing apparatus. This embodiment can be configured to be intra-oral or extra-oral perimetrical suction device where the apertures feed into a toroidal cavity that when attached to a vacuum device can suction out aerosol, fluids, body fluids, dental debris etc. from the entire mouth.

Figure 18:
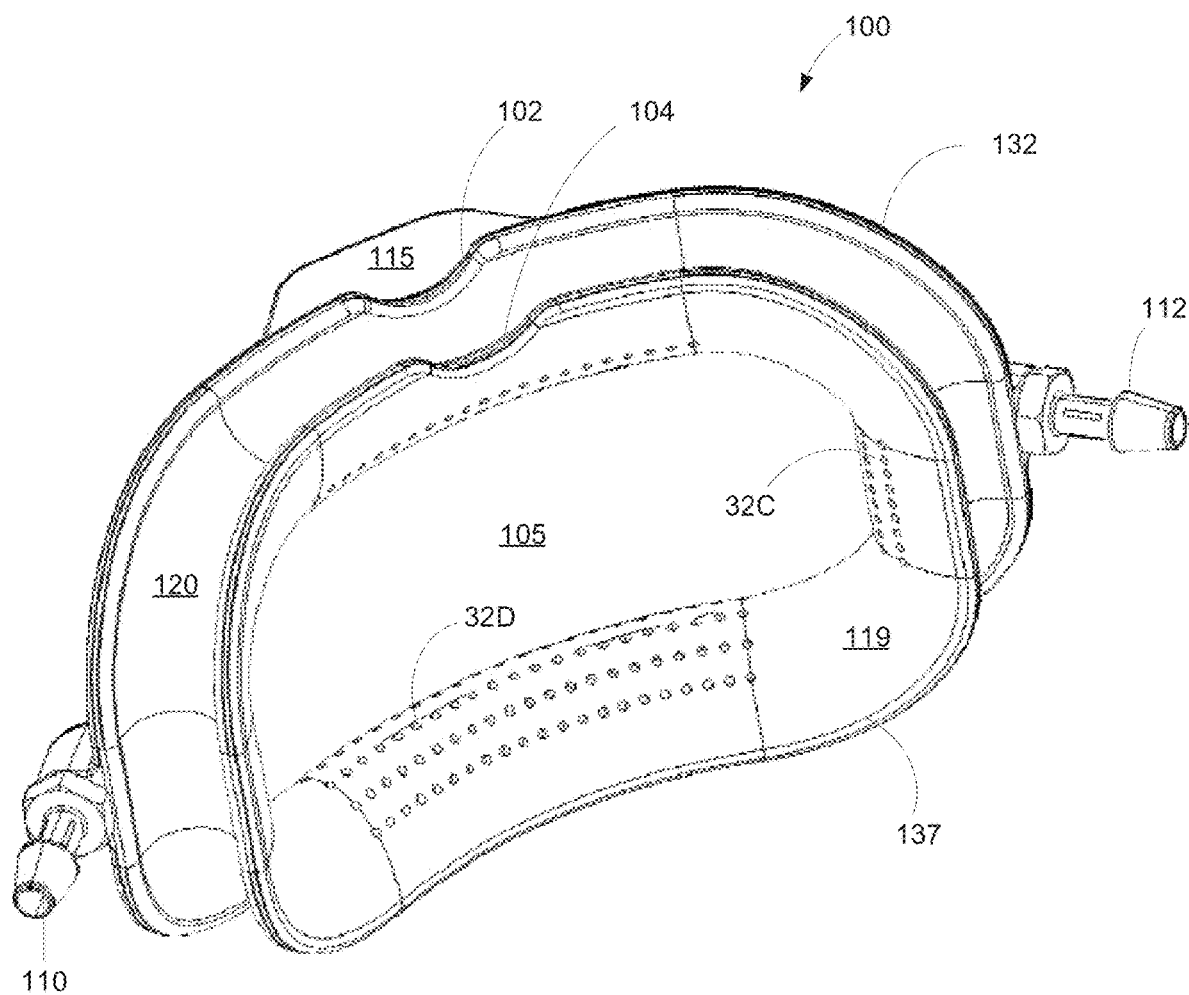

FIG. 18 is a back perspective view of the embodiment of the aerosol removing apparatus shown in FIG. 17.

Figure 19:
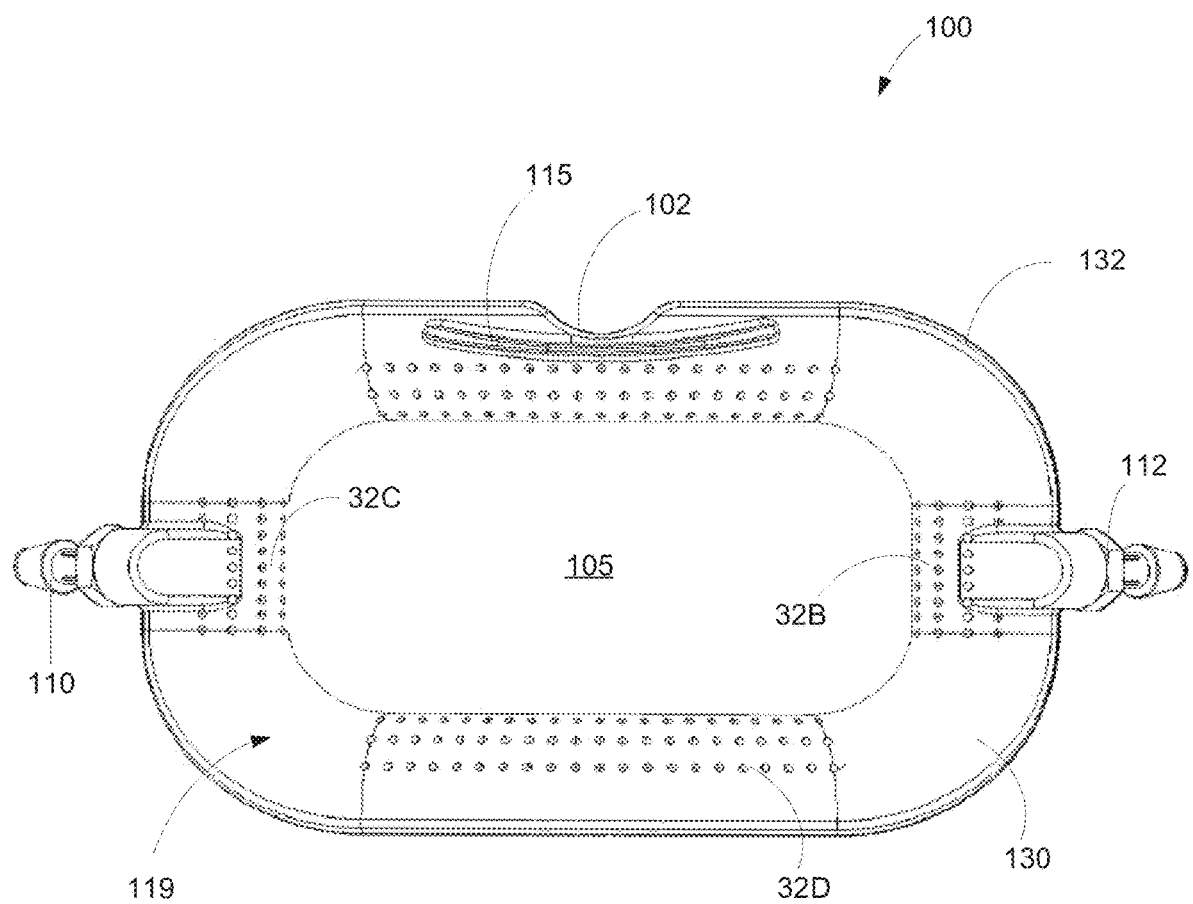

FIG. 19 is a front elevation view illustrating an example of another embodiment of an aerosol removing apparatus.

Figure 20:
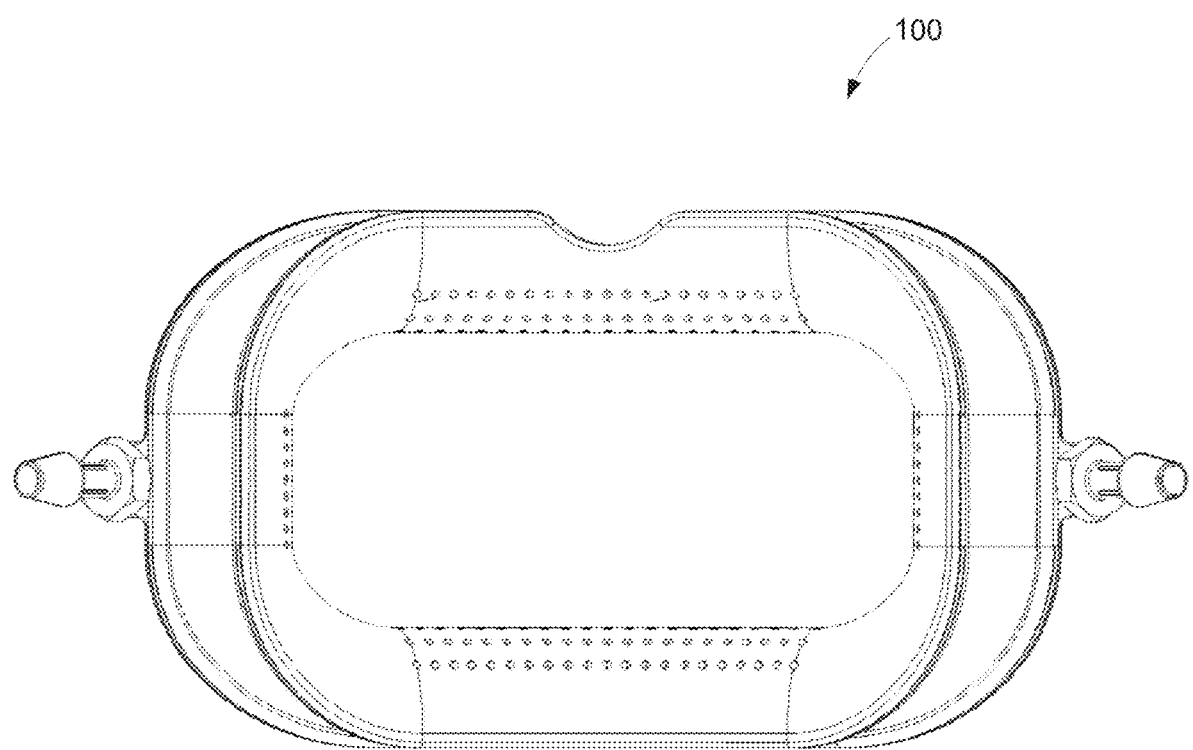

FIG. 20 is a back elevation view of the embodiment of the aerosol removing apparatus shown in FIG. 17.

Figure 21:
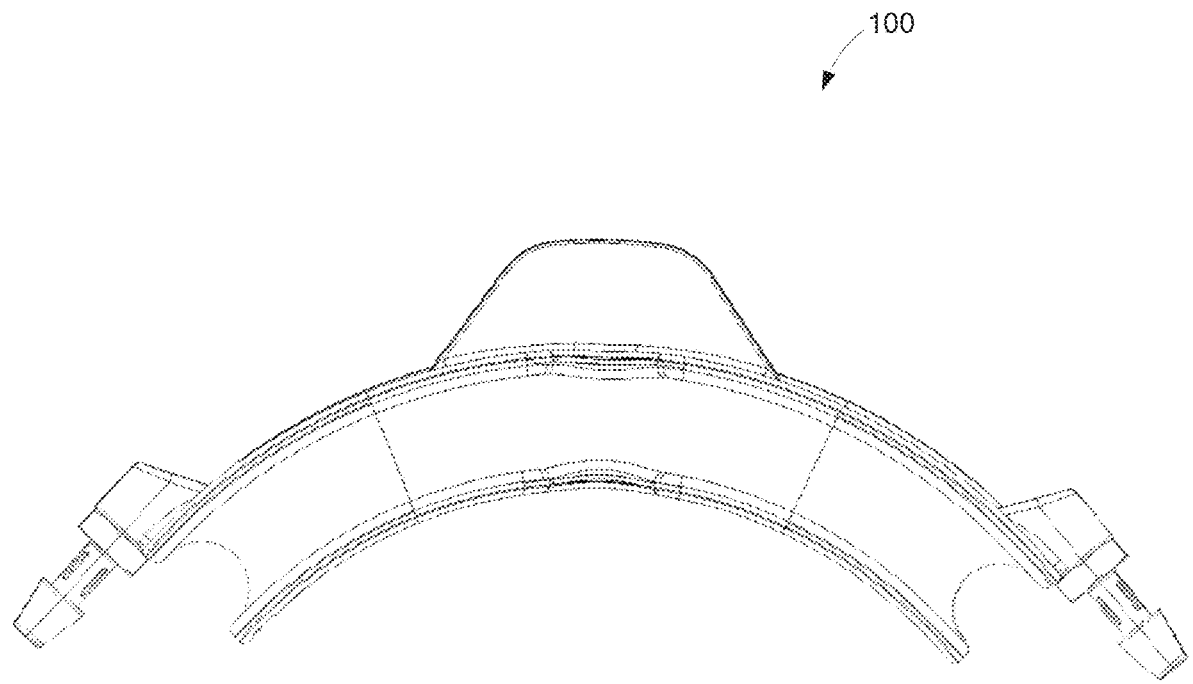

FIG. 21 is a top elevation view of the embodiment of the aerosol removing apparatus shown in FIG. 17.

Figure 22:
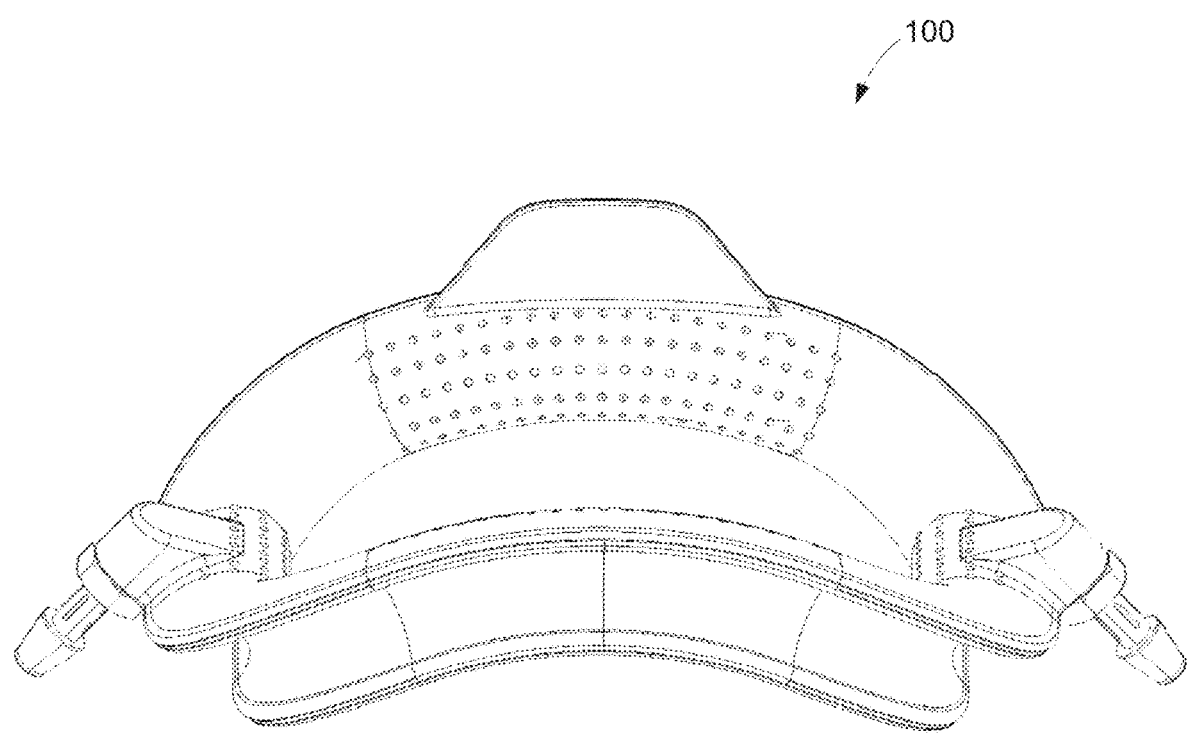

FIG. 22 is a bottom perspective view of the embodiment of the aerosol removing apparatus shown in FIG. 17.

Figure 23:
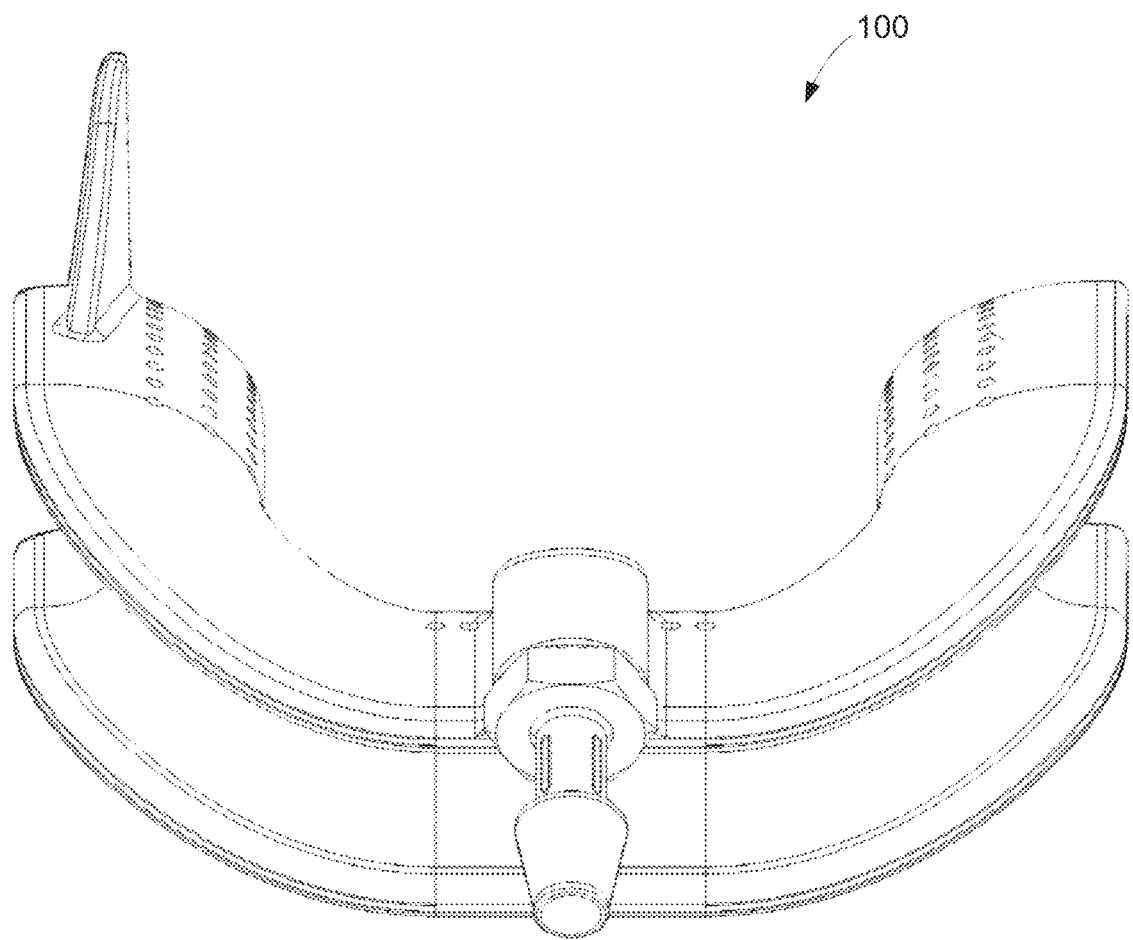

FIG. 23 is a right elevation view of the embodiment of the aerosol removing apparatus shown in FIG. 17.

Figure 24:
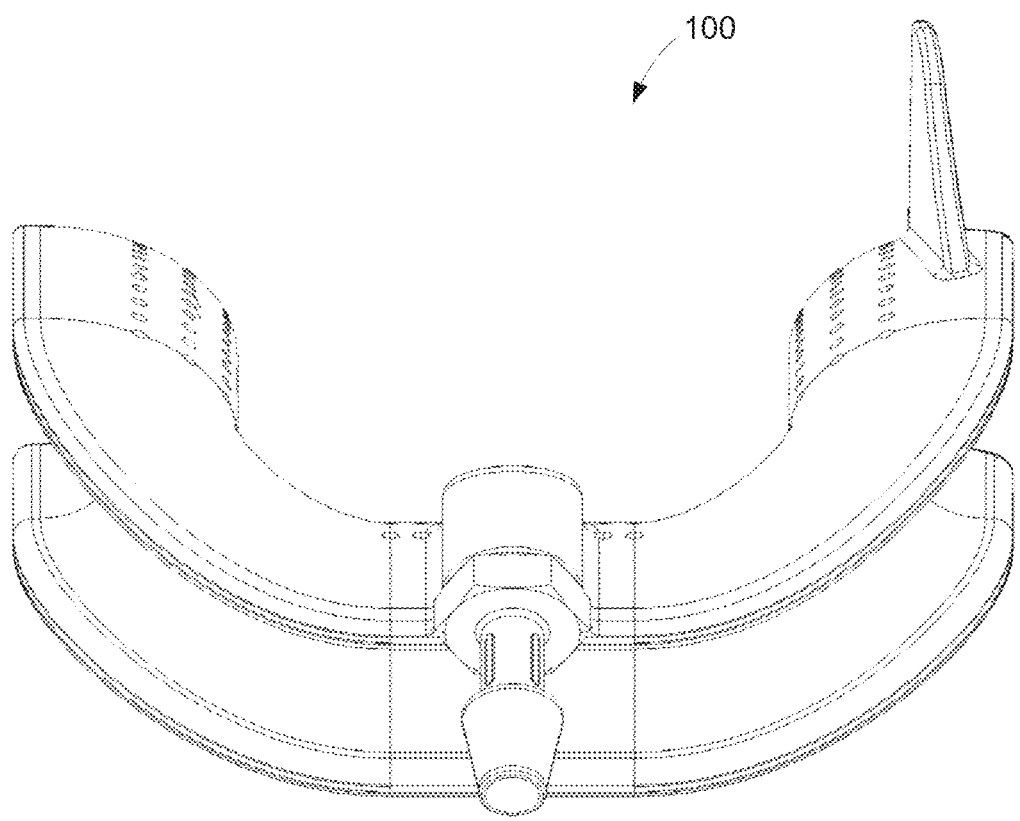

FIG. 24 is a left elevation view of the embodiment of the aerosol removing apparatus shown in FIG. 17.

Figure 25:
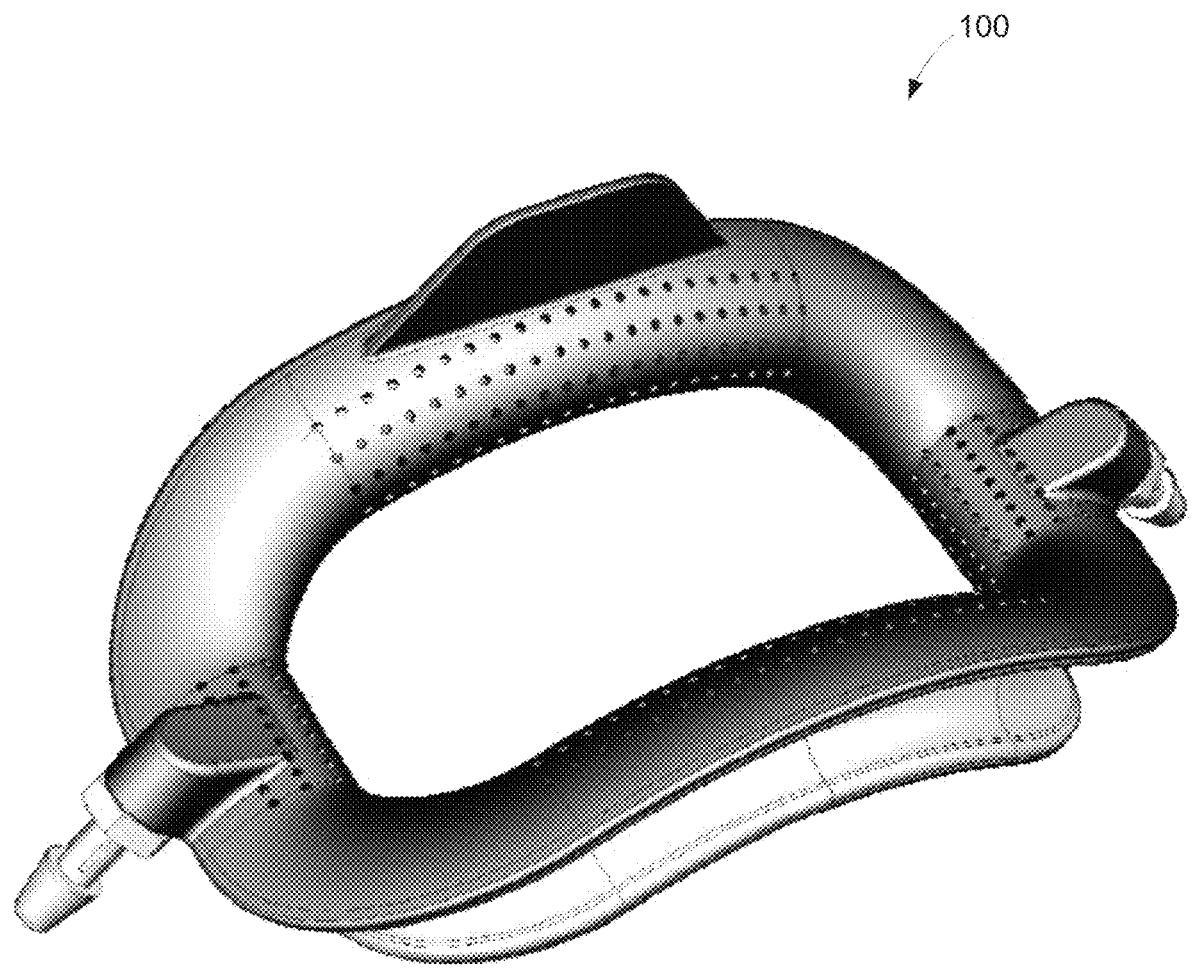

FIG. 25 is a front perspective solid view, rendered with solid surfaces, of the example of the aerosol removing apparatus illustrated in FIG. 17.

Figure 26:

FIG. 26 is a back perspective solid view, rendered with solid surfaces, of the example of the aerosol removing apparatus illustrated in FIG. 17.

Figure 27:
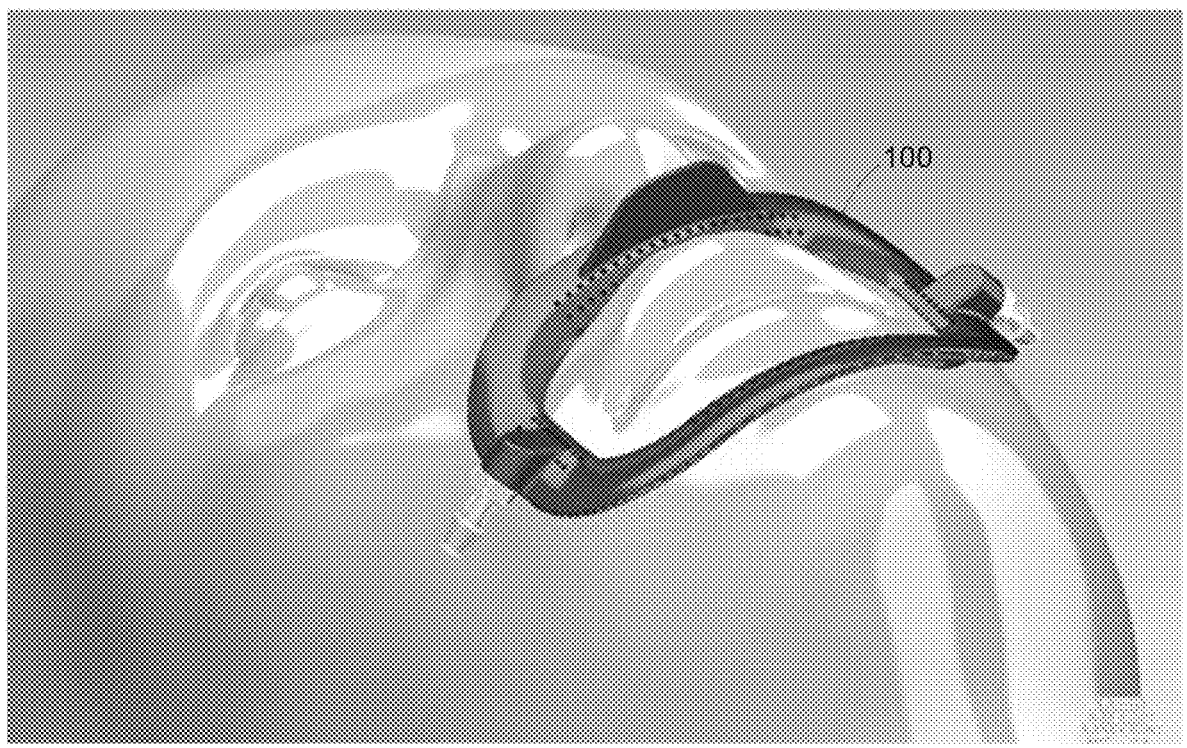

FIG. 27 illustrates a perspective view of the embodiment of the aerosol removing apparatus shown in FIG. 17 on a patient.

Figure 28:
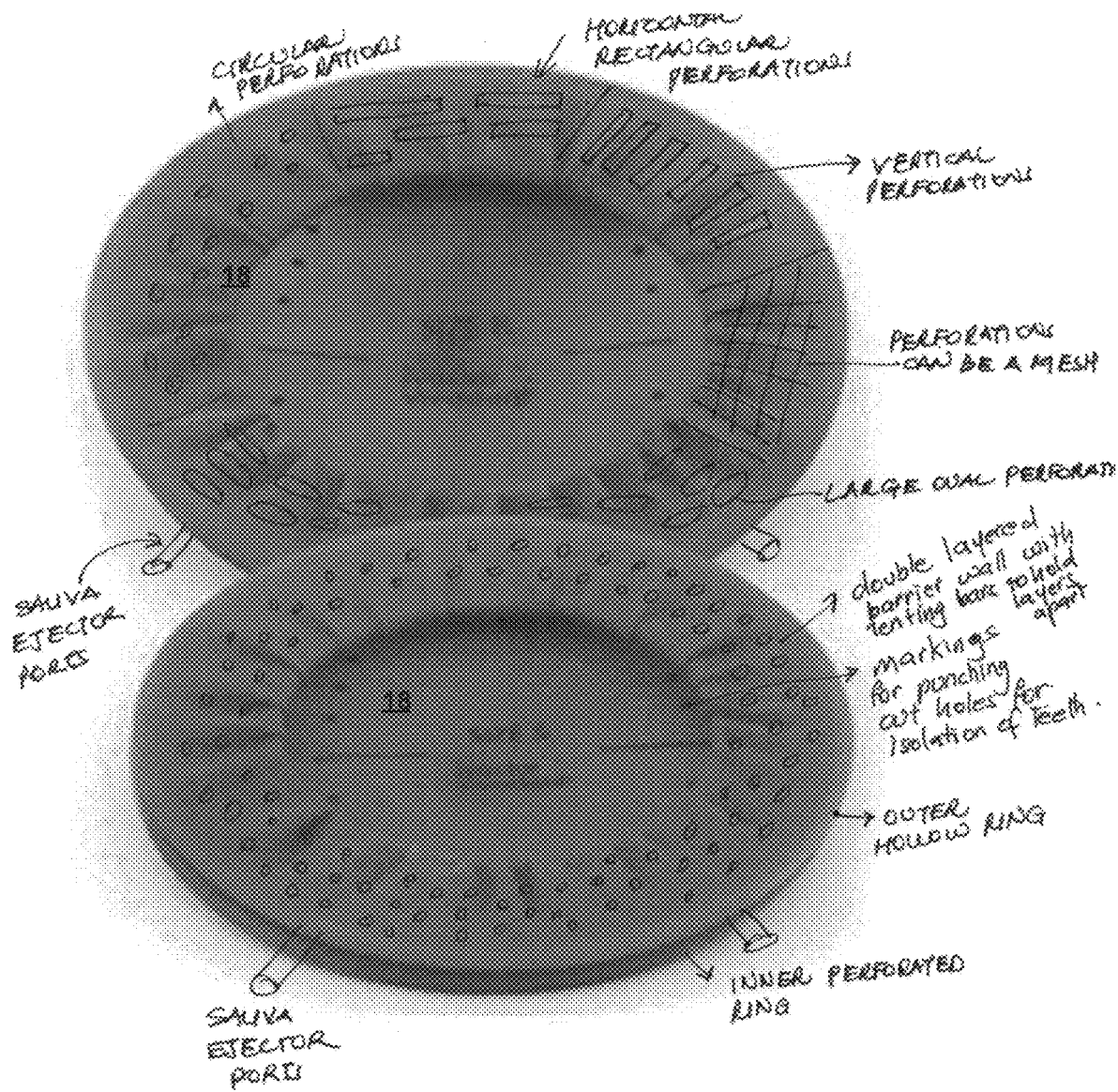

FIG. 28 illustrates pictures of dental dams that are also aerosol removing apparatus.

Figure 29:
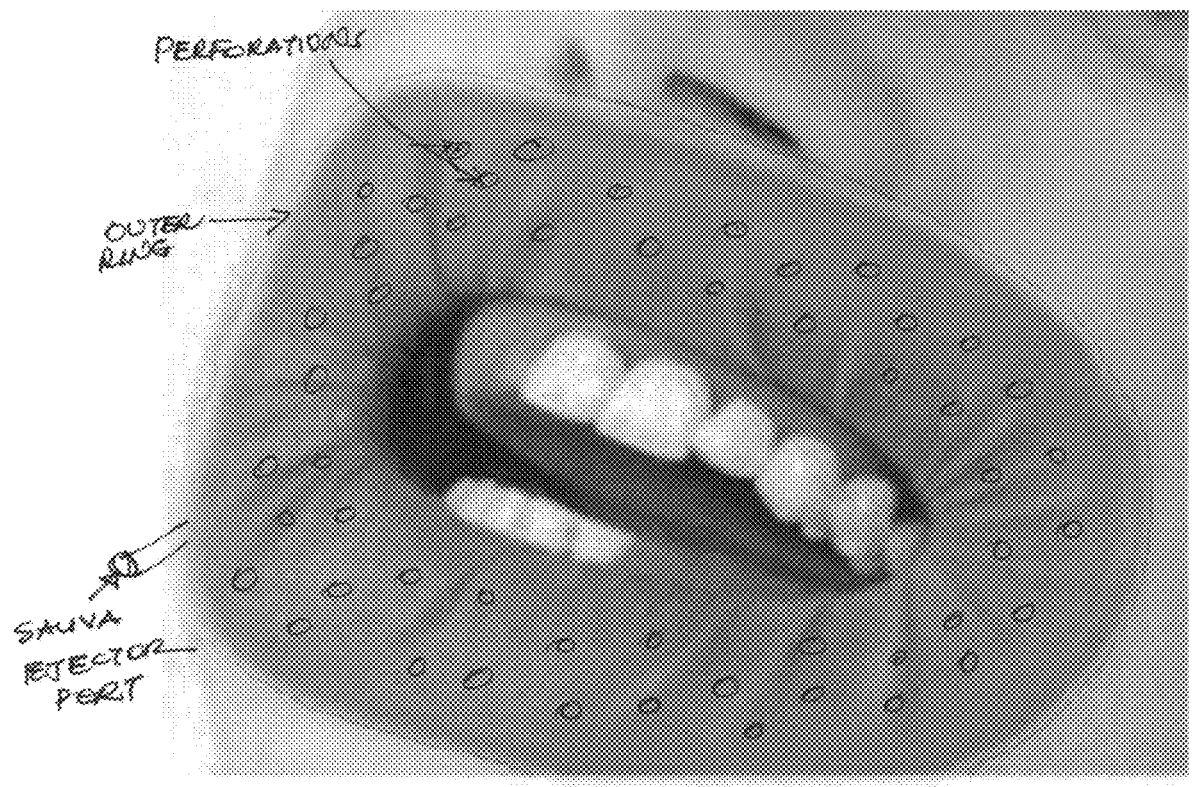

FIG. 29 is a picture of an embodiment of a dental dam that is also an aerosol removing apparatus.

Figure 30:
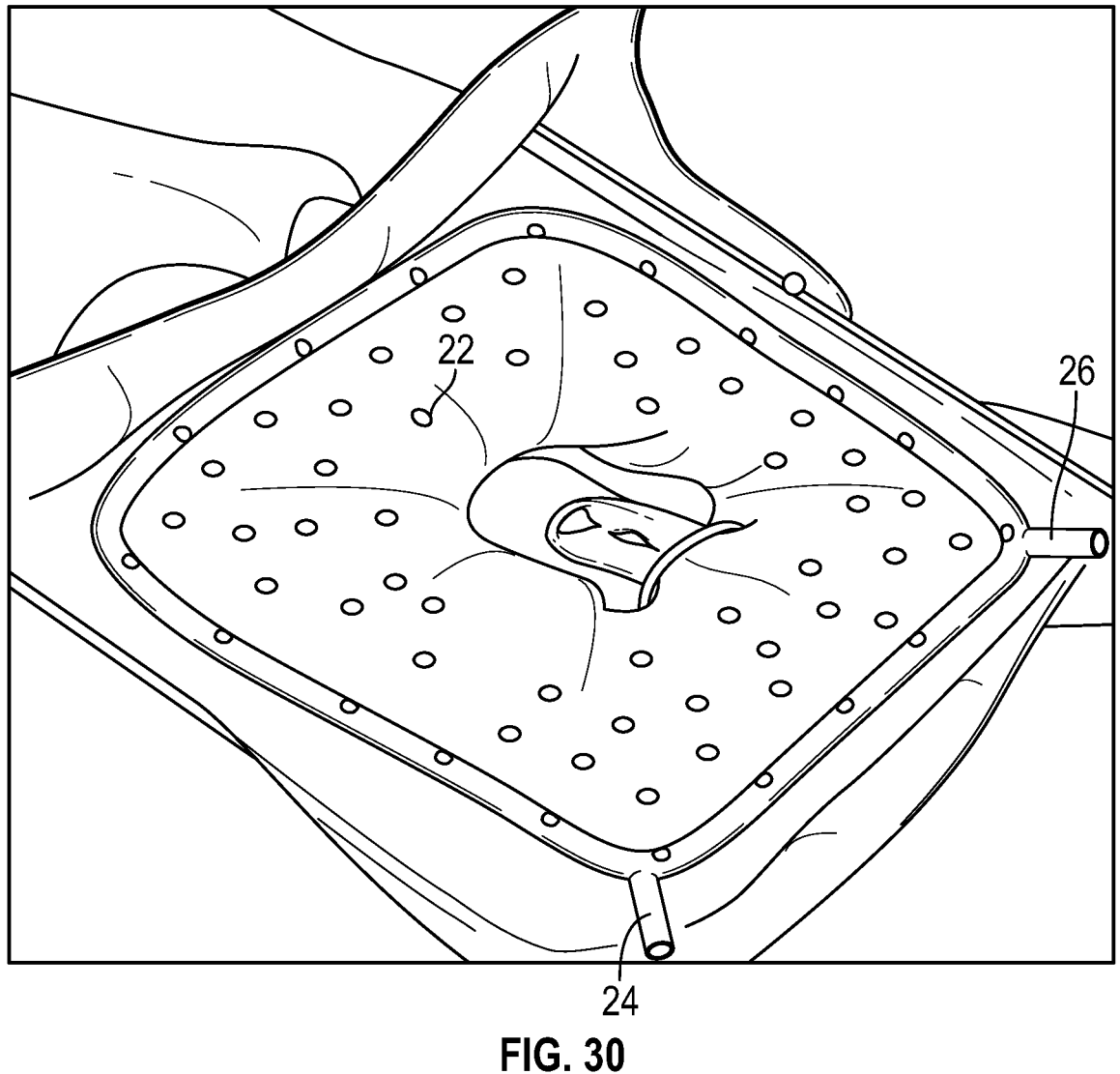

FIG. 30 is a picture of a dental dam showing an example of the aerosol removing apparatus illustrated in FIG. 11.

Figure 31:
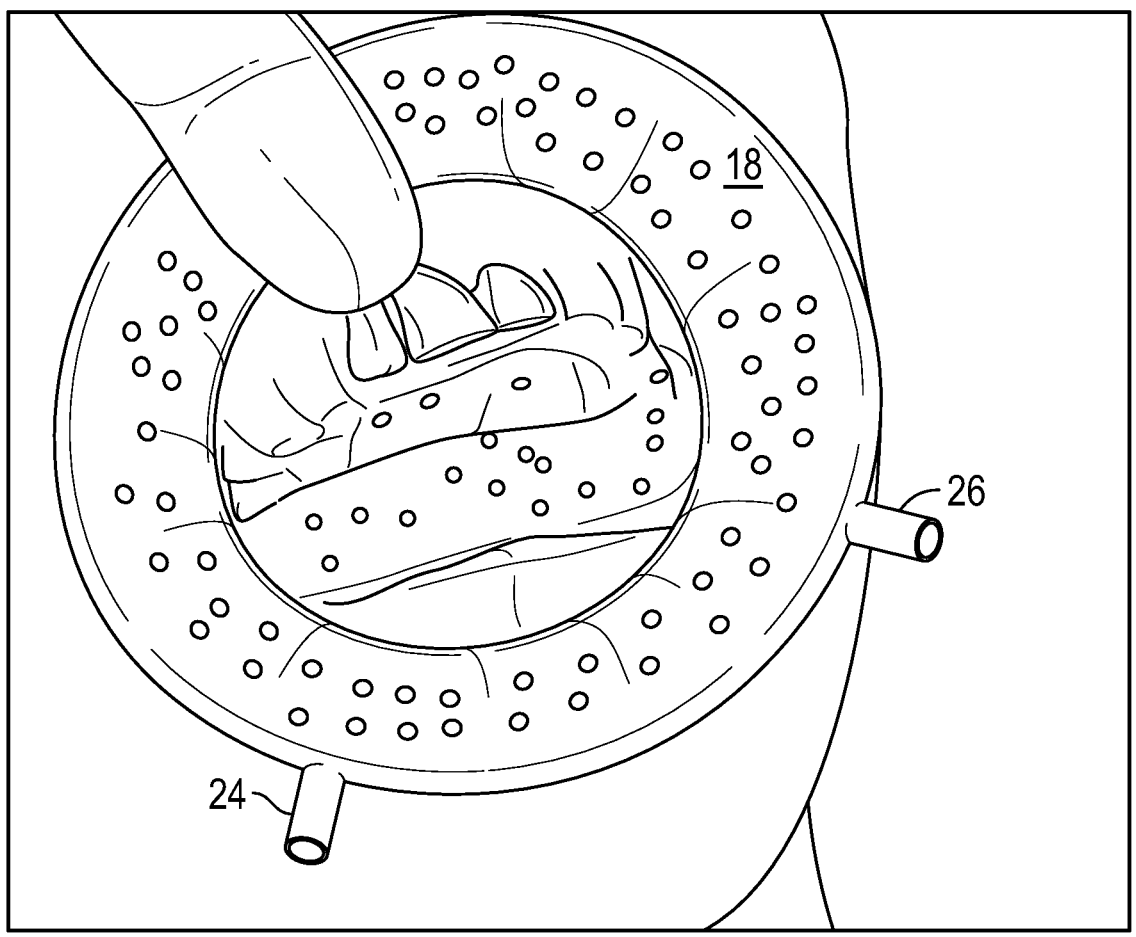

FIG. 31 is a picture of a dental dam configured to remove aerosol from an area near a patient's mouth.

Figure 32:
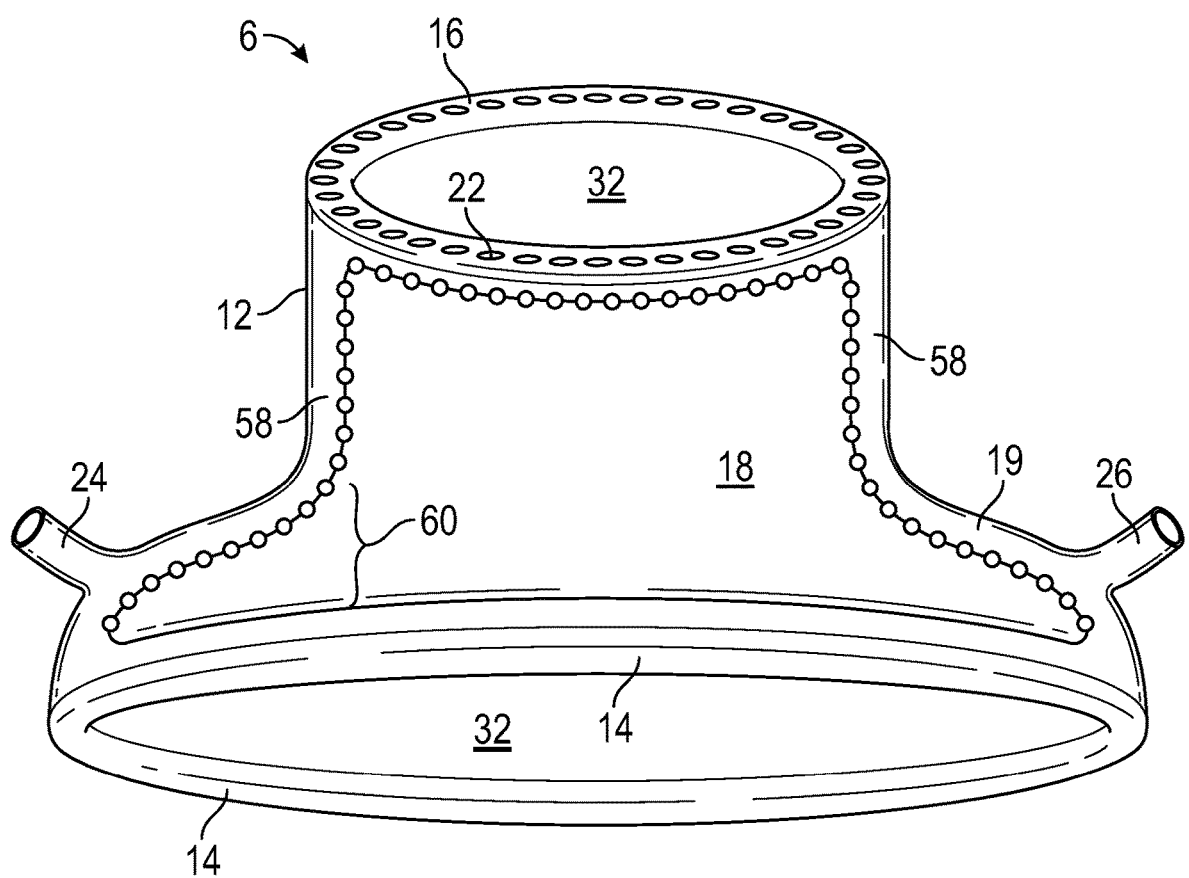

FIG. 32 illustrates another example of an aerosol removing apparatus.

DETAILED DESCRIPTION OF CERTAIN INVENTIVE ASPECTS

The following detailed description describes embodiments of devices and methods for intra-oral aerosol, extra-oral aerosol, or both intra-oral and extra-oral aerosol, removal described some of which are illustrated in the figures. These embodiments are not intended to be limiting, and various modifications, variations, combinations, etc., of the features of these embodiments are possible and within the scope of this disclosure.

The aerosol removal apparatuses described herein may be used as separate aerosol removal devices or configured to be dental dams. In some embodiments, the devices may be used for any procedure where it is desirable to remove aerosol in or around the oral cavity. Any of the aerosol removal apparatuses described herein may be connected to one or more machines that produces a vacuum in the line, the line being connected to the aerosol removal apparatus. An aerosol removal apparatus may include a body that includes one or more apertures (or perforations) for receiving aerosol, a cavity (a hollow portion of the body), and a port structure for attaching a suction tube to the body. Any of the embodiments described herein can also be connected to a microsuction system that is integrated into the aerosol removing device. The plurality of perforations may be positioned on any suitable portion of the body. Some embodiments of the dental dam include an inner ring, and outer ring, and a barrier that extends between the inner ring in the outer ring. Some embodiments of the dental dam include an inner ring and coupling. At least a portion of the body includes the cavity to facilitate collection of the aerosol. The perforations, the cavity, and the port structure are all in airflow communication such that a suction applied to the port structure sucks aerosol, that is near the device, through the perforations and into the cavity, and then through the port structure and into the suction tube. The apertures may be of various sizes and shapes (e.g., slots, circles, ovals, etc.). The apertures may be shaped, sized, and arranged on the body to maximize efficiency for a particular implementation. In some embodiments, the perforations can be made from a mesh structure.

A number of methods can be practiced using the apparatuses described herein for use in the dental work environment to remove aerosol, blood, saliva, other body fluids, dental debris etc. using such intra-oral or extra-oral devices that gives full perimetrical suction. The device may have a single aperture or a plurality of apertures (or slots or apertures of any size or shape maybe stars, flowers, or even a channel). The apertures may be placed in a pattern or somewhat random distribution around the perimeter of the device. The device can be mounted either in the mouth or extra-orally and provides hands free suction for the entire mouth not just the area where the dental procedure is being performed. The apertures/channel can be located and sized in order to optimize suction for the removal of aerosol etc. created during dental procedure. A cavity behind the apertures creates and airflow path for the dental office suction system (HVE or saliva ejector or both) from the patient's mouth, through the apertures into the 'toroidal cavity' and out through the tubes to the dental office suction system or a free standing vacuum system when it is turned on. The tubing for the dental office suction system can be connected to the device at one or more locations, preferably but not necessarily equally distributed around the perimeter of the device. The methods and apparatuses provide one or more advantages. For example, no suck back and cross contamination—patient's are not sucking on the device like they do in a saliva ejector. The device can mount intra/extra-orally and it stays in place so it allows free hands for the dental assistant and takes the focus away from suctioning to pay more attention to other aspects of assisting during a dental procedure. This also reduces the need for multiple dental assistants for a dental procedure. The apparatuses can be attached to multiple suctions for better control of aerosol. Also, there is minimal potential for causing suction trauma because the ports and apertures are away from the soft tissue. An untrained dental assistant can inadvertently suction the cheeks tongue etc. but with these apparatuses no suction training is necessary for dental assistants because the suctioning happens on it's own when the device is mounted and the vacuum is turned on. In addition, these apparatuses improve visibility during a dental procedure because of better isolation, suction and retraction, and better isolation increases the predictability of dental bonding procedures. Also, there is less patient gagging because of better suctioning ability, and more versatile and more predictable suctioning and allows dental operator to work in any area of the mouth with comfort. The apparatuses may reduce the need for a extra-oral dental suction device which is very inconvenient and noisy, hence better sound control and pathogen control for better patient management. The apparatuses are safer for dentist and other dental personnel because of efficient reduction of air borne and blood borne pathogens in the dental environment. And Finally, dental hygienists generally work alone, so it is very unsafe for them to use ultrasonic devices while they are debriding the mouth. A hands free aerosol removing device would be a perfect compliment for their services. The devices (for example, the device of FIG. 8, can be used in emergency situation for sublingual delivery of medications, the device being hollow can be filled with meds, apertures can be created to deliver meds to the floor of the mouth for absorption through the sublingual vessels. This embodiment can also be used for example during sedation dentistry. The sublingual portion will lift the tongue and keep it out of the airway while suctioning is happening all around the mouth. The suction cups in the distal end of the apparatus will keep the airway clear if the patient throws up while sedated. A clear barrier that can be incorporated at the front end of the suction can act as a throat pack and also because it is clear, airway can be monitored thus being very mindful of managing the airway for pediatric and adult patients in the dental office or in a hospital setting.

In some embodiments, the aerosol removal apparatus forms a funnel shaped aerosol ejector for better control and isolation from lips, cheek and tongue using a connected suction tube. For example, the outer ring may have a larger diameter than the inner ring such that the device has a funnel shape, narrowing as it extends from the outer ring to the inner ring. This serves as a dual-purpose isolator and aerosol trap. The greatest advantage is that it is hands free and mounts itself using the existing rings that are also vacuum tubes. In some embodiments, a suction tube may be attached to the existing high-volume evaluator with a connector or to the saliva ejector. Silicones or other materials of various durometer can be used to achieve the necessary outcome in the manufacturing process. In some embodiments, the aerosol removal apparatus includes a wire-frame structure and further includes a double-layered material mounted on the wire-frame. An example of such a device is illustrated in FIGS. 11 and 30. The double-layered material may be, for example, rubber or a non-latex material, and include perforations on at least a portion of a surface.

Various embodiments can include multiple exit ports to facilitate the saliva ejector attachment and/or an HVE or other suction device. One or multiple ports at the same time depending on operator preference regarding visibility, fluid control need and access. The disposable device can be supplied with plugs to plug off the ports not in use. Multiple ports also allow for multiple attachments of suctions for better aerosol removal. The posterior suction is to evacuate the water and oral fluids from the oropharynx. The device can be very useful in dental procedures as well as for safety during general anesthesia. The sublingual suction can also lift the tongue so as to keep it off from the airway during surgery. The device can be held in place with dental floss or rubber stretchable thin ropes if the need be when teeth are present. A very thin clear curtain can be incorporated on the front edge of the posterior tubes as a throat pack for added safety during dental or general surgery procedures (for example, the posterior suction cups 23 illustrated in FIG. 8). Thin so that it can be perforated in case a patient throws up and clear so we can see the back of the throat. The posterior funnels can be made such that they can be disconnected and reconnected securely to be large or small depending on patient need (gagging related) and operator need. The whole device is a tube through which water and oral fluids can be suctioned off and aerosol splatter can be markedly reduced at the source.

In various embodiments, upper perforated device can be connected to the lower device in the vertical back suction tube and held down with dental floss (when teeth are present) or can be held in the vestibule for edentulous patients. The entire upper device can be perforated for better suctioning capability.

Figure 1A:
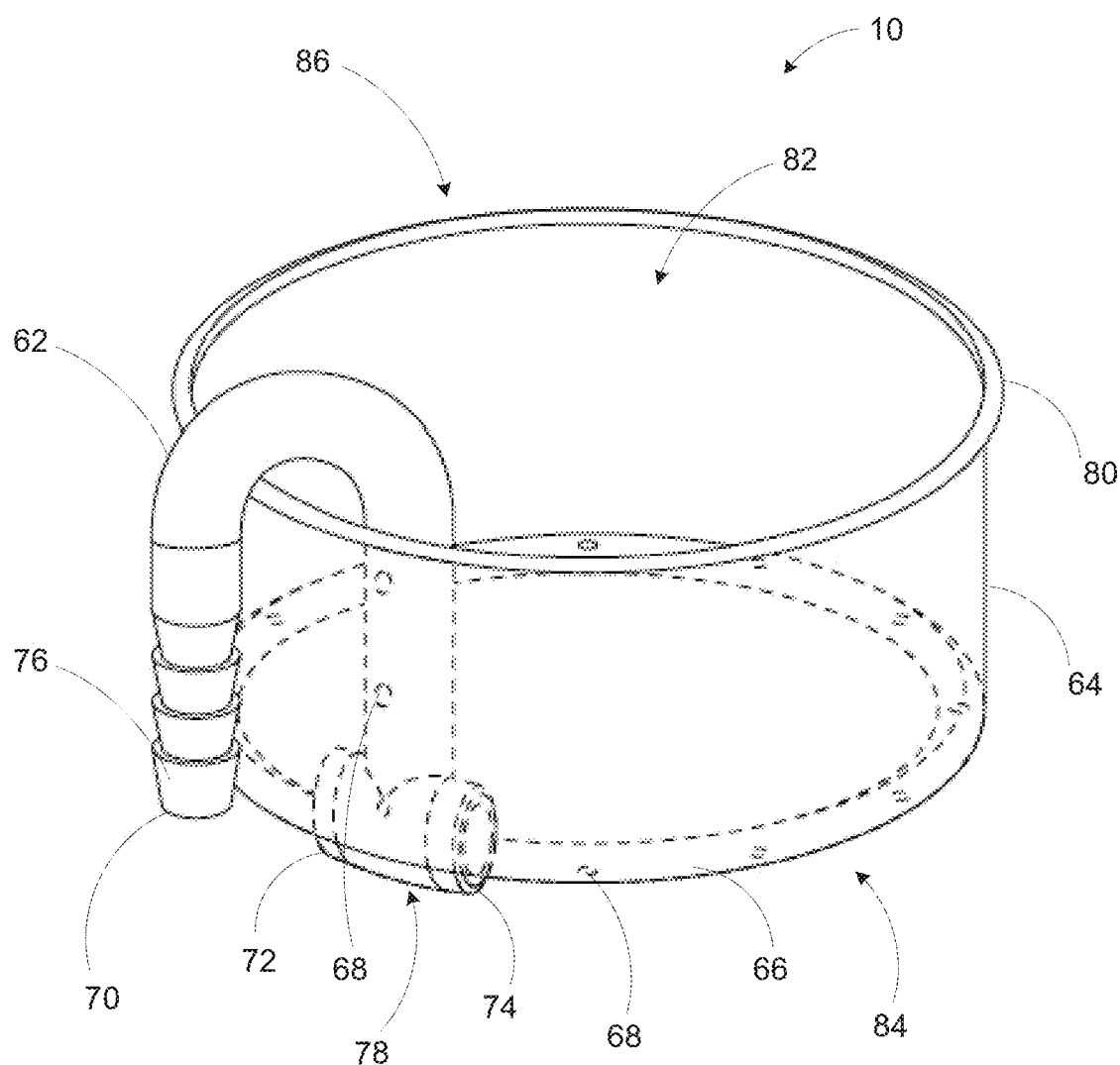
FIG. 1A is a perspective view illustrating an example of an apparatus for removing aerosol, fluid, and or material (which may be referred to herein for ease of reference as an aerosol removing/removal apparatus or aerosol removing/removal device), according to some embodiments. In this example, the aerosol removing apparatus includes one coupling.
Figure 1B:
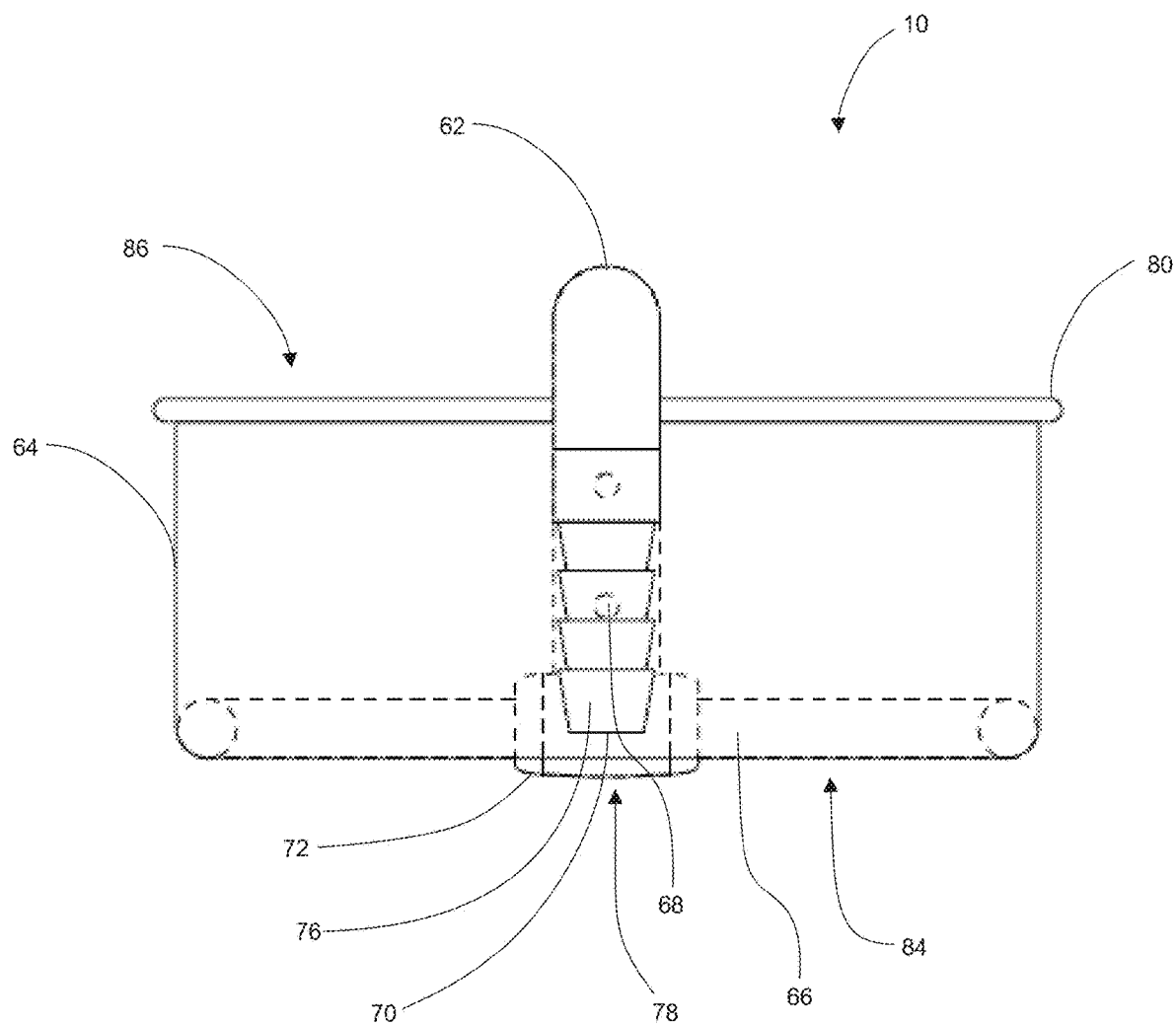
FIG. 1B is a side elevation view of the aerosol removing apparatus illustrated in FIG. 1A, where the coupling is centered on the apparatus in this view.
Figure 1C:
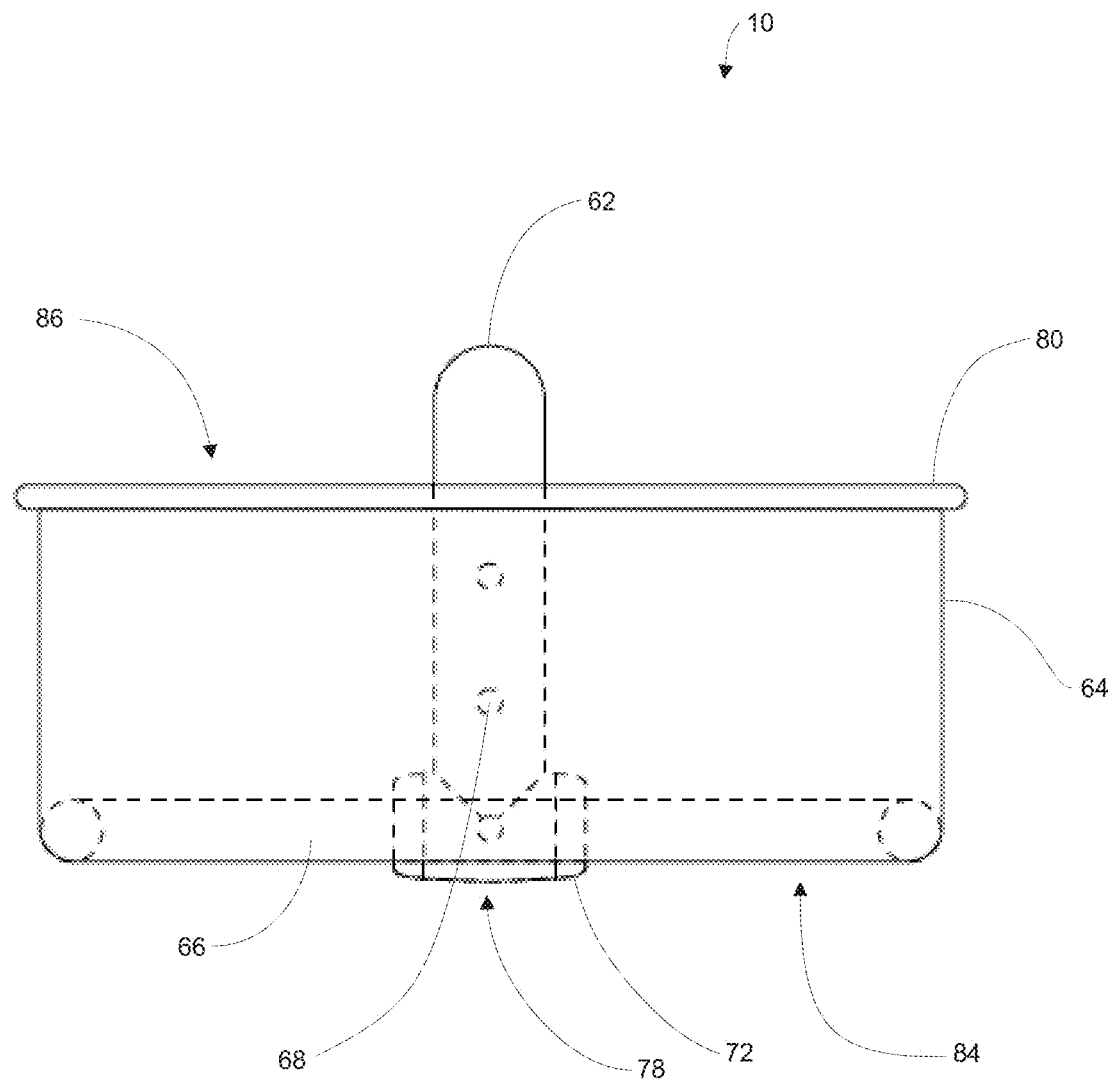
FIG. 1C is a side elevation view of the aerosol removing apparatus illustrated in FIG. 1A, illustrating the side opposite of the side shown in FIG. 1B.
Figure 1D:
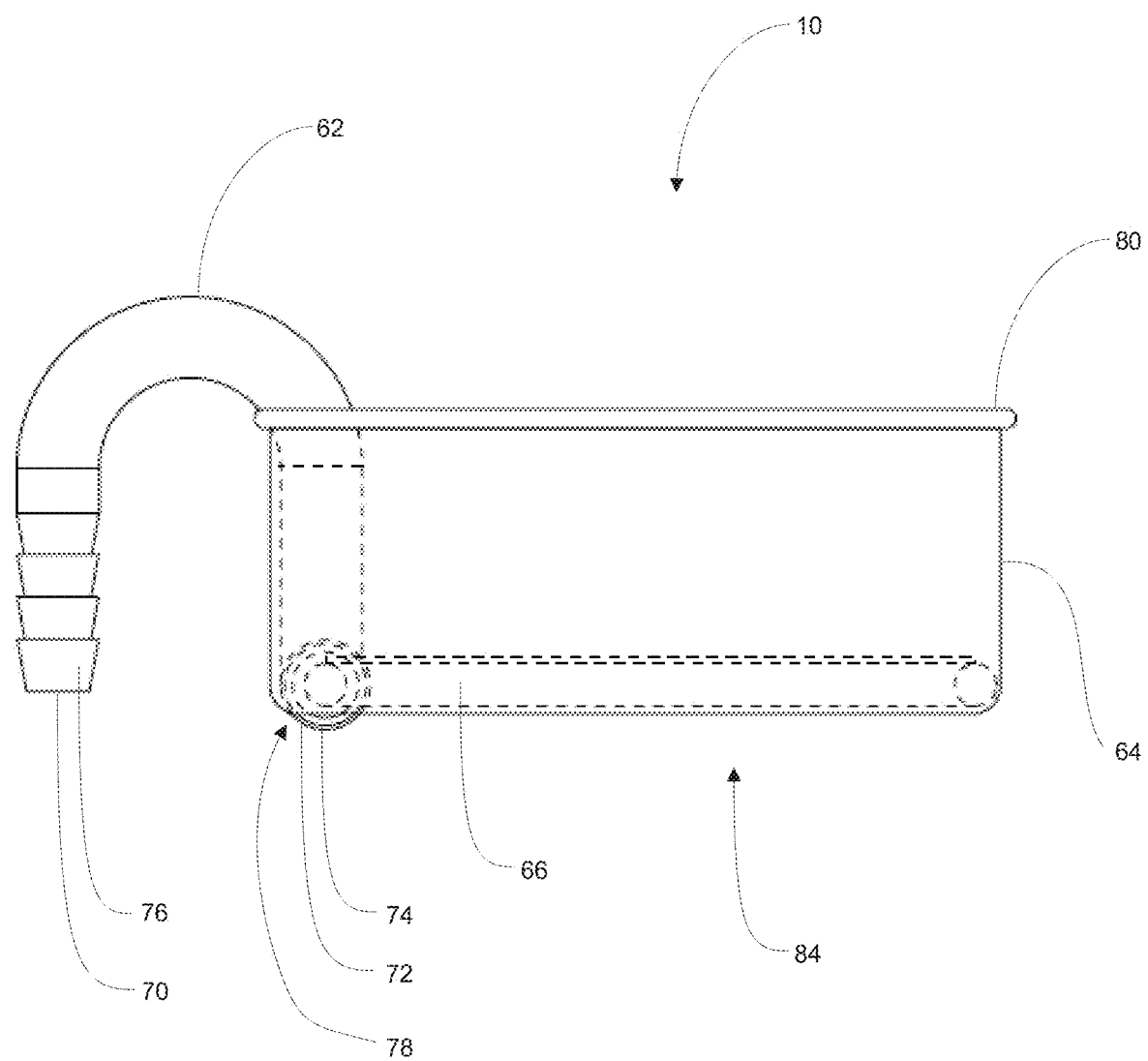
FIG. 1D is a side elevation view of the aerosol removing apparatus illustrated in FIG. 1A, where the coupling is shown on the left side of the apparatus.
Figure 1E:
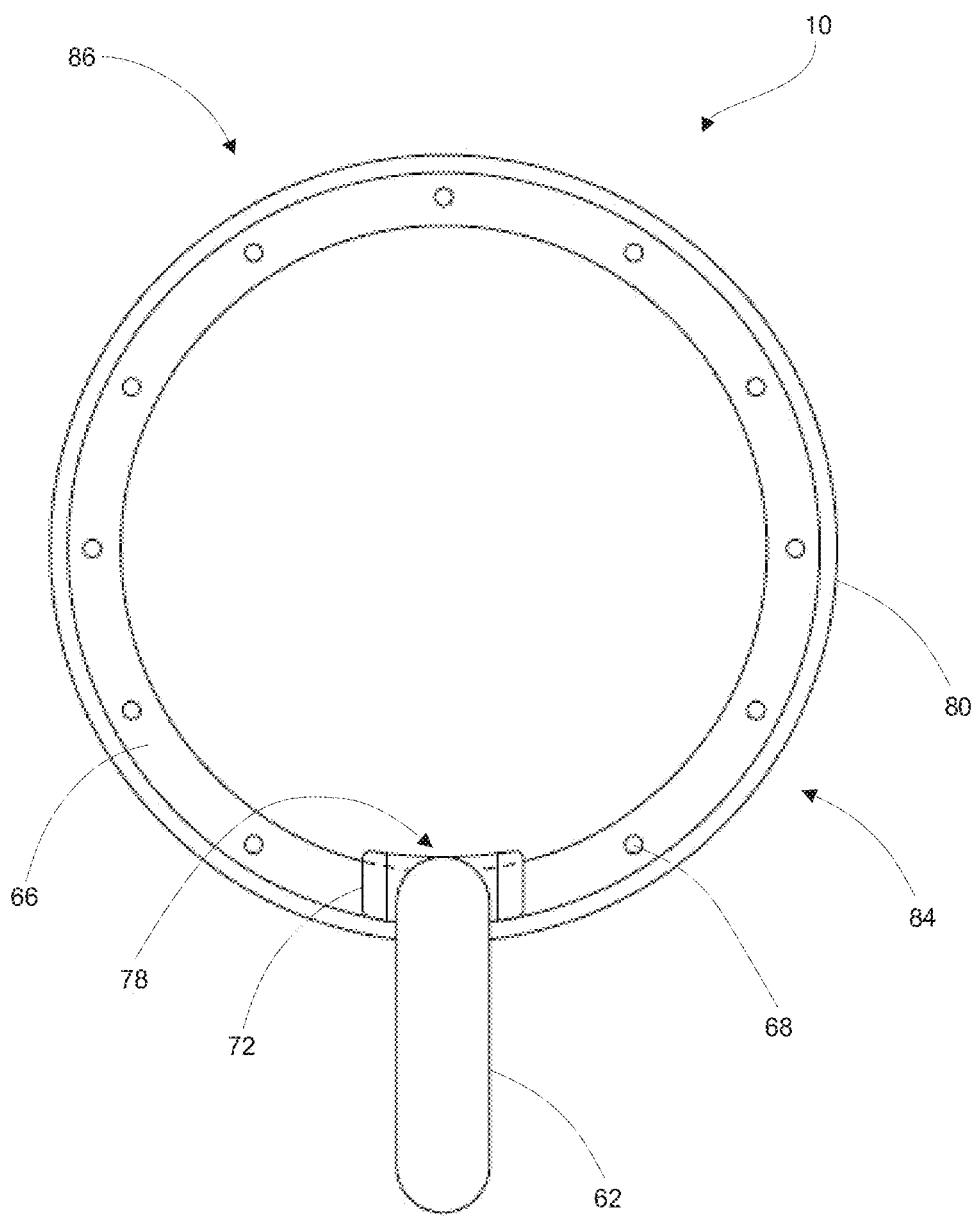
FIG. 1E is a top plan view of the aerosol removing apparatus illustrated in FIG. 1A.
Figure 1F:
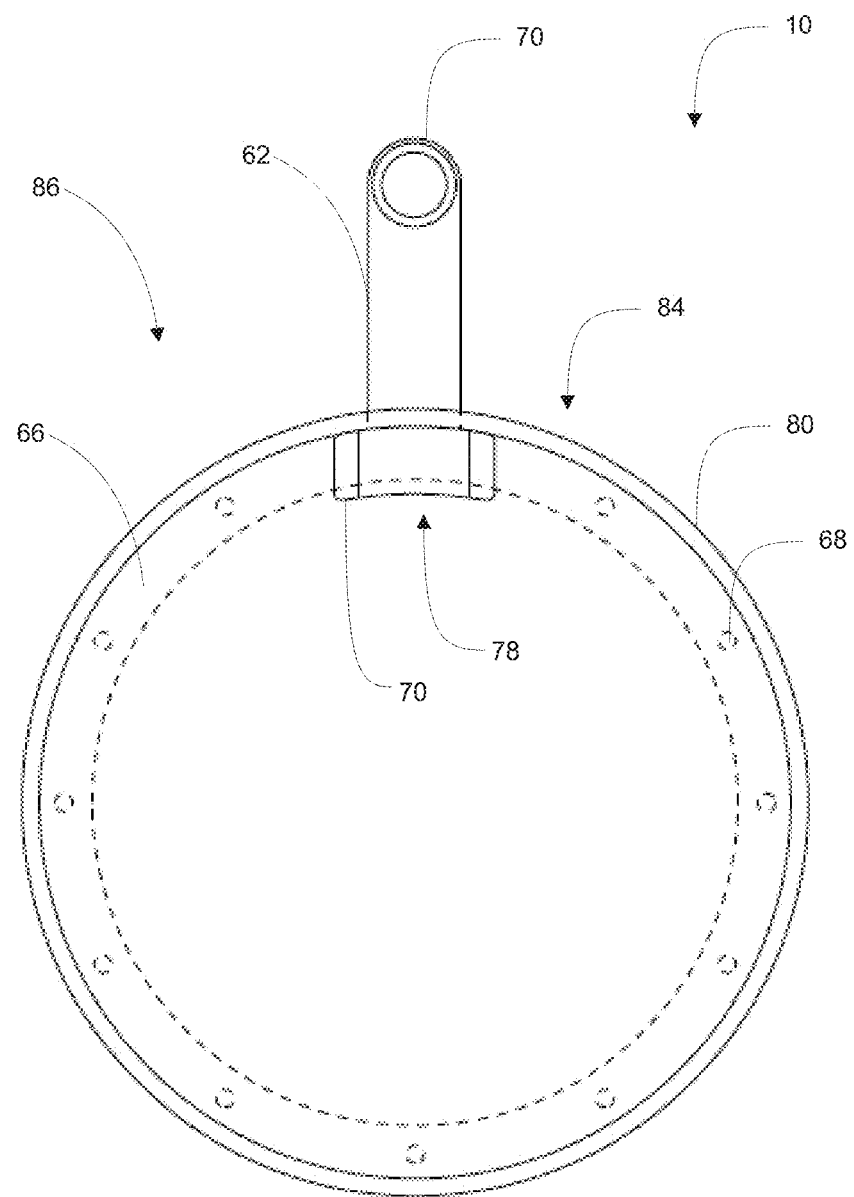
FIG. 1F is a bottom plan view of the aerosol removing apparatus illustrated in FIG. 1A.
Figure 1G:
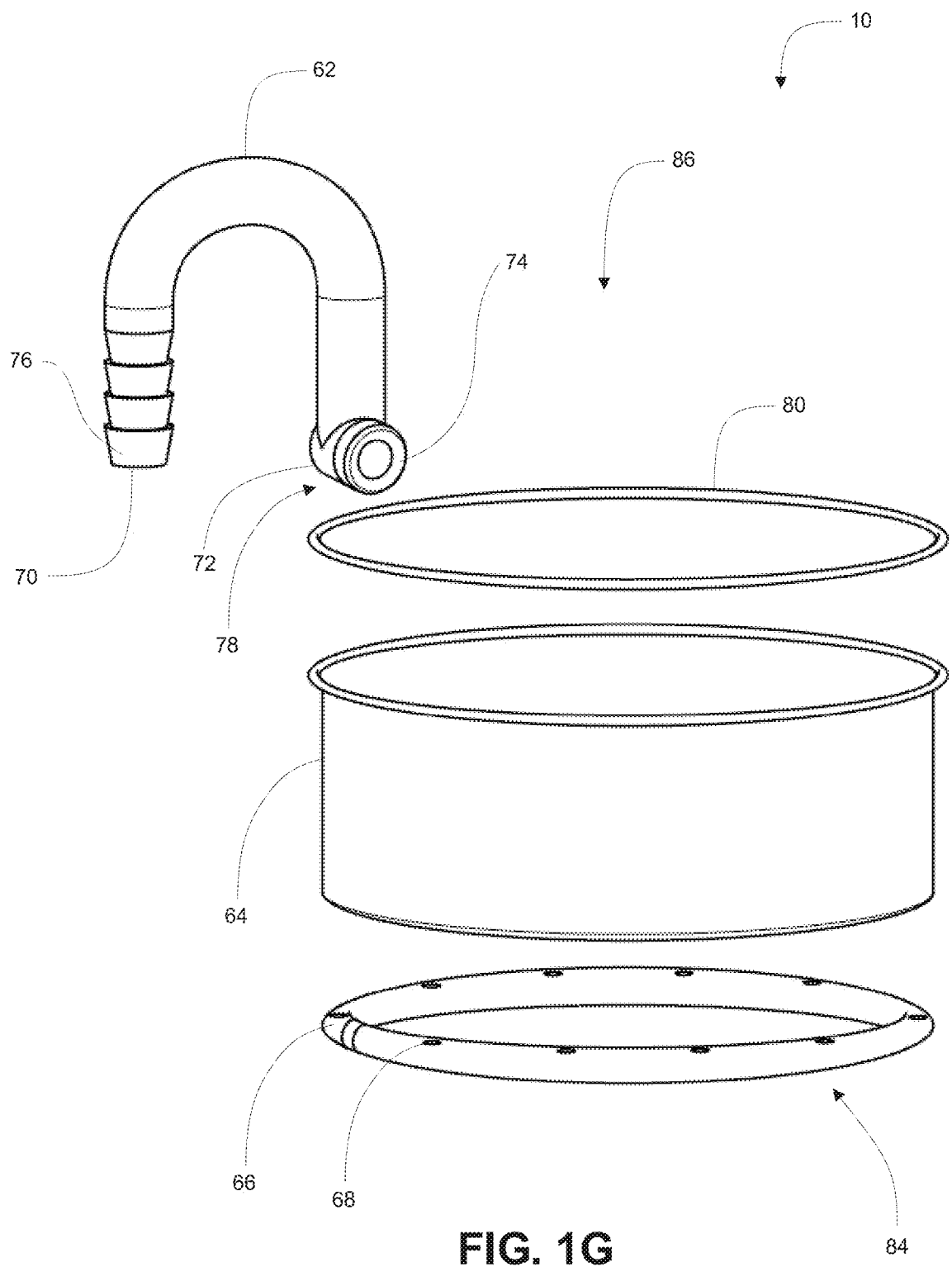
FIG. 1G is an exploded side perspective view of the aerosol removing apparatus illustrated in FIG. 1A.

The following is a list of certain components that are described and enumerated in this disclosure in reference to the above-listed figures. However, any aspect of the devices illustrated in the figures, whether or not named out separately herein, can form a portion of various embodiments of the invention and may provide basis for claim limitation relating to such aspects, with or without additional description. The enumerated components include:

1 first embodiment of an aerosol removal device
2 second embodiment of an aerosol hole
3 third embodiment of an aerosol removal apparatus
4 fourth embodiment of an aerosol removal apparatus
5 fifth embodiment of an aerosol removal apparatus
6 sixth embodiment of an aerosol removal apparatus
10 aerosol removing apparatus
11 aerosol removing apparatus
12 body
14 outer ring
15 interior wall outer ring
16 inner ring
17 interior wall inner ring
18 barrier
19 cavity (hollow cavity)
20 perforated surface of ring
21 aperture
22 perforations (or holes or apertures)
23 posterior suction cup
24 first port (e.g., saliva/aerosol ejection port)
26 second (optional) port (e.g., saliva/aerosol ejection port)
28 distal side
30 proximal side
32 opening
34 perforated interior surface of barrier
36 outer surface
38 spacer
40 inner layer
42 outer layer
43 outward facing first layer of barrier
44 gap
45 second layer of barrier
48 suction system
50 collection tube
52 frame
53 barrier frame
54 outside edge of barrier
55 suction tube between layers of barrier
56 double-walled barrier
57 portion of double-walled barrier attached to fasteners of frame
58 side member
59 fastener
60 extension of outer ring
61 front surface of barrier
62 coupling
64 sleeve/barrier
66 conduit
68 opening
70 first port coupling
72 second port coupling
74 third port coupling
76 distal end coupling
78 proximal end coupling 80 ring
82 sleeve/ring opening
84 distal end aerosol removing apparatus
86 proximal end aerosol removing apparatus
100 aerosol removing apparatus
102 outer nose cup
104 inner nose cup
105 aperture
110 first coupling
112 second coupling
115 shield
119 distal surface
120 proximal surface
121 upper portion
123 lower portion
125 right side
127 left side
130 outer structure
131 proximal edge
132 outer perimeter (perimeter of outer structure)
133 distal edge
135 inner structure
137 inner perimeter (perimeter of inner structure)
139 right angled edge
141 left angled edge
200 aerosol removing apparatus
202 body
204 right side
206 left side
208 right-side body T-coupler
210 left-side body T-coupler
212 upper structure
214 lower structure
216 upper aperture
218 lower aperture
220 right-side coupler aperture(s)
222 left-side coupler aperture(s)
224 right-side extension portion
226 left-side extension portion
228 right-side distal surface
230 left-side distal surface
232 right-side body coupler
234 left-side body coupler
236 upper distal surface
238 lower distal surface
240 right-side vacuum line
242 left-side vacuum line
244 vacuum lines T-coupler
246 vacuum line
248 vacuum system
250 aperture
252 proximal end
254 distal end
W width
H height FIG. 1A is a perspective view illustrating an example of an apparatus for removing aerosol, fluid, and or material (which may be referred to herein for ease of reference as an "aerosol removing apparatus"), according to some embodiments. In this example, the aerosol removing apparatus 10 includes one coupling 62. FIGS. 1B-1G illustrate other views of the embodiment illustrated in FIG. 1A. For example, FIG. 1B is a side elevation view of the aerosol removing apparatus illustrated in FIG. 1A, where the coupling is centered on the apparatus in this view. FIG. 1C is a side elevation view of the aerosol removing apparatus illustrated in FIG. 1A, illustrating the side opposite of the side shown in FIG. 1B. FIG. 1D is a side elevation view of the aerosol removing apparatus illustrated in FIG. 1A, where the coupling is shown on the left side of the apparatus. FIG. 1E is a top plan view of the aerosol removing apparatus illustrated in FIG. 1A. FIG. 1F is a bottom plan view of the aerosol removing apparatus illustrated in FIG. 1A. FIG. 1G is an exploded side perspective view of the aerosol removing apparatus illustrated in FIG. 1A.

The following description is in reference to example of an aerosol removing apparatus 10 illustrated in FIGS. 1A-1G is used to evacuate aerosol, fluid, and/or material from a patient's mouth. The aerosol removing apparatus 10 includes a distal end 84 and the proximal end 86. When the aerosol removing apparatus 10 is positioned in a patient's mouth, the distal end 84 is positioned further inside at least a portion of the patient's mouth, such that the distal end 84 is positioned farther away from a medical practitioner working on the patient's mouth than the proximal end 86, which is positioned closer to the medical practitioner working on the patient's mouth. The coupling 62 is attached to a conduit 66. The coupling 62 includes a first port 70 on the distal end 76 of the coupling, the first port 70 configured to be attached to the suction hose (a vacuum hose) of a machine that is capable of producing a vacuum. For example, a vacuum producing machine that is commonly found in a dentist office. In operation, the proximal end 84 of the aerosol removing apparatus 10 is placed inside the patient's mouth, and the portion of the coupling 62 (e.g., the distal end 76) extends out and around the edge of a patient's mouth such that port 70 on the distal end 76 can be attached to the suction hose. In the example illustrated here, the coupling 62 is U-shaped. In other embodiments, the coupling 62 may extend from the conduit 66 and curve such that it extends outside of the patient's mouth, the curve may be other than a U-shape. In some uses, the aerosol removing apparatus can be positioned in a patient's mouth such that the conduit 66 is adjacent to the patient's lips or teeth (e.g., positioned behind the patient's lips or teeth). For example, for dental use the aerosol removing apparatus may be positioned behind the patient's lips such that aerosol, fluid, material may be removed from the interior of the patient's mouth while allowing a dentist to access the patient's teeth. In other uses, the aerosol removing apparatus can be positioned more interior to a patient's mouth.

The coupling 62 includes a second port 72 and the third port 74 on the proximal end 78 of the coupling 62. The second port 72 and the third port 74 each are configured to receive a portion of the conduit 66 therein and thus are coupled to the conduit 66. The example of FIG. 1A illustrates one of several ways that the coupling 66 can be attached to the conduit 66. In another example, the coupling 62 and the conduit 66 are integrally formed. In this example, the second port is aligned in a first direction and the third port is aligned in a second direction opposite the first direction. In various configurations, the alignment of the first direction the second direction may be in opposite directions plus or minus proximally 40° with respect to each other. In this example, the coupling 62 is attached to the conduit 66 such that the coupling 62 extends from the conduit 66 and angle that is approximate 90°. That is, a portion of the coupling 62 that is attached to the conduit 66, and extends from the conduit 66, is perpendicular to the conduit 66. In some examples, the portion of the coupling 62 that extends from the conduit 66 is at an angle to the conduit 66 of 30°-90°.

The shape of the conduit 66 (i.e., a cross-section) can be circular, oval, curved, have one or more flat sides, and generally be of any geometric shape that allows materials to be communicated throughout the conduit 66. The coupling 62 comprises an interior cavity that runs from the distal end 78 to the proximal end 76. The conduit 66 also comprises an interior cavity, and in the configuration shown, the interior cavity of the coupling 62 is connected to the interior cavity of the conduit 66 such that aerosol, fluid, and/or material that enters the conduit 66 can be communicated through the coupling 62 and out of the first port 70 and into a suction hose. The conduit 66 extends to form a circumferential boundary around the area that is manufactured in different sizes to fit inside a patient's mouth. In some embodiments, the distance along a circumferential boundary (e.g., the length of the conduit) is approximately 10 inches. In various embodiments, the distance along the circumferential boundary is between 4 inches and 15 inches. In some embodiments, the conduit 66 is formed from a hose. In some embodiments, the conduit 66 is formed using injection molding, or another type of molding.

The aerosol removing apparatus 10 also includes a plurality of openings 68 on various surfaces of the aerosol removing apparatus 10. For example, as illustrated in FIG. 1A, openings 68 may be positioned on one or more surfaces of the conduit 66. For example, the opening 68 may be positioned such that they generally face the interior of the aerosol removing apparatus 10. However, the openings 68 may be positioned on any surface of the conduit 66. Also, openings may be positioned on one or more surfaces of the coupling 62. For example, one or more openings may be positioned on a surface of the coupling 62 that faces interior to the aerosol removing apparatus 10, or on any other surface of the coupling 62. The openings 68 are pathways between the interior cavity of the conduit 66 or the interior cavity of the coupling 62 and an area outside of the surface of the conduit 66 and the coupling 62. When a suction is applied to the first port 70, a vacuum is created in the interior cavity of the coupling 62 and the conduit 66 which causes aerosol, fluid, and material to flow through the openings into the first port for evacuation by the suction hose. When the aerosol removing apparatus is positioned in the patient's mouth, aerosol, fluid (blood, saliva, water, etc.), and/or material in the patient's mouth, or in the vicinity of the patient's mouth, is evacuated out of the patients mouth via the openings 68 the conduit 66 and the coupling 62 and into the suction hose attached to the first port 70. The openings can be circular, oval, elongated, slots, or any geometric shape that allows aerosol, fluid, and/or material to pass through the openings 68 and into the interior cavity of the conduit 66 or the interior cavity of the coupling 62. In some embodiments, an opening 68 has a dimension (e.g., a length or width dimension) of 1 mm to 9 mm. For example, an opening 68 may be circular with a 1 mm diameter. In other embodiments, an opening 68 may be circular and have a diameter of 2 mm, 3 mm, 4 millimeters, 5 mm, 6 mm, 7 mm, 8 mm, or 9 mm, plus or minus 0.5 mm. In many examples, an opening 68 has a dimension in the range of about 1 mm-4 mm.

Figure 1H:
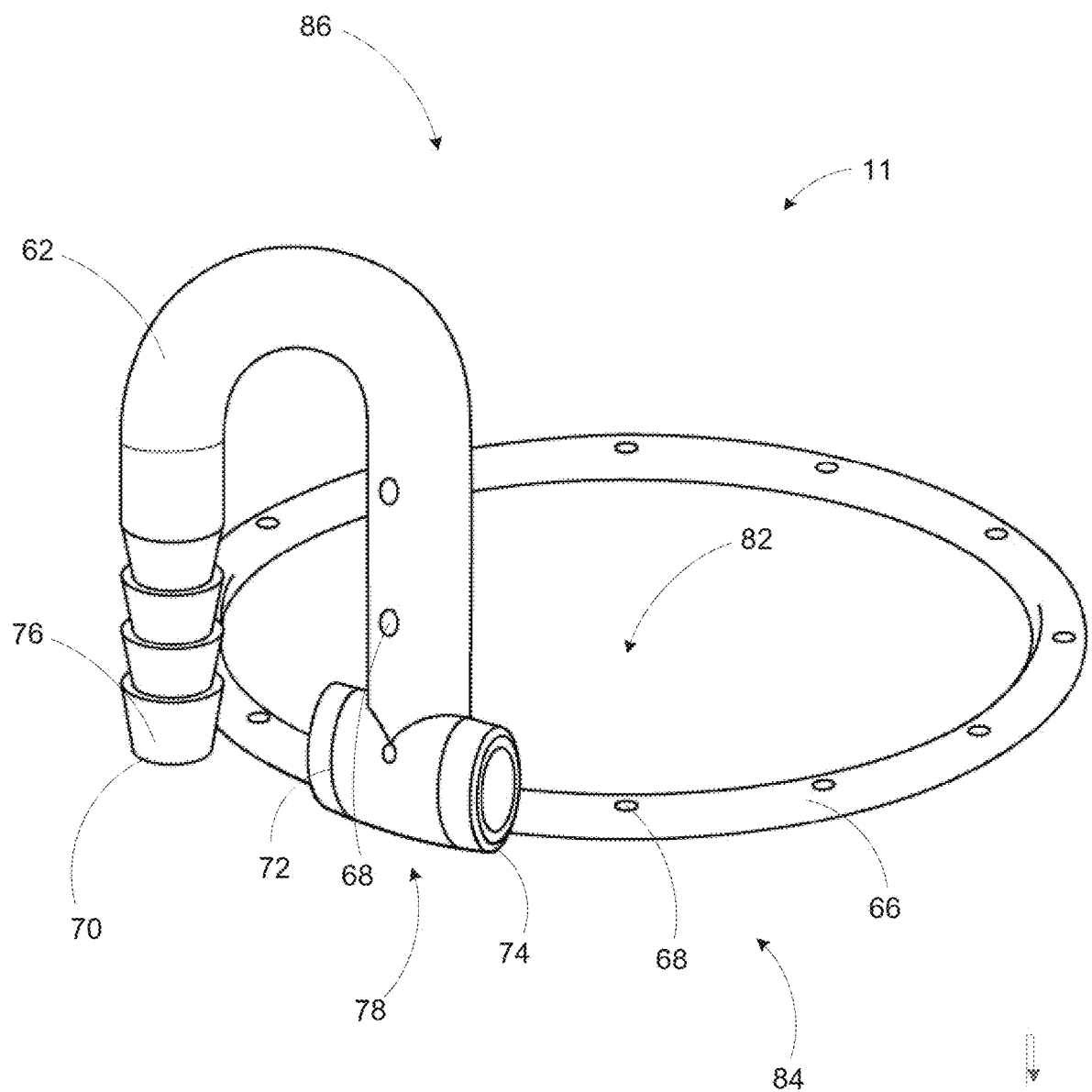
FIG. 1H is a perspective view illustrating another example of an aerosol removing apparatus, according to some embodiments. In this example, the aerosol removing apparatus does not include a sleeve or a top support ring.

The aerosol removing apparatus 10 illustrated in FIGS. 1A-1H includes a ring 80 and a sleeve 64 that extends between the conduit 66 and the ring 80. In some embodiments, the ring 80 is about the same size (e.g., diameter or length) as the conduit 66. In one example, the height of the sleeve/barrier (e.g., from the conduit 66 to the ring 80) may be 29 mm. In various examples, the height of the sleeve may be in the range of 10 mm to 40 mm. The ring 80 and the sleeve 64 have an opening 82 on both the top and the bottom such that the opening extends through the aerosol removing apparatus, which allows a patient to breathe freely when the aerosol removing apparatus 10 is placed in the patient's mouth. The ring 80 and the sleeve 64 are used to isolate a portion of a person's mouth. In some embodiments, the ring 80 can be attached to the coupling 62. In other embodiments, the ring 80 can fit around the coupling 62 but not be attached to it. In some embodiments where the rubber dam sheets cover the mouth, a hole can be created in the rubber dam sheet for patients that are mouth breathers. The ring 80 may be a thin semi-rigid or rigid material, that is flexible but resilient. The sleeve 64 can be a flexible material, for example, rubber, vinyl, paper, a nonlatex material. In some embodiments, the ring 80 may be attached to the sleeve 64 by glue (e.g., UV glue) or a welded bond, or another attachment means. In some embodiments, the sleeve 64 may be attached to the conduit 66 by glue (e.g., UV glue) or a welded bond, or another attachment means. Other examples of an aerosol removing apparatus do not include the sleeve 64 or a ring 80. For example, FIG. 1H is a perspective view illustrating another example of an aerosol removing apparatus 11, according to some embodiments. In this example, the aerosol removing apparatus 11 does not include a sleeve or a top support ring. The aerosol removing apparatus 11 illustrated in FIG. 1H can include all of the other features described in reference to FIGS. 1A-1G.

Figure 1I:
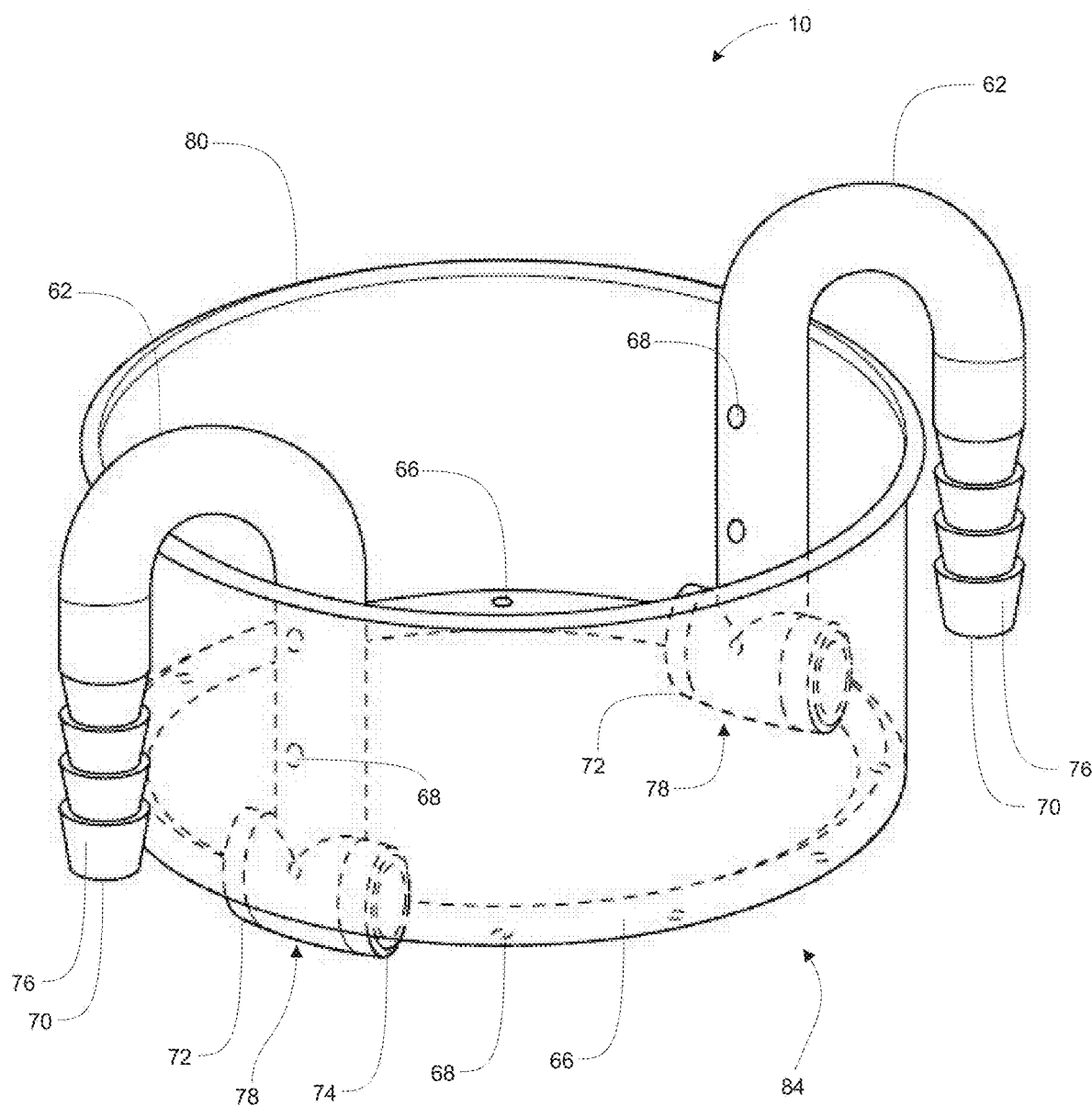
FIG. 1I is a perspective view illustrating another example of an aerosol removing apparatus, according to some embodiments. In this example, the aerosol removing apparatus includes two couplings, each coupling having an interior cavity that with the conduit form the passageway for removing aerosol, fluid, material from a patient's mouth. The two couplings allow two suction hoses to be attached to the aerosol removing apparatus.

FIG. 1I is a perspective view illustrating another example of an aerosol removing apparatus 12, according to some embodiments. In this example, the aerosol removing apparatus 12 includes two couplings 62 (e.g., a first coupling and a second coupling), each coupling 62 having an interior cavity that, with the interior cavity of the conduit 66, form a passageway for removing aerosol, fluid, material from a patient's mouth. The two couplings allow two suction hoses to be attached to the aerosol removing apparatus.

Figures 2A, 2B:
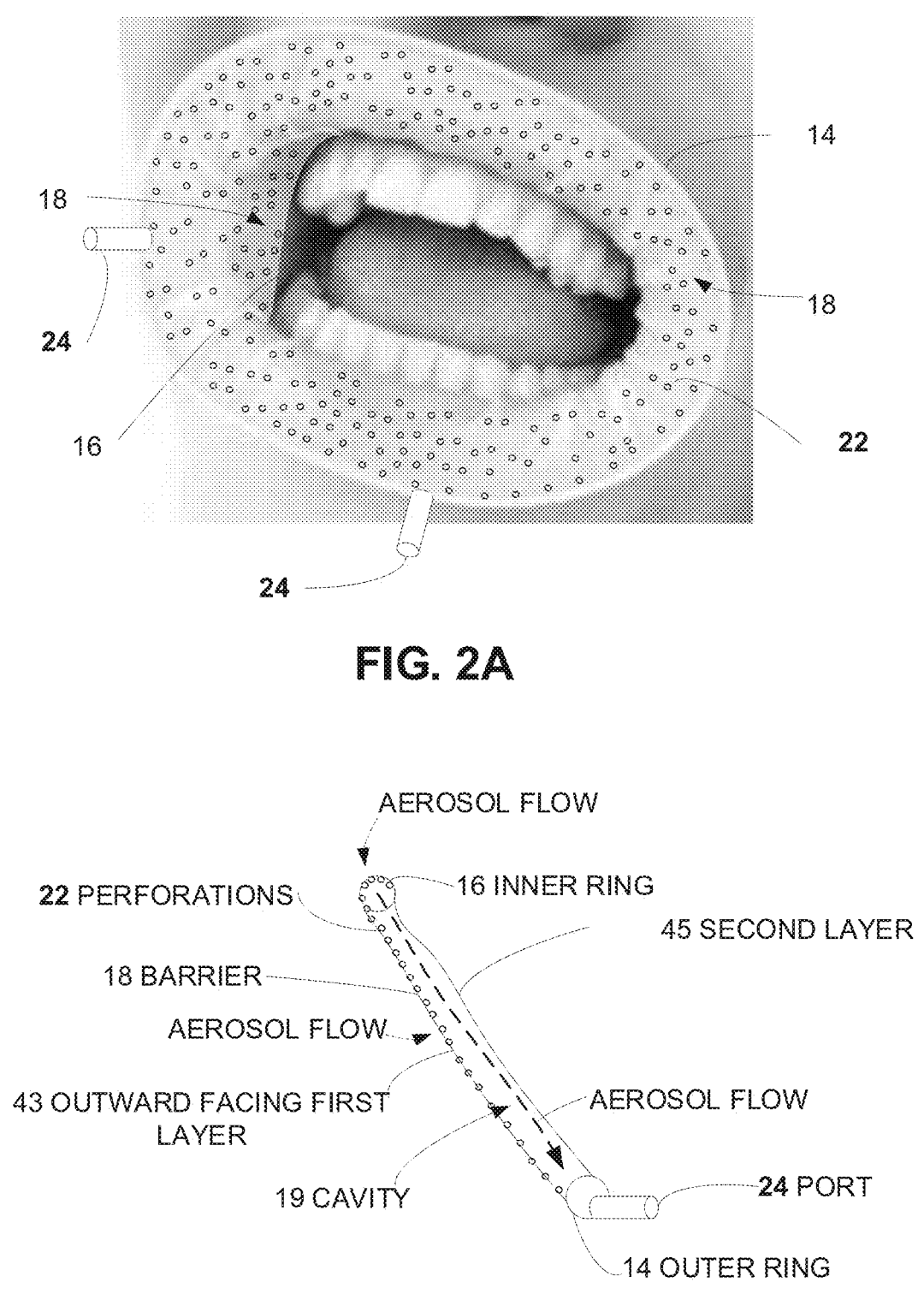

FIG. 2A is an image generally depicting a dental dam according to some embodiments described herein. The dental dam includes a body having an outer ring 14 (positioned outside of the patient's mouth) and an inner ring 16 (positioned inside the patient's mouth). The body 12 includes one or more ports 24, and a double-layered barrier 18 with structures positioned between the layers to separate the layers to create a chamber. The barrier 18 includes a plurality of perforations on its surface. When a saliva ejector, HVE, or other suction device is attached to the port 24 and a dental vacuum is turned on, aerosol is sucked into through the perforations, into the chamber in the barrier 18, and out of the port 24.

FIG. 2B is a cross-sectional view of a portion of the aerosol removal apparatus of FIG. 2A illustrating the aerosol flow when suction is applied to a port 24. The aerosol flows through a plurality of perforations 22 in an outward facing first layer 43 of the barrier 18 and through perforations 22 in an inner ring 16, and into a cavity 19. The cavity 19 is within the barrier 18, between the first layer 43 and a second layer 45 (on the opposite side of the barrier 18), and towards the port 24.

Figure 3:
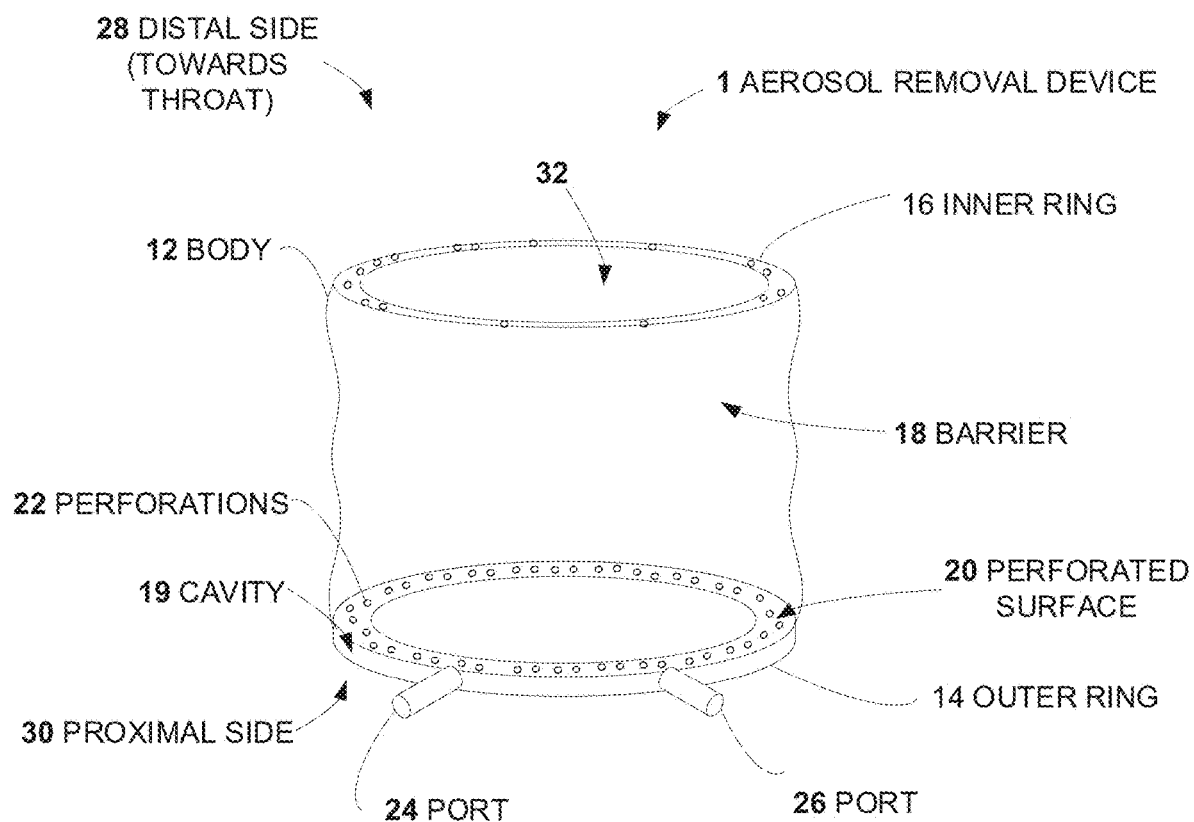
FIG. 3 is a perspective view of a first embodiment of an aerosol removal apparatus 1 having an outer ring with a perforated surface for removing aerosol from an oral cavity, the pouter ring having a port for attaching to a saliva ejector or high-volume ejector (HVE). In general, the apparatuses described herein are likely to work better with an HVE.

FIG. 3 is a perspective view of a first embodiment of an aerosol removal apparatus 1 having a ring with a perforated surface for removing aerosol. The aerosol removal apparatus 1 includes a proximal side 30 that is generally positioned proximate to a patient's lips, and includes a distal side 28 that is generally positioned at a location inside a patient's mouth closer to a patient's throat. The aerosol removal apparatus 1 includes a body 12. The body 12 may include an outer ring 14, an inner ring 16, and a barrier 18 that is coupled to the outer ring 14 and the inner ring 16. The barrier 18 may be generally cylindrical-shaped having an opening 32 through the center of the body 12. In other embodiments, the barrier 18 may have a variety of other shapes.

The body 12 may also include a plurality of openings or perforations 22 that are formed on a portion of the outer ring 14. In FIG. 3, the perforations 22 are illustrated as being on a perforated surface 20 of the outer ring 14. The perforated surface 20 is on a distal surface of the outer ring 14 and inside the barrier 18. The outer ring 14 may include a non-perforated surface on a proximal surface of the outer ring 14. In other embodiments, such perforations 22 may be on any portion of the outer ring 14 including on two or more surfaces of the outer ring 14. For example, on an edge or a side of the outer ring 14, or on all sides of the outer ring 14.

The body 12 includes a hollow cavity 19 that is located inside a portion of the body 12. In this example, the cavity 19 is in the outer ring 14. In some embodiments, the inner ring 16 includes a cavity 19. An example of a cavity 19 in an inner ring 16 is shown in FIG. 5. Referring again to FIG. 3, the body 12 includes at least one port 24 in the outer ring 14 for coupling a suction hose to the body 12. The port 24 is in fluid communication with the cavity 19. In some embodiments, the body 12 also includes a second port 26 which is also in fluid communication with the cavity 19.

In the illustrated embodiment, each port 24, 26 is positioned on the outer ring 14. In other embodiments, ports may be positioned on various parts of the body 12, including different parts of the body. In other embodiments, a port may be positioned on the barrier 18 where the barrier includes at least a portion of the cavity. In this embodiment, the first port 24 and the second port 26 are in airflow communication with the cavity 19 in the outer ring 14. Suction applied to the port creates a vacuum in the hollow cavity 19, which creates a suction of air through the perforations 22 and into the cavity 19. Section may be applied to the port by attaching a suction hose, for example, the suction hose that is typically found in a dentist office, to the port.

In some embodiments, one or more of the components that make up body 12 are made materials that include one or more elastomeric materials. In some embodiments, the elastomeric materials include a thermoplastic elastomer (TPE) or thermoplastic rubber that exhibits both thermoplastic and elastomeric properties. In some embodiments, the elastomeric materials comprise silicone. In some embodiments, the elastomeric materials are stretchable, exhibit low fatigue, are abrasion and chemical resistant, and/or are soft. In some embodiments, the one or more elastomeric materials allow the body 12 to be expandable, recoverable, and/or flexible. As used herein, "elastomeric material" refers to a material that is capable of being easily expanded (in other words, stretched) or compressed and that resumes or recovers its former shape (in other words, its pre-stretch or pre-compression shape) once released. Something that has the ability to resume its former shape after expansion or compression is referred to herein as being "recoverable." Something that is expandable and recoverable may also be referred to herein as being "elastically stretchable."

In some embodiments, the body 12 is flexible and is capable of conforming to the general area of the body to be supported without substantial stretching; however, it is contemplated that the body 12 may need to be stretched or deformed in order to conform to the general area of the body part to be supported. In some embodiments, the body 12 may be stretched over the body part to which it is applied so as to provide a degree of compression to the body part. As used herein, "flexible" generally refers to the ability (e.g., of a material or an article) to bend freely and repeatedly without breaking and/or to conform to the shape of the body part to which the flexible material (or article) is applied.

In some embodiments, the body 12 is formed from a transparent or translucent material. This may allow for visual inspection of areas covered by the body 12 of the aerosol removal apparatus.

Figure 4:
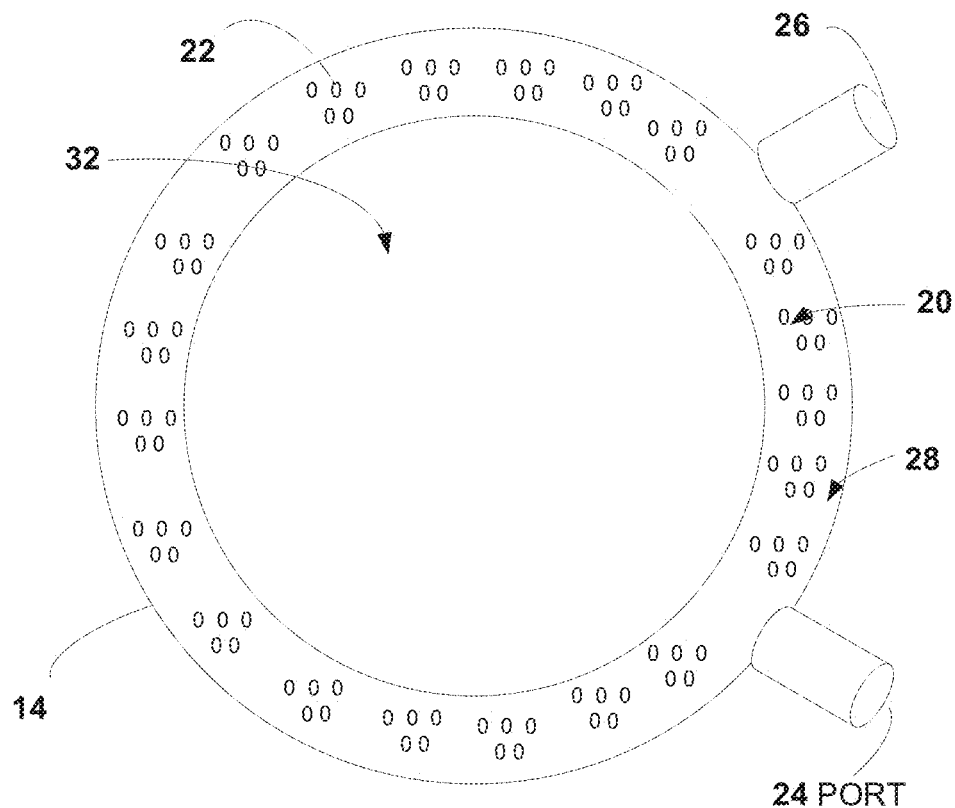
FIG. 4 is distal plan view of an example of an outer ring 14 of an aerosol removal device, for example, the aerosol removal apparatus of FIG. 3 (the illustrated distal side facing the patient when in use).

FIG. 4 is distal plan view of an example of an outer ring 14 of an aerosol removal apparatus, for example, the aerosol removal apparatus of FIG. 3 (the illustrated distal side facing the patient when in use). In the illustrated embodiment, and the outer ring 14 is generally circular-shaped. In other embodiments, the and the outer ring 14 (and the outer ring 16) may be oval-shaped or have any other curvilinear shape that is suitable for fitting in or around a person's mouth. In some embodiments, either or both of the inner ring 16 or the outer ring 14 may be deformable (flexible) such that they can be shaped to be inserted into a patient's mouth, or shaped for a particular use.

Figure 5A:
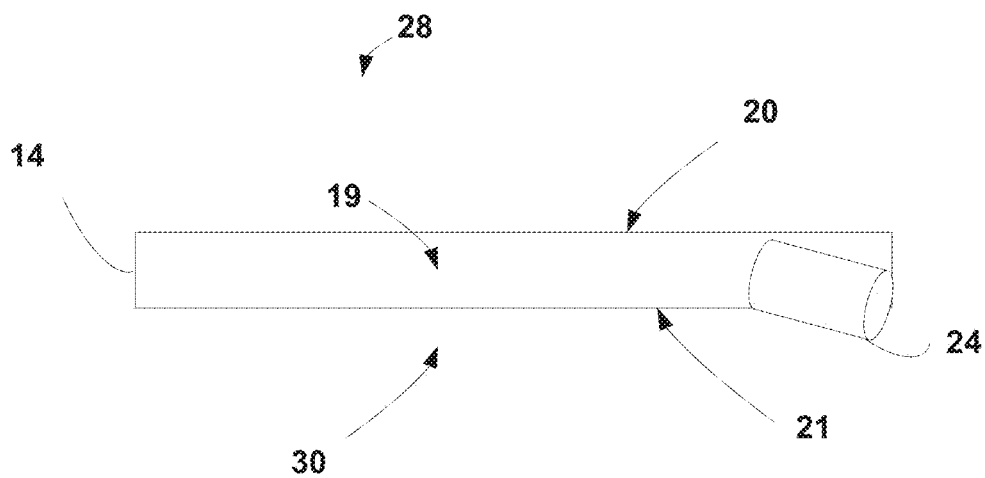
FIG. 5A is a side elevation view of the outer ring of an aerosol removal device, for example, the aerosol removal apparatus 1 illustrated in the embodiment of FIG. 3.

FIG. 5A is a side elevation view of the outer ring 14 of an aerosol removal apparatus, for example, the aerosol removal apparatus 1 illustrated in FIG. 3. The hollow cavity 19 is a generally enclosed portion of the and the outer ring 14. For example, between a proximal surface 21 and the perforated surface 20. The cavity 19 may include all or a portion of a volume inside the outer ring 14. In various embodiments, the inner ring 16 also includes a hollow cavity 19 which can be similarly configured (see for example, FIGS. 6, 7A, and 7B). In some embodiments of any of the aerosol removing apparatuses illustrated and described herein, both the proximal surface (the surface facing outward, e.g., towards a medical practitioner) and the distal surface 28 (the surface facing inward towards a patient's throat) can include perforations (openings) 22.

Figure 5B:
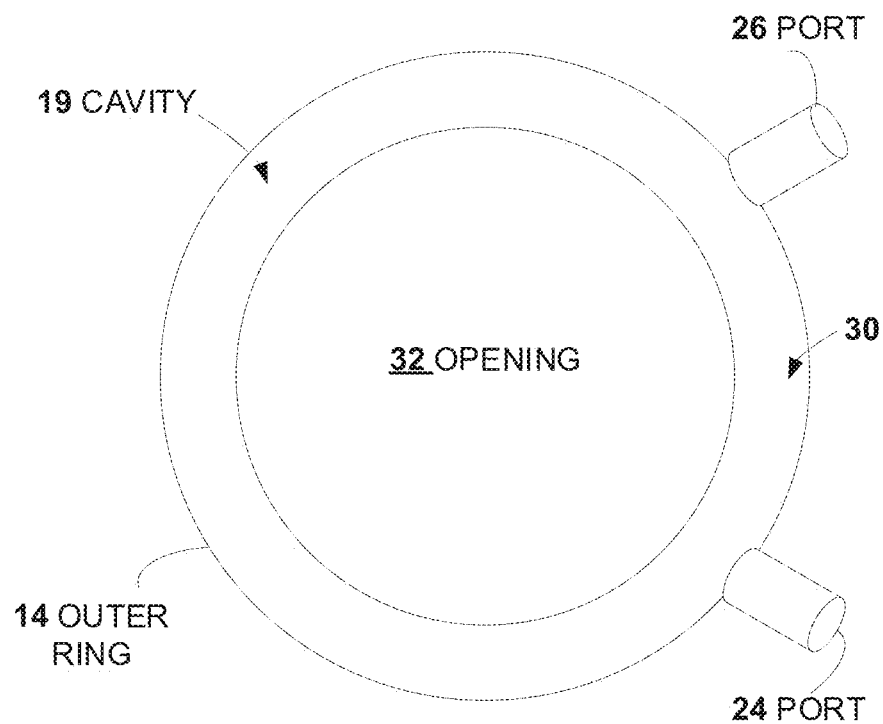
FIG. 5B is a proximal plan view (the illustrated proximal side surface facing away from the patient when in use) of an example of an outer ring 14 of the aerosol removal apparatus illustrated in FIG. 3.

FIG. 5B is a proximal plan view of an example of an outer ring 14 of an aerosol removal apparatus. For example, the outer ring 14 may be included in the aerosol removal apparatus illustrated in FIG. 3. When placed in a patient's mouth, the proximal side surface 30 faces away from the patient and towards the dental practitioner. In this embodiment, the outer ring 14 is generally circular-shaped and has an opening 32 surrounded by the outer ring 14. One or more ports 24, 26 are attached to the outer ring 14. The ports 24, 26 may be configured to couple to a suction tube, a dental vacuum, or another system that can provide suction. The suction system can be a system that is integrated into medical examination room or dentist office, or it can be a free-standing suction system. In operation, an unused port may be plugged. The outer ring 14 also includes a cavity 19 inside at least a portion of the outer ring 14, the cavity 19 configured to be in fluid communication with the ports 24, 26.

Figure 5C:
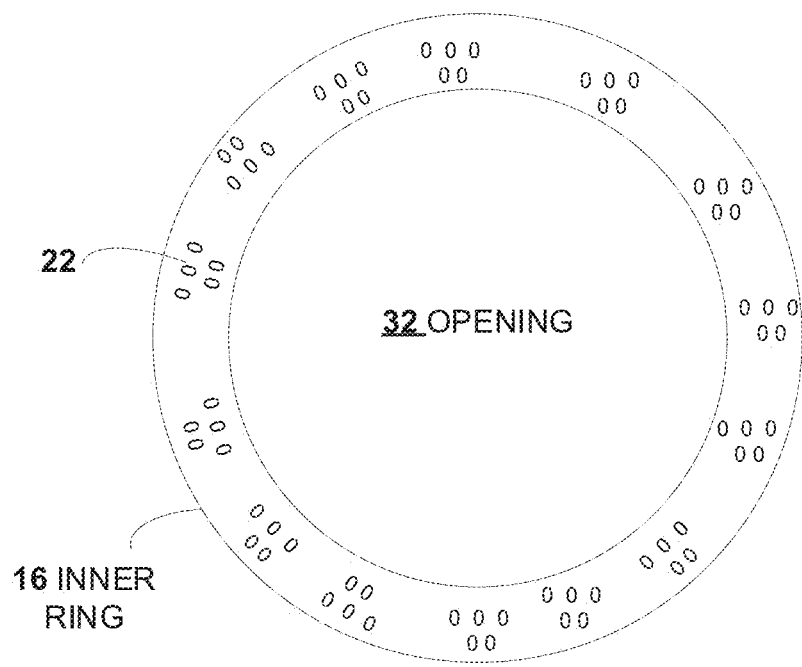
FIG. 5C is an example of an inner ring of 14 an aerosol removal apparatus that can be included in any embodiment where the inner ring 14 includes perforations 22, and where the perforations may be on a distal side portion of the inner ring, a proximal side portion of the inner ring, and/or on a side portion of the inner ring.

FIG. 5C is an example of an inner ring of 16 an aerosol removal apparatus that can be included in any embodiment where the inner ring 16 includes perforations 22. In various examples of inner rings 16, the perforations 22 may be located on a distal-side portion of the inner ring, a proximal-side portion of the inner ring, and/or on a side portion of the inner ring.

Figure 6:
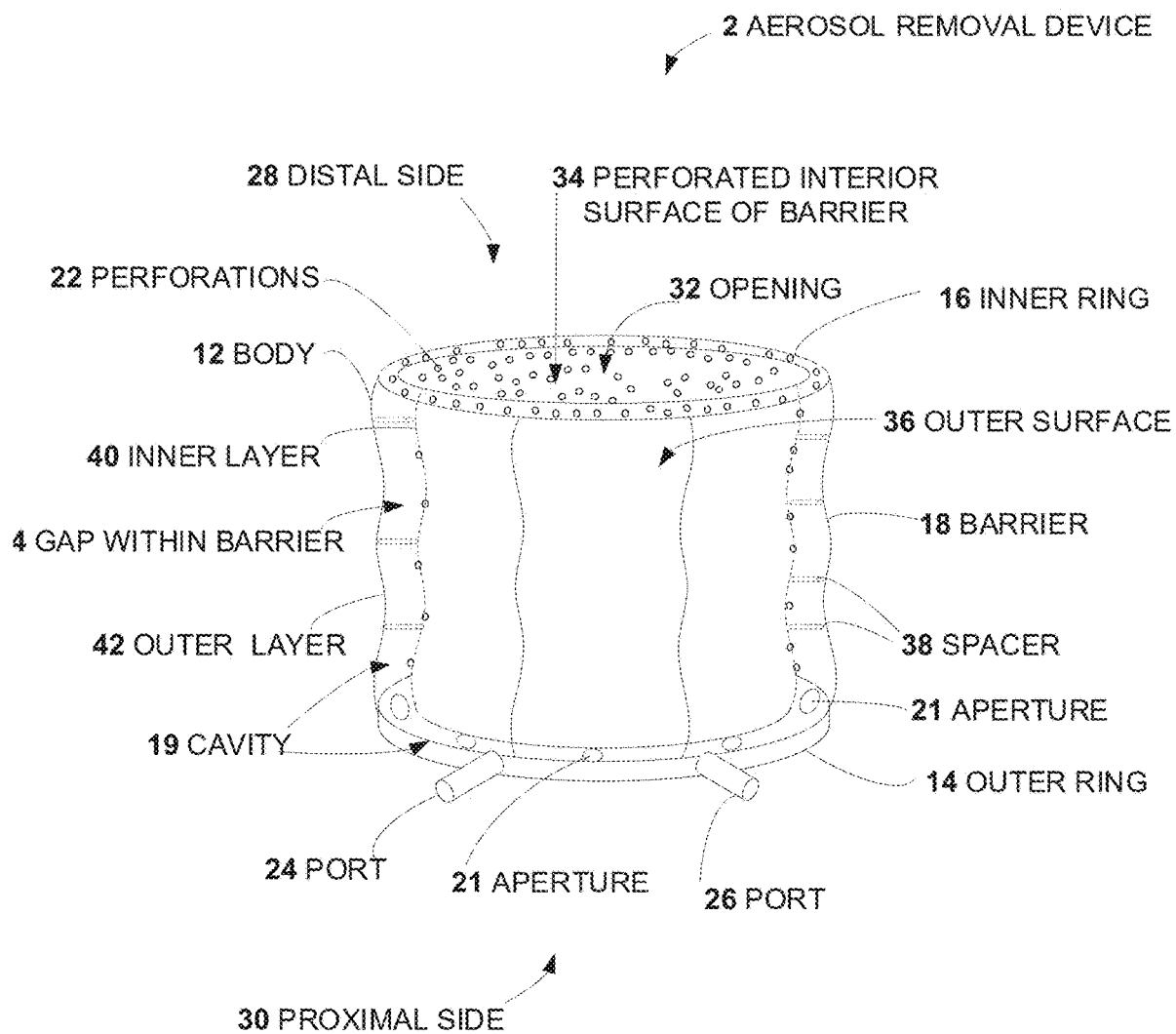
FIG. 6 is a perspective view of a second embodiment of an aerosol removal apparatus 2 that may include perforations on an inner ring 16 and on the inner layer of the barrier 18 (i.e., the surface of the barrier 18 facing inward towards the opening 32 that rungs through the aerosol removal device).

FIG. 6 is a perspective view of a second embodiment of an aerosol removal apparatus 2 that includes perforations on an inner ring 16 and on an inner layer 40 of the barrier 18. That is, the surface of the barrier 18 facing inward towards the opening 32 that rungs through the aerosol removal apparatus. This example of the aerosol removal apparatus 2 includes a body 12, an inner ring 16, an outer ring 14, and a barrier 18 coupled to the inner ring 16 and the outer ring 14. In this embodiment the inner ring 16 includes perforations 22. In other embodiments, the inner ring 16 does not include perforations. In embodiments where the inner ring 16 includes perforations, the inner ring 16 may also have a cavity located therein. In some embodiments where the inner ring includes perforations, the cavity of the inner ring (which receives aerosol through the perforations on the inner ring) and the cavity of the barrier are the same such that aerosol that passes through the inner ring flows directly into the cavity of the barrier. In such examples, the interior ring 16 can include a surface structure (instead of a tube) attached to the inner layer and outer layer of the barrier.

The barrier 18 in FIG. 6 includes an outer layer 42 and an inner layer 40. In some embodiments, the barrier 18 may include one or more other layers. In this embodiment, the barrier 18 includes an outer surface 36 on the outer layer 40 and a perforated interior surface 34 (facing the opening 32) on the inner layer 40. Perforations 22 on the perforated interior surface 34 allow aerosol to flow through the perforated interior surface 34 and into a hollow cavity 19 that is within the barrier 18. That is, the cavity 19 is configured to be in all or part of the gap 44 between the inner layer 40 and the outer layer 42 of the barrier 18. The barrier 18 may also include one or more spacers 38. The spacers 38 can be structures of any shape or size that hold the inner layer 40 apart from the outer layer 42 to create a gap 44 between the inner layer 40 and the outer layer 42.

In this embodiment, the body 12 also includes one or more ports 24, 26 coupled to the outer ring 14. The outer ring 14 also includes a portion of the cavity 19. Apertures 21 are positioned in the outer ring 14 and connect a portion of the cavity 19 in the outer ring 14 to a portion of the cavity 19 in the barrier 18, such that the cavity 19 in the outer ring 14 is in fluid communication with the cavity 19 in the barrier 18. In operation, aerosol that is near the perforations 22 can flow through the perforations 22 and into the portion of the cavity 19 in the barrier 18, and then to the portion of the cavity 19 in the outer ring 14, and out through a port 24, 26 when a suction is applied to the port 24, 26. In this embodiment, the outer ring 14 includes apertures 21 connecting the portion of the cavity 19 in the outer ring 14 to the portion of the cavity 19 in the barrier 18, allowing aerosol to flow from the barrier 18 to the outer ring 14.

Figure 7A:
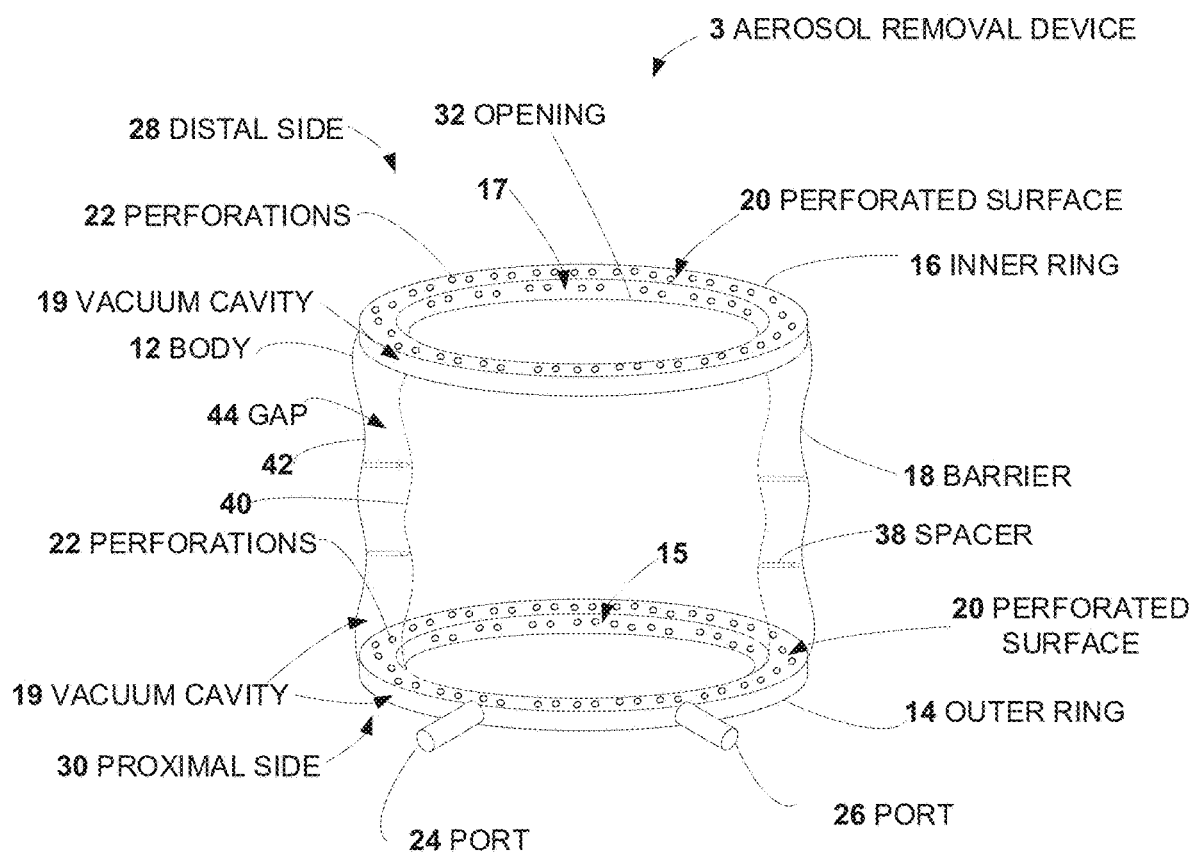
FIG. 7A is a perspective view of a third embodiment of an aerosol removal apparatus having multiple perforated structures for removing aerosol, for example, an inner ring 16 and an outer ring 14.

FIG. 7A is a perspective view of a third embodiment of an aerosol removal apparatus having multiple perforated structures for removing aerosol. Certain components illustrated in FIG. 7A for aerosol removal apparatus 3 are similar to the components described the previous embodiments of the aerosol removal apparatuses. In this embodiment, the inner ring 16 and the outer ring 14 include perforations 22 that allow aerosol to be removed through any of the perforations when a suction is applied to one or more ports 24, 26. In this embodiment, the outer ring 14 and the inner ring 16 include a portion of hollow cavity 19. The barrier 18 also includes a portion of cavity 19 that is utilized to allow the flow of aerosol through the gap 44 between an inner layer 40 and an outer layer 42 of the barrier 18. The portions of the cavity 19 in the inner ring 16, the barrier, 18, and the outer ring 14 are in fluid communication. When suction is applied to a port, aerosol surrounding the device flows into the perforations of the inner ring and the outer ring, flows through the cavity 19 and through the device and out of the port.

Figure 7B:
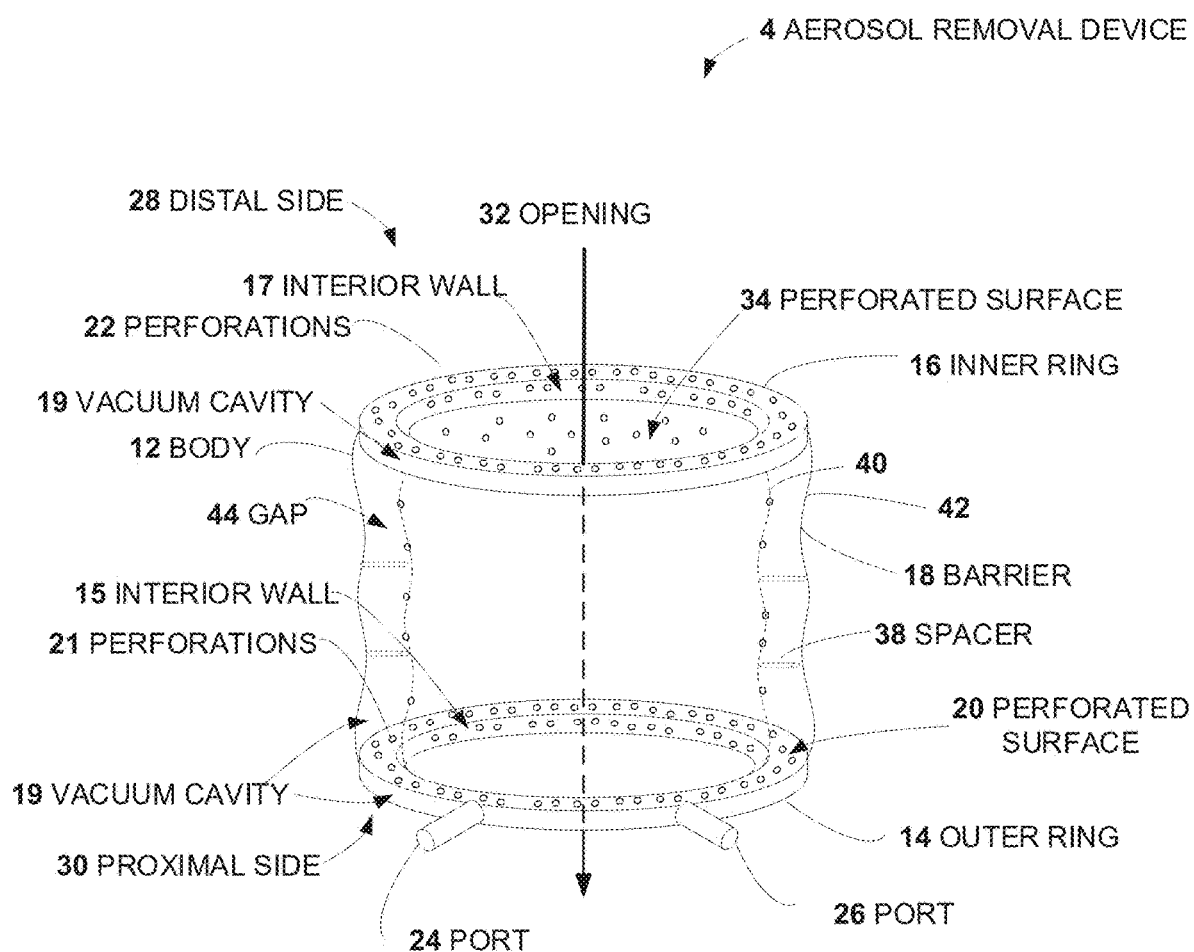
FIG. 7B is a perspective view of a fourth embodiment of an aerosol removal apparatus having multiple perforated structures for removing aerosol, in this example the aerosol removing apparatus having an inner ring 16, an outer ring 14, and a barrier 18 each with a perforated interior surface.

FIG. 7B is a perspective view of a fourth embodiment of an aerosol 4 having multiple perforated structures for removing aerosol. In this example the aerosol removing apparatus includes perforations in an inner ring 16 and an outer ring 14, and a barrier 18 with a perforated interior surface. Certain components illustrated in FIG. 7B for aerosol removal apparatus 4 are similar to the components described the previous embodiments of the aerosol removal apparatuses 1, 2, 3. In this embodiment, the inner ring 16 and the outer ring 14 include perforations 22 that allow aerosol to be removed through any of the perforations when a suction is applied to one or more ports 24, 26. In addition, the barrier 18 includes a perforated interior surface 34 that allows aerosol to be removed from a patient's mouth through the perforated surface 34 perforations when a suction is applied to one or more ports 24, 26. In this embodiment, the outer ring 14 and the inner ring 16 include a portion of hollow cavity 19. The barrier 18 also includes a portion of cavity 19 that is utilized to allow the flow of aerosol through the gap 44 between an inner layer 40 and an outer layer 42 of the barrier 18. The portions of the cavity 19 in the inner ring 16, the barrier, 18, and the outer ring 14 are in fluid communication. When suction is applied to a port, aerosol surrounding the device flows into the perforations of the inner ring 16, the outer ring 14, and the barrier 18, flows through the cavity 19 and out of the port where the suction is applied.

Figure 8:
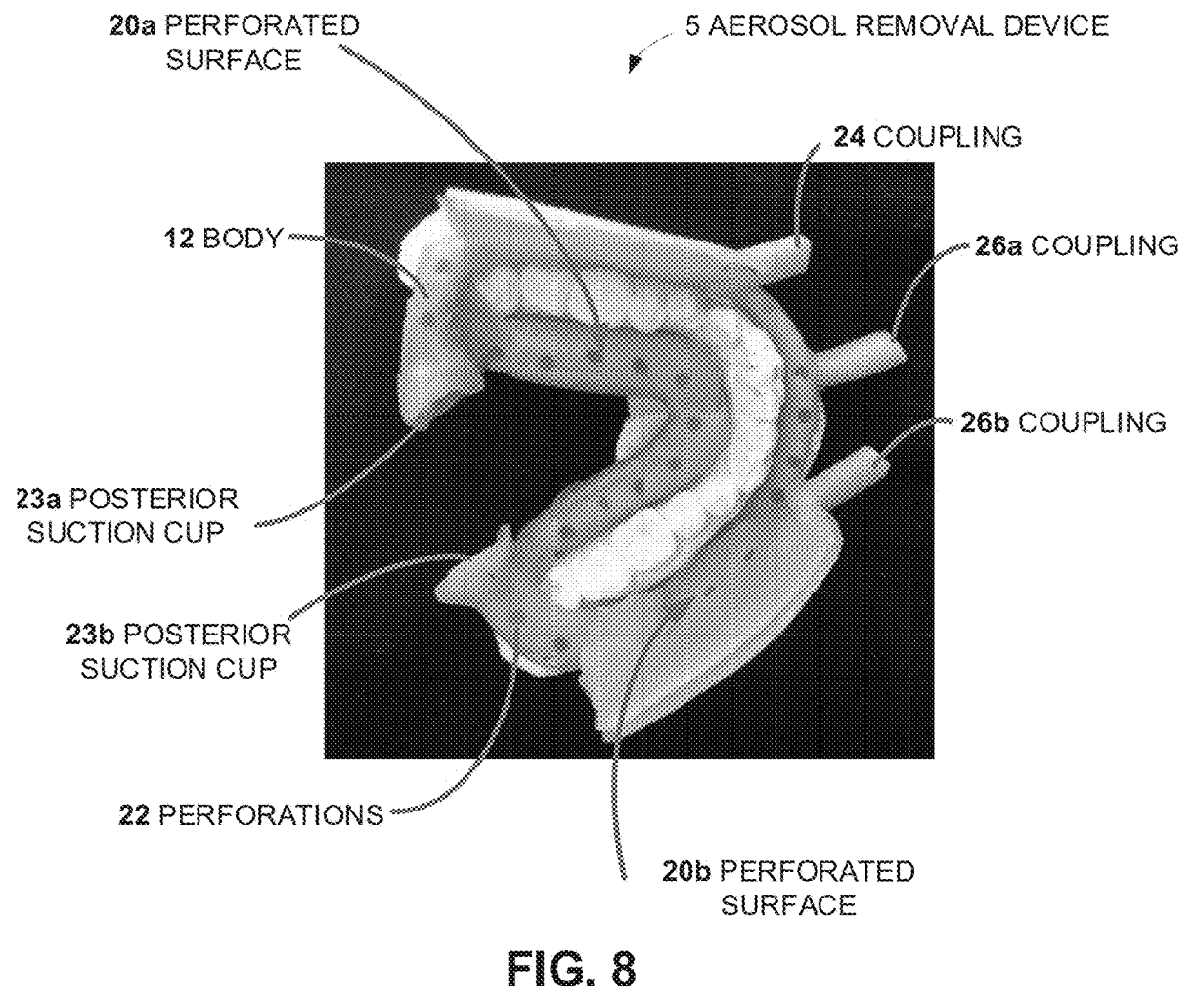

FIG. 8 is a perspective view of a fifth embodiment of an aerosol 4 having a body that fits around a portion of a patient's teeth, and having one, or more than one, perforated surfaces for removing aerosol. As illustrated in FIG. 8, the aerosol removal apparatus 4 may include body 12 that includes a perforated surface 20a that is positioned behind a portion of a patient's teeth. The body 12 may include a perforated surface 20, that is positioned in front of portion of the patient's teeth or alongside the patient's teeth. Various examples of the body 12 can include one or more ports 24, 26a, and 26b. The body 12 includes a hollow cavity configured therein such that the ports are in airflow communication with the cavity in the perforations 22 are also in airflow communication with the cavity. When a suction is applied to a port, the vacuum is created in the cavity and aerosol the vicinity of one or more of perforated surfaces flows through the perforations 22 into the cavity and out through the port. In some embodiments, the aerosol removal apparatus 4 may also include posterior suction cups 23a, 23b which can be used to attach a tongue guard in a center portion of the device.

FIG. 9 is a schematic of a system for removing aerosol, the system including an aerosol removal apparatus for removing aerosol from an oral cavity. The system may include any of the examples of embodiments of the aerosol removal devices described herein, a suction system 48, and a collection tube 50 is coupled between the suction system 48 and a port 24 of the aerosol removal device. In an operation to remove the aerosol from an intra-oral cavity the aerosol removal apparatus to be placed in or around the patient's mouth. The collection tube 50 is attached to the port 24 and attached to the suction system 48, and the suction system 48 is activated which creates a vacuum in the collection tube (compared to ambient air pressure). This vacuum creates a suction that collects aerosol the vicinity of the aerosol the device and sucks the collected aerosol through the port 24, through the collection tube 50, and into the suction system 48. Material collected in the suction system 48 may include aerosol, as well as saliva, water, and the like. Such material can be disposed of in accordance with local or state regulations. In some embodiments, such material may be disposed of through normal wastewater disposal, in some embodiments, such material may to be disposed of as hazardous waste. In some embodiments, the suction system 48 includes one or more filters to separate certain materials from liquid, and then each is disposed of as desired in accordance with local, state, or national directives.

FIG. 10 is a method of removing aerosol from an oral cavity. In various embodiments, the method may use any of the aerosol removing apparatus described herein. At block 102, the method includes positioning an aerosol removal apparatus having at least one aperture for receiving intra-oral aerosol, a port for port to a suction tube, and a cavity inside the device in fluid communication with the aperture and the port. At block 104 the method further includes port a suction hose to the port. Finally, at block 106, the method includes applying a suction on the port to cause aerosol to move through the at least one aperture, through the cavity, and out of the device through the port is removed from the intra-oral area.

FIG. 11A is a schematic of an embodiment of another example of a dental dam/aerosol removal apparatus that includes a flexible sheet of material connected to a frame 52, for example, a wire frame. The material includes an outside edge 54 that is connected to the frame 52 which can be a single layer of material. The flexible sheet of material also includes a double-layer portion 56 that has two layers and a chamber formed therebetween. The double-layer portion includes perforations 22 on a surface that when in use faces outward towards the dental practitioner. The dental dam/aerosol removal apparatus further includes one or more ports 24 for connection to a suction device. When in use, a portion of the dental dam can be clamped around the area of interest, the clamp sealing a whole that may be formed in the sheet material to access the area of interest.

FIG. 11B is a schematic of an embodiment of another example of an aerosol removal apparatus that includes a double-walled barrier 56 comprising a sheet of material connected to a rigid, or semi-rigid, frame 52. In operation, the barrier 56 can be attached to the frame 52 by attaching portions 57 of an edge of the barrier 56 to fasteners 59 that are positioned on a surface of the frame 52. In some embodiments, the fasteners can be small protrusions extending from a portion of the frame 52 (e.g., extending in an outward direction away from the center area of the frame 52) such that when a portion 57 of the edge of the barrier 56 is positioned around the fastener 59, the fastener 59 engages (e.g., sticks into) into the portion 57 of the edge of the barrier 56 and holds the barrier 56 in place on the frame 52. The barrier 56 can be attached tightly on fasteners 59 that are on opposite sides of the frame 52 to hold the barrier 56 taut. In some embodiments, the fasteners 59 may have a sharp point to better engage the material of certain types of barriers.

The barrier 56 has a cavity between its double walls. The barrier 56 can also include the first port 24a. In some embodiments, the barrier 56 can include a second port 26a. The first port 24a in the second port 26a can be connected to the cavity of the barrier 56. In some embodiments, barrier 56 can include separation structures inside the cavity and coupled to the walls of the barrier 56, the separation structures holding the double walls a certain distance apart such that when a vacuum is applied to the first port 24a and/or to the second port 26 the cavity of the barrier 56 does not collapse in allows materials to be communicated from the cavity of the barrier 56 out through the ports. In the orientation of FIG. 11B, the barrier 56 has a front surface 61 facing outward on the figure. The barrier 56 includes openings 22 on its front surface that allow aerosol (or fluid or material) to pass through the opening 22 and into the cavity of the barrier 56. In some embodiments, the barrier 56 can include openings 22 on its back surface. The barrier 56 can also includes a barrier frame 53 that also has a cavity therein, and is connected to the cavity between the double-walls of the barrier 56. The barrier frame 53 may be a semi rigid or flexible frame. In one example, barrier frame 53 is a tube structure formed from the material of the barrier 56. In another example, the barrier frame 53 can comprise a flexible tube. The barrier frame 53 can also include openings 22 that are connected to the cavity within the barrier frame 53, which is in communication with the cavity within the double-walls of the barrier 56.

The frame 52 also includes a cavity and openings 22 on the surface of the frame 52, the openings connected to the cavity. The frame 52 can include one or more ports 26 configured to be connected to a vacuum tube (a suction tube). The ports 26 have an interior cavity connected to the cavity of the frame 52. As indicated above, fasteners 59 can be positioned along portions of the frame 52 and are configured to hold a sheet of material (e.g., the barrier 56, which can be rubber, non-latex material, plastic, etc.) to the frame 52. When in use, a portion of the dental dam can be clamped around the area of interest, the clamp sealing a whole that may be formed in the sheet material to access the area of interest. Note: in the embodiment illustrated in FIG. 11B, the cavity of the frame 52 is separate from the cavity of the barrier 56, and each of the frame 52 in the barrier 56 includes at least one port 24, 26 that in operation can be attached to a suction hose, for example, attached to a hose on a vacuum producing machine in a dentist office. When the ports are connected to a vacuum hose, substances (i.e., aerosol, fluid, and/or material) in the vicinity of the openings 22 on the frame 52, or on the barrier 56, are evacuated from the vicinity of the patient's mouth, passing through an opening 22 into a cavity of the barrier 56 or of the frame 52, and then out of the corresponding port 24, 26. In this embodiment with multiple ports, and in other embodiments described herein having multiple ports, multiple suction hoses can be connected to the ports to evacuate the substances, or a suction hose can be attached to a coupling, for example as illustrated in FIG. 12, that allows to suction hoses to be connected to a single suction hose.

FIG. 11C is a drawing of an embodiment of another example of a frame 52 of an aerosol removal device. The frame 52 has an interior cavity. In this embodiment, instead of being rectangular like the frame in FIG. 11B, the frame 52 in FIG. 11C is curved. For example, the frame 52 can have a circular shape, in oval shape or another type of curved shape. The embodiment illustrated here also includes a plurality of fasteners 59 positioned along portions of the frame 52, which can be used to connect the barrier to the frame 52. In various embodiments, the barrier can have one or more of the same features as the barrier illustrated in FIG. 11B. A barrier that is attached to frame 52 can be, for example, circular-shaped, or rectangular-shaped The frame 52 also includes a plurality of openings 22. The openings can be positioned facing inward (towards the interior portion of the frame) and/or the positioned facing forward, backward outward on the frame, although when the barrier attached to the frame 50 some of the openings that are on an outer surface of the frame 52 may be covered by the barrier. The frame 52 also includes one or more evacuation ports 24, 26, that are configured to be connected to a suction hose.

FIG. 12 illustrates an example of a "Y" coupling that can be used to connect a single suction hose to two outlets (or two ports or two couplings) of an aerosol removal apparatus to form an airflow path through a plurality of holes into a toroidal cavity through the two outlets and into a dental office suction system.

FIG. 13 illustrates a schematic of another embodiment of an aerosol removing apparatus 200 that is connectable to a vacuum system 248 to remove aerosol from an area around the patient's mouth. The aerosol removing apparatus 200 includes a body 202 having a right-side 204 that when used is positioned on the right side of a patient's mouth, and a left side 206 that when used is positioned on the left side of a patient's mouth. The body 202 includes an upper structure 212, a lower structure 214, a right-side T-coupler 208 that includes a right-side body coupler 232 coupled to the upper structure 212 and the lower structure 214 on one side of the body 202, and a left-side T-coupler 210 that includes a left-side body coupler 234 that is coupled to the upper structure 212 and the lower structure 214 on the opposite side of the body 202. In this embodiment, the upper and lower structures 212, 214 each comprise flexible hollow tubing having a circular cross-section. The diameter of the upper and lower structures is of a size to fit comfortably between a patient's lips and gums. For example, in some examples the diameter of the upper and lower structures can be in a range of about 1 mm to about 10 mm. In some examples, the diameter of the upper and lower structures can be in a range of about 3 mm to about 7 mm. In some examples, the upper and lower structures can have a cross-section of another shape. For example, they may be shaped to have a surface that corresponds to the shape of a patient's gum (e.g., a partially flat side) such that they are more comfortable for the patient when in use, or such that they fit securely in place with one or more surfaces shaped to correspond to a portion the patient's mouth which they are adjacent when placed in a patient's mouth between the patient's lips and gums. In some examples, the upper and lower structures may be pliable, for example, silicone tubing. In some examples, the upper and lower structures may be rigid or semi-rigid, formed from plastic or another rigid or semi-rigid material.

In this embodiment, the body 202 forms a ring-link structure that surrounds an opening 250. In some embodiments, the width W of the body 202 may be in the range of 1-4 inches, the width of the body 202 being selected based on the size of the patient's mouth. For example, in some embodiments the width W of the body 202 is 1", 2", 3", or 4", plus or minus 0.5". In some preferred examples, the width W is in the range of about 1.5-3 inches. In some embodiments, the height H of the body 202 may be in the range of 0.5-3.5 inches, the height of the body 202 also being selected based on the size of the patient's mouth. For example, in some embodiments the width W of the body 202 is 1", 2", 3", or 4", plus or minus 0.5". In some preferred examples, the height H is in the range of about 1.5-2.5 inches.

The upper structure 212 is shaped and sized to fit partially, or completely, between a patient's upper teeth and lip. The lower structure 214 is shaped and sized to fit partially, or completely, between a patient's lower teeth and lip (see for example, FIGS. 14 and 15). The upper and lower structures 212, 214 each include the cavity such that they are at least partially hollow. The body 202 includes upper apertures 216, arranged along the upper structure 212, providing a pathway for aerosol to flow from the area near a patient's mouth to the cavity inside the upper structure 212. The body 202 includes lower apertures 218 arranged along the lower structure 214, providing a pathway for aerosol to flow from the area near a patient's mouth to the cavity inside the lower structure 214. The upper structure 212 is positioned in the mouth such that the upper distal surface 236 is positioned distal to the patient's teeth/lips such that the upper apertures 216 can receive aerosol from the patient's mouth. Similarly, the lower structure 214 is positioned in the mouth such that the lower distal surface 236 is positioned distal to the patient's teeth/lips such that the lower apertures 218 can receive aerosol from the patient's mouth. The right-side T-coupler 208 and the left-side T-coupler 210 also have a cavity therein to allow flow of aerosol from the upper and lower structures 212, 214 through the right-side T-coupler 208 and the left-side T-coupler 210. The right-side T-coupler 208 can also include one or more apertures 220, and the left-side T-coupler 210 can also include one or more apertures 222, the apertures allowing aerosol to flow from an area near the patient's mouth to the cavity within the T-coupler. The size of the apertures on the upper and lower structure and on the T-couplers can be the same size and shape, or can have different dimensions and shapes. In some examples, and an aperture is generally circular. In some examples, an aperture has a diameter dimension of between 0.3 mm to about 5 mm, or larger. For example, an aperture has a diameter dimension of 0.3 mm, 0.4, mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, or 5 mm, plus or minus 0.05 mm. In some examples, the apertures on the T-couplers are elongated. In some examples, the apertures on the couplers have a larger diameter than the apertures on the upper or lower structures 212, 214. In some preferred examples, the diameter dimension of an aperture can be equal to or between 1 mm and 3 mm.

In the embodiment illustrated in FIG. 13. the right-side T-coupler 208 includes an extension portion 224 that is coupled to a right-side vacuum line 240. The left-side T-coupler 208 includes an extension portion 226 that is coupled to a left-side vacuum line 242. The right and left-side vacuum lines 240, 242 are connected to a vacuum line T-coupler 244, which can be connected to a vacuum system 248 via vacuum line 246. In some embodiments, a single vacuum line can be used to connect the body 202 of the aerosol removing apparatus 200 to a vacuum system 248; that is, a vacuum line is coupled to the body 202 at only one location, with one coupler. However, the embodiment illustrated in FIG. 13 where the two vacuum lines 240, 242 are connected to the body 202 and to two couplers 208, 210 may provide more stability for the aerosol removing apparatus as it resides in the patient's mouth than an embodiment that only includes a single vacuum line.

In use, the body 202 can be placed in a patient's mouth such that the upper and lower structures 212, 214 are placed inside the patient's lips, between the patient's lips and teeth/gums. The T-couplers 208, 210 can be positioned such that the body couplers 232, 234 are in the patient's mouth, and the extension portions 224, 226 are positioned to extend out of the patients mouth such that the end of the extension portions 224, 226 that connects to the vacuum lines 240, 242 is at the edge of the patient's mouth or outside of the patient's mouth. That is, the T-couplers 208, 210 can be positioned such that they are at angle to the general "plane" (flat or curved) in which the body 202 is aligned, as illustrated in FIGS. 14-16.

FIG. 14 illustrates an image of the aerosol removing apparatus 200 of FIG. 13 in a patient's mouth. As shown in FIG. 14, the right-side body T-coupler 208 is positioned on the right-hand side of the patient's mouth with the extension portion 224 extending from the patient's mouth and connected to vacuum line 240. The left-side body T-coupler 210 is positioned on the left-hand side of the patient's mouth with the extension portion 226 extending from the patient's mouth in connected to vacuum line 242. The right-side coupler apertures 220 and the left-side apertures 222 are positioned to face the patient's oral cavity to allow aerosol near the patient's mouth to flow through the apertures, into the couplers, and out to the vacuum lines. The upper structure 212 and lower structure 214 are positioned between the patient's lips and teeth/gums but are only partially visible in this image.

FIG. 15 illustrates an image of another view of the aerosol removing apparatus 200 of FIG. 29 in a patient's mouth, showing the lower structure of the body positioned between a patient's lips and gums/teeth, and the left-side and right-side body T-coupler positioned on the left and right side, respectively, of the patient's mouth. FIG. 15 shows left-side T-coupler 210 positioned on the left side of the patient's mouth. The left side body coupler 234 which is connected to the lower structure 214 is positioned further in the patient's mouth than the left side extension portion 226 illustrating the alignment of the T coupler in the patient's mouth. The distal surface 230 is positioned to away from side of the patient's mouth such that apertures on the distal surface 230 can receive aerosol that is near the patient's mouth. The right-side extension portion 224 is also shown as extending all of the patient's mouth and being coupled to the vacuum line 240. FIG. 15 also shows the lower structure 214 positioned between the patient's lower lip and gum, in apertures 218 on the lower structure 214 positioned to receive aerosol that is near the lower portion of the patient's mouth.

FIG. 16 illustrates an image of an example of an embodiment of the aerosol removing apparatus 200 illustrated in FIG. 13. FIG. 16 shows an example of the angle between the left-side T-coupler 210 and the upper and lower structures 212, 214, and the angle between the right-side T-coupler 208 and the upper and lower structures 212, 214. The T-couplers 208 and 210 are aligned such that they are coupled to the upper and lower structures 212, 214 when the upper and lower structures 212, 214 are positioned inside a patient's mouth and extend outward at an angle where there coupled to the vacuum lines 240, 242. When they are aligned as shown, the right-side distal surface 228 of the right-side T-coupler 208, and the left-side distal surface 226 of the left-side distal surface 228 faces inward towards the patient's oral cavity, allowing aerosol in the patient's oral cavity to flow through apertures disposed on these surfaces. In some examples, the vacuum lines T-coupler 244 is positioned in front of a patient when the aerosol removing apparatus 200 is placed in the patient's mouth. In other examples, the vacuum lines T-coupler 244 is positioned behind the patient's head when the aerosol removing apparatus 200 is placed in the patient's mouth.

FIG. 17 is a front perspective view of an example of another embodiment of an aerosol removing apparatus 1700. The aerosol removing apparatus 1700 is adapted to fit adjacent to the edges of a patient's mouth, and can be provided in various sizes to fit the mouths of children, youths, and adults. The aerosol removing apparatus 1700 includes an upper portion 1721, and a lower portion 1723, a right-hand side 1725, and the left-hand side 1727, referenced relative to the position of the aerosol removing apparatus 1700 when used on a patient, e.g., the right-hand side 1725 positioned near the right-hand side of a patient's mouth. the left-hand side 1727 positioned near the left-hand side of a patient's mouth, etc. As further described below, the aerosol removing apparatus 1700 includes an interior cavity and an outlet coupling in airflow communication with the cavity. In operation, air and airborne material flows through openings in a surface of the device, into the cavity, and out of the device through the outlet coupling when a suction is applied to the outlet coupling (e.g., via a suction house of a dental suction system).

Still referring to the example in FIG. 17, the aerosol removing apparatus 1700 includes an outer structure 1730, an inner structure 1735, and an aperture 1705 that extends through the device. In this example, the device 1700 forms a ring around the aperture 1705. The outer structure 1730 includes an outer perimeter 1732. The inner structure 1735 includes an inner perimeter 1737. The aerosol removing apparatus 1700 includes a proximal surface 1720 that forms a portion of the outer structure 1730 and a portion of the inner structure 1735. The proximal surface 1720 extends between the inner perimeter 1737 and the outer perimeter 1731. In this example, the proximal surface 1720 is curved. The aerosol removing apparatus 1700 further includes a distal surface 1719 that forms a portion of the outer structure 1730 and a portion of the inner structure 1735. The distal surface 1719 extends between the inner perimeter 1737 and the outer perimeter 1731. In this example, the distal surface 1719 is curved. In this and other embodiments, the distal surface 1719 and/or the proximal surface 1720 may be generally U-shaped. When used, the inner structure 1735 and the perimeter 1737 are positioned near and/or adjacent to a patient's mouth surface (see, for example, FIG. 27). In other embodiments, the aerosol removing apparatus may be structured such that it does not form a ring around an aperture. For example, it may be formed by two at least partially separate structures, for example, an upper structure and a lower structure, or the left-hand side structure and a right-hand side structure. In embodiments where the aerosol removing apparatus is formed by two (or more) structures, such devices can also include many if not all of the other features described herein.

As indicated above, the aerosol removing apparatus 1700 includes a cavity therein. For example, a cavity is formed between a portion of the surface of the outer structure 1730, a portion of the surface of the inner structure 1735, and a portion of the surface of the proximal surface 1720. The aerosol removing apparatus 1700 also includes one or more outlet couplings 1710, 1712 for connecting one or more suction hoses to the aerosol removing apparatus 1700. In this example, coupling 1710 is attached to the right-hand side of the outer structure 1730, and coupling 1712 is connected to the left-hand side of the outer structure 1730. The outlet couplings 1710, 1712 are positioned on the outer structure 1730 such that they can easily be connected to a suction hose. In other embodiments, such couplings may be positioned on other portions of the aerosol removing apparatus. Each outlet coupling includes an airflow channel that is connected to the cavity in the aerosol removing apparatus, such that when a proximal end of a suction hose is connected to the outlet coupling and a suction is created at a distal end of the suction house, in the air and airborne material in the cavity flows out of the cavity and out through the outlet coupling. This airflow out of the cavity and out of the device creates an airflow of air, and airborne material, near openings in the device into the cavity.

The example aerosol removing apparatus 1700 is generally toroid shaped. However, the shape and the dimensions of an aerosol removing apparatus may vary from the embodiment illustrated in FIG. 17. For example, the aerosol removing apparatus may have a different overall shape (e.g., more circular, or have a different curvilinear shape). In some embodiments, the outer structure 1730, the inner structure 1735, and the proximal surface 1720 are formed at the same time with the same material such that these three portions form an integral aerosol removing apparatus. Some embodiments of the aerosol removing apparatus 1700 may include features in addition to those illustrated in FIG. 17. Other embodiments of the aerosol removing apparatus 1700 may include fewer features than are illustrated in FIG. 17. For example, some embodiments of aerosol removing apparatus may only include one outlet coupling.

The aerosol removing apparatus 1700 also includes a plurality of openings 32 which allow air flow from the exterior of the device 1700 into the cavity. In the example illustrated in FIG. 17, some of the openings 32A are positioned on an upper portion of the device, some of the openings 32D are positioned on a lower portion of the device, some of the openings 32B are positioned on the left side of the device, and some of the openings 32C are positioned on the right side of the device. In the example illustrated in FIG. 17, the openings 32 are positioned in the distal surface 1719 on both the outer structure 1730 and the inner structure 1735 (e.g., as illustrated in FIG. 20). When a proximal end of a suction hose is connected to an outlet coupling 1710, 1712, applying suction to a distal end of the suction hose creates an airflow in the area near the aerosol removing apparatus 1700 such that air, and airborne material in the vicinity of the openings, flows through the openings 32 and into the cavity inside the aerosol removing apparatus 1700, and then out of the cavity through the outlet couplings 1710, 1712 and into the proximal end of the suction hose and into the suction system.

In various embodiments, the openings 32 can be positioned on places of the outer structure 1730 or the inner structure 1735 other than what is shown in FIG. 17. Also, in other embodiments, the arrangement of the openings 32 may differ. For example, in some embodiments the openings 32 may be arranged such that they cover a larger portion of the inner structure 1735 and/or the outer structure 1730, or arranged such that they cover a smaller portion of the inner structure 1735 and/or the outer structure 1730. In some embodiments, the openings 32 may be arranged only on the outer structure 1730. In some embodiments, the openings 32 may be arranged only on the inner structure 1735. Also, in other embodiments the dimensions and/or the shape of the openings may be different. For example, the openings may be circular-shaped, approximately 0.03 inches in diameter, have a depth of approximately 0.0394 inches, and be positioned approximately 0.091 inches away from each other (center to center). In other embodiments, the openings may be oval, slots, squares, rectangular, or any other shape. The openings may have a dimension in the range of between about 0.001 inches and about 2 inches. The openings may have a depth in the range of between about 0.001 inches and about 0.5 inches. The openings may be arranged in various patterns, and positioned in patterns between approximately 0.01 inches and 3 inches away from each other (e.g., center-to-center).

In the embodiment illustrated in FIG. 17, the aerosol removing apparatus includes a shield 1715 that extends, from an upper portion 1721 of the outer structure 1730, outward away from the outer structure 1730. When the aerosol removing apparatus 1700 is used on a patient, the shield 1715 is positioned below the patient's nose. The shield 1715 functions as a barrier between a patient's nose and the openings 32 to help prevent airflow out of a patient's nose into the openings 32. As illustrated in the example of FIG. 17, the shield 1715 has a proximal edge 1731 connected to the outer structure 1730, and a distal edge 1733 offset from the outer structure 1730 and connected to the proximal edge 1731 by angled edges 1735 and 1737. In this embodiment, the proximal edge 1731 is longer than the distal edge 1733. In other embodiments of a shield, the size and shape of the shield may vary.

FIG. 18 is a back perspective view of the embodiment of the aerosol removing apparatus shown in FIG. 17 illustrating features that can be seen on the back of the device 1700. As can be seen in FIG. 18, some of the openings 32 are in a portion of the distal surface 1719 on the inner structure 1735. FIG. 18 also illustrates that this example also includes an outer nose cup 1802 formed in the outer perimeter 1732, and an inner nose cup 1804 formed in the inner perimeter 1737. When used on a patient, the nose cups 1802, 1804 placed adjacent to the patient's nose and aid in the comfort and fit of the aerosol removing apparatus.

FIGS. 19-27 illustrate other views of the aerosol removing apparatus 1700 and other views of the features described above. Specifically, FIG. 19 is a front elevation view illustrating an example of another embodiment of an aerosol removing apparatus. FIG. 20 is a back elevation view of the embodiment of the aerosol removing apparatus shown in FIG. 17.

FIG. 21 is a top elevation view of the embodiment of the aerosol removing apparatus shown in FIG. 17. FIG. 22 is a bottom perspective view of the embodiment of the aerosol removing apparatus shown in FIG. 17. FIG. 23 is a right elevation view of the embodiment of the aerosol removing apparatus shown in FIG. 17. FIG. 24 is a left elevation view of the embodiment of the aerosol removing apparatus shown in FIG. 17. FIG. 25 is a front perspective solid view, rendered with solid surfaces, of the example of the aerosol removing apparatus illustrated in FIG. 17. FIG. 26 is a back perspective solid view, rendered with solid surfaces, of the example of the aerosol removing apparatus illustrated in FIG. 17. FIG. 27 illustrates a perspective view of the embodiment of the aerosol removing apparatus shown in FIG. 17 on a patient.

FIG. 28 illustrates pictures of dental dams that are also aerosol removing apparatus. This picture shows examples of various shapes and arrangements of perforations. For example, large oval perforations, circular perforations, horizontal rectangular perforations, vertical rectangular perforations, or a mesh that comprises a plurality of perforations. All of the perforations are positioned on a barrier 18. The barrier 18 includes at least two layers that surround a hollow cavity is in fluid communication with the perforations and one or more saliva and aerosol ejector reports.

FIG. 29 is a picture of an embodiment of a dental dam that is also an aerosol removing apparatus. In this example, the dental dam includes a saliva port, and outer ring that when in use is positioned outside of the mouth the patient, an inner ring (not shown), and a barrier that extends from the outer ring to the inner ring. The barrier includes a plurality of perforations. The barrier surrounds a hollow cavity such that there is fluid communication between the perforations, the cavity, and the port.

FIG. 30 is a picture of a dental dam showing an example of the aerosol removing apparatus illustrated in FIG. 11. This dental dam also includes one or more ports, and outer ring, a double layered rubber dam with a hollow cavity. Perforations are positioned on a surface of the double layer rubber dam. Aerosol that is near the perforations can be suctioned perforations into the hollow cavity and out to the saliva port, when suction is applied to the saliva port.

FIG. 31 is a picture of a dental dam showing an example of the aerosol removing apparatus illustrated in FIG. 2A. In this example, a portion of the barrier 18 facing the dental practitioner includes a plurality of perforations. The barrier 18 extends from an outer ring, which is inside of the barrier 18 at the largest diameter of the device that is positioned outside the patient's mouth, into the patient's mouth covering the lower teeth and most of the upper teeth but only a few of the upper teeth exposed to the barrier. In this example, all for nearly all the perforations are positioned on the barrier 18, and an outer ring and an inner ring (not shown as they are inside of the barrier 18) provide shape and structure to the device. The dental dam also includes one or more saliva and aerosol ejector ports. The barrier 18 has an inner wall (visible in the picture) and an outer wall, the perforations being positioned on the surface of the inner wall.

FIG. 32 illustrates another example of an aerosol removing apparatus 6. In this example, the aerosol removing apparatus includes a body 12 that includes structure that encloses a cavity 19. The body includes one or more ports 24, 26 that are in fluid communication with the cavity 19. The body also includes a plurality of perforations 22, the perforations 22 forming openings between the environment outside of the body 12 in the cavity 19, and allow aerosol near the perforations 22 to flow into the cavity 19 through the perforations 22 when a suction is applied to a port 24, 26.

The body further includes an inner ring 16, an outer ring 14, and structure that connects the inner ring 16 to the outer ring 14. The connecting structure can include a barrier 18 and/or side members 58. The connecting structure may also have a portion of the cavity 19 formed therein. In some embodiments, the side members 58 can comprise a whole or partial hollow tube. In some embodiments, barrier 18 has two layers and at least partially encloses a portion of the cavity 19. The body 12 includes an opening 32 such that there is an open space running through the body that is open on both ends. In some embodiments, the barrier 18 extends from one side members 58 to another side member 58. In some embodiments, the side members 58 comprises a material that is stiffer than the barrier 18. In some embodiments, the barrier may be the flexible sheet (e.g., of rubber, a non-latex material, or another suitable material). In some embodiments, the barrier 18 includes a semi-flexible double-walled structure. In some embodiments, the side members 58 in the barrier 18 are configured as an interval portion of the body 12. In some embodiments, the barrier 18 forms the side members 58. In various embodiments, any or all of the inner ring 16, the outer ring 14, the side members 58, and an inner surface of the barrier 18 may include perforations 22 such that aerosol that is near any of the inner ring 16 the outer ring 14 the side members 58 and the barrier 18 can be sucked into the aerosol removal apparatus 6 and out of a port 24, 26.

The aerosol removal apparatus 6 is used, the inner ring 16 is inserted at least partially into the mouth of a patient. A portion of the side members 58 may rest against the lips of the patient for the side of the patient's mouth. The one or more ports 24, 26 may be positioned so they are adjacent to the edge of a patient's mouth to allow easy connection to a suction tube or dental vacuum. In this embodiment, the outer ring 14 extends a distance from the patient's mouth and lips to advantageously increase the volume from which aerosol may be removed by the aerosol removing apparatus. In some embodiments, the outer ring 14 extends an extension distance 60 from the portion of the body 12 with a port 24 is coupled to. For example, the extension distance may be 0.1 inches, 0.2 inches, 0.3 inches, 0.4 inches, 0.5 inches, 0.6 inches, 0.7 inches, 0.8 inches, 0.9 inches, or 1 inch, plus or minus 0.05 inches. In some embodiments, the extension distance may be greater than 1 inch, for example, 1.1 inches, 1.2 inches, 1.3 inches, 1.4 inches, 1.5 inches, 1.6 inches, 1.7 inches, 1.8 inches, 1.9 inches, or 2 inches, plus or minus 0.05 inches. In some other embodiments, the extension distance may be greater than 2 inches, for example, 2.5 inches, 3 inches, 4 inches, 5 inches, 6 inches, 7 inches, 8 inches, 9 inches, or 10 inches, plus or minus 0.5 inches.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. An apparatus for removing aerosol and fluid substances from inside of a patient's mouth, the apparatus comprising:
   a sleeve comprising a first aperture on a proximal end of the sleeve and a second aperture on a distal end of the sleeve;
   an annular support ring coupled to the distal end of the sleeve on an edge of the second aperture and extending around the second aperture;

a coupling comprising a proximal end and a distal end, the distal end of the coupling having a first port configured to couple to a suction tube, the coupling further comprising an interior cavity from the proximal end to the first port;

a conduit having an interior cavity, the conduit coupled to the proximal end of the sleeve on an edge of the first aperture, the proximal end of the coupling connecting the interior cavity of the coupling to the interior cavity of the conduit, the conduit extending to form a circumferential boundary around an area that is sized to fit inside a patient's mouth; and openings arranged on a surface of the conduit, the openings forming a pathway for substances in the vicinity of the openings to enter the conduit, and the openings, the conduit, and the coupling forming a passageway through which substances can flow from the openings through the conduit and to the first port of the coupling for evacuating the substances from the patient's mouth, wherein the coupling is shaped so the distal end is positioned outside of an edge of the patient's mouth when the conduit is positioned inside the patient's mouth.

2. The apparatus of claim 1, wherein the proximal end of the coupling comprises a second port extending in a first direction and a third port extending in a second direction, the coupling having a passageway from the second port and the third port to the first port, wherein the conduit extends in a curved shape from the second port to the third port to form the circumferential boundary.

3. The apparatus of claim 2, wherein the alignment of the first direction and the second direction are in opposite directions, plus or minus 40 degrees with respect to each other.

4. The apparatus of claim 1, wherein at least some of the openings are positioned on the surface of the conduit facing inwards towards the area surrounded by the circumferential boundary.

5. The apparatus of claim 4, further comprising at least one opening on the coupling to form a pathway from an exterior surface of the coupling to the interior cavity of the coupling.

6. The apparatus of claim 1, further comprising a vacuum system having a vacuum tube coupled to the first port of the coupling, the vacuum system operable to produce a vacuum at the first port of the coupling, the vacuum system configured such that when it is actuated it produces a suction that causes the substances to enter the openings and flow through the conduit and the coupling and into the vacuum tube.

7. The apparatus of claim 1, wherein the circumferential boundary formed by the conduit is aligned within a plane, and the proximal end of the coupling is coupled to the conduit at a 90° angle, plus or minus 30 degrees, relative to the plane.

8. The apparatus of claim 1, wherein the coupling is curved as it extends from its proximal end to its distal end.

9. The apparatus of claim 8, wherein the coupling is configured in a U-Shaped curve such that the proximal end and the distal end of the coupling are aligned in the same direction, plus or minus 20° relative to each other.

10. The apparatus of claim 1, further comprising a second coupling comprising a proximal end and a distal end, the distal end of the second coupling having a first port configured to couple to a suction tube, the second coupling having an interior cavity that forms a passageway from the openings on the conduit through the conduit and to the first port of the second coupling.

11. The apparatus of claim 10, further comprising at least one opening on the second coupling to form a pathway from an exterior surface of the second coupling to the interior cavity of the second coupling.

12. The apparatus of claim 1, wherein the sleeve comprises a flexible material.

13. The apparatus of claim 1, wherein the conduit extends around the second aperture.

14. A system for removing aerosol and fluids from a patient's mouth, the system comprising:

an apparatus comprising a sleeve comprising a first aperture on a proximal end of the sleeve and a second aperture on a distal end of the sleeve;

an annular support ring coupled to the distal end of the sleeve on an edge of the second aperture and around the second aperture;

a coupling comprising a proximal end and a distal end, the distal end of the coupling having a first port, the coupling further comprising an interior cavity from the proximal end to the first port;

a conduit having an interior cavity, the conduit coupled to the proximal end of the sleeve on an edge of the first aperture, the proximal end of the coupling connecting the interior cavity of the coupling to the interior cavity of the conduit, the conduit extending to form a circumferential boundary around an area, the circumferential boundary being between 3 inches long and 15 inches long; and openings arranged on a surface of the apparatus, the openings forming a pathway for substances in the vicinity of the openings to enter the conduit, and wherein the openings, the conduit, and the coupling form a passageway through which aerosol and fluids can flow from the openings to the first port of the coupling for evacuation of the aerosol and fluids, wherein the coupling is shaped so the distal end is positioned outside of an edge of the patient's mouth when the conduit is positioned inside the patient's mouth.

15. The system of claim 14, further comprising a vacuum system having a vacuum tube connected to the first port of the coupling, the vacuum system operable to provide a vacuum at the first port to cause a suction at the openings to evacuate aerosol and fluids in a patient's mouth and in the vicinity of the openings, out through the conduit and the first port of the coupling.

16. The system of claim 14, wherein the conduit extends around the second aperture.

* * * * *